US012645689B2

(12) United States Patent
Thomas et al.

(10) Patent No.: US 12,645,689 B2
(45) Date of Patent: Jun. 2, 2026

(54) WEIGHTED RETRIEVAL FOR IN-CONTEXT TABULAR MODEL

(71) Applicant: The Toronto-Dominion Bank, Toronto (CA)

(72) Inventors: Valentin Patrick Marie Thomas, Toronto (CA); Junwei Ma, Toronto (CA); Anthony Lawrence Caterini, Toronto (CA); Rasa Hosseinzadeh, Toronto (CA); Keyvan Golestan Irani, Aurora (CA); Guangwei Yu, Toronto (CA); Maksims Volkovs, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 18/817,402

(22) Filed: Aug. 28, 2024

(65) Prior Publication Data

US 2025/0384053 A1 Dec. 18, 2025

Related U.S. Application Data

(60) Provisional application No. 63/659,876, filed on Jun. 14, 2024.

(51) Int. Cl.
*G06F 16/248* (2019.01)
*G06F 16/22* (2019.01)

(52) U.S. Cl.
CPC .......... *G06F 16/248* (2019.01); *G06F 16/221* (2019.01)

(58) Field of Classification Search
None
See application file for complete search history.

(56) References Cited

U.S. PATENT DOCUMENTS

| | | | |
|---|---|---|---|
| 7,343,551 B1 | 3/2008 | Bourdev | |
| 9,864,982 B2 | 1/2018 | Bristow et al. | |
| 10,163,085 B2 | 12/2018 | D'Agostino et al. | |
| 10,178,246 B1 | 1/2019 | Horvath et al. | |
| 10,181,114 B2 | 1/2019 | Tseretopoulos et al. | |
| 10,311,155 B2* | 6/2019 | Dupey .................. | G06F 16/215 |
| 10,339,931 B2 | 7/2019 | Tseretopoulos et al. | |
| 10,346,824 B2 | 7/2019 | Chan et al. | |
| 10,360,303 B2 | 7/2019 | Volkovs et al. | |

(Continued)

OTHER PUBLICATIONS

Explainable artificial intelligence model to predict acute critical illness from electronic health records (Year: 2020).*

(Continued)

*Primary Examiner* — Kim T Nguyen

(57) ABSTRACT

An example operation may include one or more of storing a table comprising a plurality of records, receiving a target record to be executed by an artificial intelligence (AI) model to perform a task, retrieving a subset of records from the plurality of records within the table based on content values in the target record and corresponding content values in the subset of records, identifying a first group of records among the subset of records that are related to the target record based on attributes associated with the target record and attributes associated with the first group of records, weighting the first group of records greater than other records within the subset of records to generate a weighted subset of records, and executing the AI model on the weighted subset of records to generate a predictive result.

20 Claims, 25 Drawing Sheets

(56) References Cited

U.S. PATENT DOCUMENTS

| | | | |
|---|---|---|---|
| 10,405,146 B1 | 9/2019 | Kuruvilla et al. | |
| 10,438,206 B2 | 10/2019 | Jivraj et al. | |
| 10,440,196 B2 | 10/2019 | Horvath et al. | |
| 10,440,197 B2 | 10/2019 | Horvath et al. | |
| 10,460,748 B2 | 10/2019 | Tseretopoulos et al. | |
| 10,482,675 B1 | 11/2019 | Sutter et al. | |
| 10,659,400 B2 | 5/2020 | Moon et al. | |
| 10,698,902 B2 | 6/2020 | Tseretopoulos et al. | |
| 10,706,635 B2 | 7/2020 | Sutter et al. | |
| 10,708,721 B2 | 7/2020 | Kuruvilla et al. | |
| 10,728,259 B2 | 7/2020 | McCarter et al. | |
| 10,776,619 B2 | 9/2020 | Collinson et al. | |
| 10,824,941 B2 | 11/2020 | Volkovs et al. | |
| 10,831,923 B2 | 11/2020 | Dunjic et al. | |
| 10,832,047 B2 | 11/2020 | Moghtadai | |
| 10,862,897 B2 | 12/2020 | D'Agostino et al. | |
| 10,867,292 B2 | 12/2020 | Lin et al. | |
| 10,867,293 B2 | 12/2020 | Bristow et al. | |
| 10,878,816 B2 | 12/2020 | Tseretopoulos et al. | |
| 10,902,220 B2 | 1/2021 | Lozon et al. | |
| 10,922,665 B2 | 2/2021 | Miller et al. | |
| 10,943,605 B2 | 3/2021 | Tseretopoulos et al. | |
| 10,977,617 B2 | 4/2021 | Tseretopoulos et al. | |
| 11,004,187 B2 | 5/2021 | Kuruvilla et al. | |
| 11,017,028 B2 | 5/2021 | Dunjic et al. | |
| 11,030,415 B2 | 6/2021 | Volkovs et al. | |
| 11,055,924 B2 | 7/2021 | Navarro et al. | |
| 11,061,638 B2 | 7/2021 | Lam | |
| 11,070,448 B2 | 7/2021 | Miller et al. | |
| 11,087,314 B2 | 8/2021 | Gandhi et al. | |
| 11,100,168 B2 | 8/2021 | Miller et al. | |
| 11,140,143 B2 | 10/2021 | Moon et al. | |
| 11,144,921 B2 | 10/2021 | Dunjic et al. | |
| 11,144,998 B2 | 10/2021 | Kuruvilla et al. | |
| 11,145,169 B2 | 10/2021 | Pratten et al. | |
| 11,182,860 B2 | 11/2021 | Kuruvilla et al. | |
| 11,200,328 B2 | 12/2021 | Shpurov et al. | |
| 11,200,411 B2 | 12/2021 | Rizvi et al. | |
| 11,210,857 B2 | 12/2021 | Rizvi et al. | |
| 11,222,286 B2 | 1/2022 | Choe et al. | |
| 11,232,304 B2 | 1/2022 | Navarro et al. | |
| 11,276,257 B2 | 3/2022 | Moghtadai et al. | |
| 11,303,642 B2 | 4/2022 | Dunjic et al. | |
| 11,334,574 B2 | 5/2022 | Caputo et al. | |
| 11,347,744 B2 | 5/2022 | Tseretopoulos et al. | |
| 11,349,871 B2 | 5/2022 | Moon et al. | |
| 11,354,442 B2 | 6/2022 | Haldenby et al. | |
| 11,361,566 B2 | 6/2022 | Collinson et al. | |
| 11,373,229 B2 | 6/2022 | Tseretopoulos et al. | |
| 11,392,776 B2 | 7/2022 | Lozon et al. | |
| 11,393,020 B2 | 7/2022 | Mathew et al. | |
| 11,394,668 B1 | 7/2022 | Subbunarayanan et al. | |
| 11,397,765 B2 | 7/2022 | Volkovs et al. | |
| 11,409,811 B2 | 8/2022 | D'Agostino | |
| 11,411,734 B2 | 8/2022 | Shpurov et al. | |
| 11,430,242 B2 | 8/2022 | Moghtadai | |
| 11,436,809 B2 | 9/2022 | Rizvi et al. | |
| 11,451,669 B1 | 9/2022 | Navarro et al. | |
| 11,469,878 B2 | 10/2022 | Shpurov et al. | |
| 11,470,091 B2 | 10/2022 | McCarter et al. | |
| 11,470,143 B2 | 10/2022 | Joheb et al. | |
| 11,475,059 B2 | 10/2022 | Liu et al. | |
| 11,475,251 B2 | 10/2022 | Morin et al. | |
| 11,477,265 B2 | 10/2022 | McPhee et al. | |
| 11,507,622 B2 | 11/2022 | Grebenisan et al. | |
| 11,507,868 B2 | 11/2022 | Kwong et al. | |
| 11,521,254 B2* | 12/2022 | Lancewicki | G06N 3/045 |
| 11,546,345 B2 | 1/2023 | D'Agostino et al. | |
| 11,580,762 B2 | 2/2023 | Rizvi et al. | |
| 11,600,064 B2 | 3/2023 | Navarro et al. | |
| 11,604,899 B2 | 3/2023 | Haldenby et al. | |
| 11,620,741 B2 | 4/2023 | Kuruvilla et al. | |
| 11,632,311 B2 | 4/2023 | Miller et al. | |
| 11,651,100 B2 | 5/2023 | Dunjic et al. | |
| 11,663,488 B2 | 5/2023 | Volkovs et al. | |
| 11,671,536 B2 | 6/2023 | Navarro et al. | |
| 11,687,995 B2 | 6/2023 | Tseretopoulos et al. | |
| 11,689,484 B2 | 6/2023 | Moon et al. | |
| 11,704,782 B2 | 7/2023 | Wakim et al. | |
| 11,741,305 B2 | 8/2023 | Skaljin et al. | |
| 11,743,210 B2 | 8/2023 | Moon et al. | |
| 11,748,400 B2 | 9/2023 | Volkovs et al. | |
| 11,756,388 B2 | 9/2023 | Pratten et al. | |
| 11,777,918 B2 | 10/2023 | Moon et al. | |
| 11,782,935 B2 | 10/2023 | Caputo et al. | |
| 11,789,909 B2 | 10/2023 | Grebenisan et al. | |
| 11,790,012 B2 | 10/2023 | D'Agostino | |
| 11,790,354 B2 | 10/2023 | Gandhi et al. | |
| 11,797,962 B2 | 10/2023 | Jones et al. | |
| 11,809,486 B2 | 11/2023 | Liu et al. | |
| 11,809,577 B2 | 11/2023 | Begg et al. | |
| 11,811,826 B2 | 11/2023 | Moon et al. | |
| 11,842,252 B2 | 12/2023 | Kuang et al. | |
| 11,875,398 B2 | 1/2024 | Pratten et al. | |
| 11,880,811 B2 | 1/2024 | Pawelkiewicz et al. | |
| 11,886,764 B2 | 1/2024 | Lam | |
| 11,928,112 B2 | 3/2024 | Dunjic et al. | |
| 11,941,525 B2 | 3/2024 | Morin et al. | |
| 11,941,703 B2 | 3/2024 | Kuruvilla et al. | |
| 11,955,117 B2 | 4/2024 | McDermid et al. | |
| 11,966,491 B2 | 4/2024 | D'Agostino | |
| 11,978,085 B2 | 5/2024 | Rai et al. | |
| 11,978,090 B2 | 5/2024 | Navarro et al. | |
| 11,985,153 B2 | 5/2024 | Karl | |
| 11,995,121 B2 | 5/2024 | Volkovs et al. | |
| 12,001,951 B2* | 6/2024 | V V Ganeshan | G06F 40/232 |
| 12,008,060 B2* | 6/2024 | Weinstein | G06Q 10/06398 |
| 12,008,315 B2 | 6/2024 | Miller et al. | |
| 12,014,303 B2 | 6/2024 | Carvalho et al. | |
| 12,019,594 B2 | 6/2024 | Floyd et al. | |
| 12,021,874 B2 | 6/2024 | Dunjic et al. | |
| 12,039,535 B2 | 7/2024 | Dunjic et al. | |
| 12,052,363 B2 | 7/2024 | Shpurov et al. | |
| 12,061,652 B2 | 8/2024 | Miller et al. | |
| 12,067,130 B2 | 8/2024 | Shpurov et al. | |
| 12,067,580 B2 | 8/2024 | Jeske et al. | |
| 12,079,351 B2 | 9/2024 | Begg et al. | |
| 12,106,220 B2 | 10/2024 | Volkovs et al. | |
| 12,111,793 B2 | 10/2024 | Grebenisan et al. | |
| 12,124,925 B2 | 10/2024 | Rho et al. | |
| 12,136,079 B2 | 11/2024 | Jones et al. | |
| 12,164,542 B1 | 12/2024 | Rahman et al. | |
| 12,169,693 B2 | 12/2024 | Lu | |
| 12,182,800 B2 | 12/2024 | Navarro et al. | |
| 12,198,109 B2 | 1/2025 | Abbas | |
| 12,198,510 B2 | 1/2025 | Pratten et al. | |
| 12,210,534 B2 | 1/2025 | Cashion et al. | |
| 12,211,274 B2 | 1/2025 | Ma et al. | |
| 12,217,011 B2 | 2/2025 | Luo et al. | |
| 12,223,549 B2 | 2/2025 | Bouëttéet al. | |
| 12,229,690 B2 | 2/2025 | Stanevich et al. | |
| 12,254,512 B2 | 3/2025 | Heglin et al. | |
| 12,282,785 B2 | 4/2025 | Karbasi et al. | |
| 12,288,236 B2 | 4/2025 | Volkovs et al. | |
| 12,299,149 B2 | 5/2025 | Nikoghossian et al. | |
| 12,316,715 B2 | 5/2025 | Taheri et al. | |
| 12,321,861 B2 | 6/2025 | Volkovs et al. | |
| 12,326,856 B2 | 6/2025 | Mohammed et al. | |
| 12,333,354 B2 | 6/2025 | Mohammed et al. | |
| 12,347,538 B2* | 7/2025 | Inwald | G16H 10/20 |
| 12,353,969 B2 | 7/2025 | Kuang et al. | |
| 12,354,094 B2 | 7/2025 | Jones et al. | |
| 12,373,795 B2 | 7/2025 | Misler et al. | |
| 12,505,281 B2* | 12/2025 | Sharpe | G06F 40/166 |
| 12,511,300 B1* | 12/2025 | Mehta | G06F 16/24578 |
| 2017/0091230 A1* | 3/2017 | Dupey | G06F 16/215 |
| 2017/0300939 A1 | 10/2017 | Chittilappilly et al. | |
| 2018/0268818 A1 | 9/2018 | Schoenmackers et al. | |
| 2019/0172045 A1 | 6/2019 | Dunjic et al. | |
| 2020/0058068 A1 | 2/2020 | Gandhi et al. | |
| 2020/0141263 A1 | 5/2020 | Tramontin et al. | |
| 2021/0027160 A1 | 1/2021 | Volkovs et al. | |
| 2021/0037040 A1 | 2/2021 | Aleks et al. | |
| 2021/0042811 A1* | 2/2021 | Lancewicki | G06F 17/16 |

(56) References Cited

U.S. PATENT DOCUMENTS

| | | |
|---|---|---|
| 2021/0049158 A1 | 2/2021 | Jiao et al. |
| 2021/0073532 A1 | 3/2021 | Torres et al. |
| 2021/0117893 A1 | 4/2021 | Sohum et al. |
| 2021/0232950 A1 | 7/2021 | Kono |
| 2021/0264461 A1 | 8/2021 | Fam |
| 2021/0407016 A1 | 12/2021 | Kuruvilla et al. |
| 2022/0058489 A1 | 2/2022 | Volkovs et al. |
| 2022/0108069 A1 | 4/2022 | Lee |
| 2022/0141263 A1 | 5/2022 | Mauer et al. |
| 2022/0157094 A1 | 5/2022 | Moghtadai et al. |
| 2022/0172083 A1 | 6/2022 | Wu et al. |
| 2022/0188705 A1 | 6/2022 | Davoodi et al. |
| 2022/0198411 A1 | 6/2022 | Jones et al. |
| 2022/0198432 A1 | 6/2022 | Jones et al. |
| 2022/0198445 A1 | 6/2022 | Jones et al. |
| 2022/0205802 A1* | 6/2022 | Keserich ................. G06N 3/09 |
| 2022/0207295 A1 | 6/2022 | Stanevich et al. |
| 2022/0207430 A1 | 6/2022 | Dickie et al. |
| 2022/0207432 A1 | 6/2022 | Whelan et al. |
| 2022/0207606 A1 | 6/2022 | Dickie et al. |
| 2022/0245060 A1 | 8/2022 | Kathuria et al. |
| 2022/0270155 A1 | 8/2022 | Volkovs et al. |
| 2022/0277213 A1 | 9/2022 | Braviner et al. |
| 2022/0277227 A1 | 9/2022 | Yu et al. |
| 2022/0277323 A1 | 9/2022 | Whelan et al. |
| 2022/0284450 A1 | 9/2022 | Asta et al. |
| 2022/0300903 A1 | 9/2022 | Huang et al. |
| 2022/0309573 A1 | 9/2022 | Mathew et al. |
| 2022/0318573 A1 | 10/2022 | Smith et al. |
| 2022/0318617 A1 | 10/2022 | Wong et al. |
| 2022/0327397 A1 | 10/2022 | Braviner et al. |
| 2022/0327430 A1 | 10/2022 | Zuberi et al. |
| 2022/0327431 A1 | 10/2022 | Braviner et al. |
| 2022/0327432 A1 | 10/2022 | Gutierrez Bugarin et al. |
| 2022/0327625 A1 | 10/2022 | Leung et al. |
| 2022/0335718 A1 | 10/2022 | Ma et al. |
| 2022/0343422 A1 | 10/2022 | Zuberi et al. |
| 2022/0366064 A1 | 11/2022 | Nikoghossian et al. |
| 2022/0383301 A1 | 12/2022 | Jones et al. |
| 2022/0383313 A1 | 12/2022 | Jones et al. |
| 2022/0383314 A1 | 12/2022 | Jones et al. |
| 2022/0405299 A1 | 12/2022 | Leung et al. |
| 2022/0414495 A1 | 12/2022 | Stanevich et al. |
| 2023/0006809 A1 | 1/2023 | Shpurov et al. |
| 2023/0007075 A1 | 1/2023 | Mcphee et al. |
| 2023/0011451 A1 | 1/2023 | Lu |
| 2023/0048437 A1 | 2/2023 | Karbasi et al. |
| 2023/0083899 A1 | 3/2023 | Gandouet et al. |
| 2023/0086653 A1 | 3/2023 | Zykh et al. |
| 2023/0107703 A1 | 4/2023 | Zhang et al. |
| 2023/0113752 A1 | 4/2023 | Jorlett et al. |
| 2023/0115321 A1 | 4/2023 | Vu et al. |
| 2023/0119108 A1 | 4/2023 | Volkovs et al. |
| 2023/0131935 A1 | 4/2023 | Volkovs et al. |
| 2023/0153461 A1 | 5/2023 | Kalra et al. |
| 2023/0186151 A1 | 6/2023 | Selim et al. |
| 2023/0195734 A1 | 6/2023 | Cashion et al. |
| 2023/0196406 A1 | 6/2023 | Gandouet et al. |
| 2023/0244917 A1 | 8/2023 | Loaiza Ganem et al. |
| 2023/0244962 A1 | 8/2023 | Volkovs et al. |
| 2023/0252301 A1 | 8/2023 | Volkovs et al. |
| 2023/0259883 A1 | 8/2023 | Misler et al. |
| 2023/0267367 A1 | 8/2023 | Volkovs et al. |
| 2023/0267475 A1 | 8/2023 | Navarro et al. |
| 2023/0306434 A1 | 9/2023 | Dunjic et al. |
| 2023/0316485 A1 | 10/2023 | Wakim et al. |
| 2023/0318994 A1 | 10/2023 | Moon et al. |
| 2023/0336615 A1 | 10/2023 | Joheb et al. |
| 2023/0342481 A1 | 10/2023 | Nikoghossian et al. |
| 2023/0344814 A1 | 10/2023 | Moon et al. |
| 2023/0351116 A1 | 11/2023 | Skaljin et al. |
| 2023/0368048 A1 | 11/2023 | Yang et al. |
| 2023/0377047 A1 | 11/2023 | Bouëttéet al. |
| 2023/0385693 A1 | 11/2023 | Cresswell et al. |
| 2023/0385694 A1 | 11/2023 | Cresswell et al. |
| 2023/0386190 A1 | 11/2023 | Cresswell et al. |
| 2023/0394452 A1 | 12/2023 | Jones et al. |
| 2023/0401192 A1 | 12/2023 | Yang et al. |
| 2023/0401553 A1 | 12/2023 | Navarro et al. |
| 2023/0401572 A1 | 12/2023 | Navarro et al. |
| 2023/0419302 A1 | 12/2023 | Navarro et al. |
| 2023/0419402 A1 | 12/2023 | Ghelichi et al. |
| 2024/0020534 A1 | 1/2024 | Perez Vallejo et al. |
| 2024/0062117 A1 | 2/2024 | Kuang et al. |
| 2024/0106851 A1 | 3/2024 | Kennedy et al. |
| 2024/0119346 A1 | 4/2024 | Chang et al. |
| 2024/0126575 A1 | 4/2024 | Kiriakou et al. |
| 2024/0127036 A1 | 4/2024 | Zuberi et al. |
| 2024/0127214 A1 | 4/2024 | Wander et al. |
| 2024/0193562 A1 | 6/2024 | Pratten et al. |
| 2024/0202756 A1 | 6/2024 | Karl et al. |
| 2024/0203405 A1 | 6/2024 | McDermid et al. |
| 2024/0211732 A1 | 6/2024 | Wander et al. |
| 2024/0212049 A1 | 6/2024 | Ghelichi et al. |
| 2024/0220653 A1 | 7/2024 | D'Agostino |
| 2024/0232614 A1 | 7/2024 | Esmaeili et al. |
| 2024/0232950 A1 | 7/2024 | Navarro et al. |
| 2024/0248963 A1 | 7/2024 | Parham et al. |
| 2024/0249310 A1 | 7/2024 | Rai et al. |
| 2024/0256903 A1 | 8/2024 | Ens et al. |
| 2024/0256904 A1 | 8/2024 | Leung et al. |
| 2024/0256968 A1 | 8/2024 | Hosseinzadeh et al. |
| 2024/0265055 A1 | 8/2024 | Purkayastha |
| 2024/0281467 A1 | 8/2024 | Volkovs et al. |
| 2024/0281808 A1 | 8/2024 | Vouitsis et al. |
| 2024/0281818 A1 | 8/2024 | Golestan Irani et al. |
| 2024/0289645 A1 | 8/2024 | Makhijani et al. |
| 2024/0289876 A1 | 8/2024 | Mathew et al. |
| 2024/0303551 A1 | 9/2024 | Li et al. |
| 2024/0304182 A1 | 9/2024 | Hamilton et al. |
| 2024/0330772 A1 | 10/2024 | Cresswell et al. |
| 2024/0330809 A1 | 10/2024 | Carvalho et al. |
| 2024/0338520 A1 | 10/2024 | Misler et al. |
| 2024/0346338 A1 | 10/2024 | Desai et al. |
| 2024/0370880 A1 | 11/2024 | Jeske et al. |
| 2024/0370881 A1 | 11/2024 | Jeske et al. |
| 2024/0385838 A1 | 11/2024 | Yu et al. |
| 2024/0386295 A1 | 11/2024 | Yu et al. |
| 2024/0386325 A1 | 11/2024 | Yu et al. |
| 2024/0386326 A1 | 11/2024 | Yu et al. |
| 2024/0386427 A1 | 11/2024 | Abbas et al. |
| 2024/0394569 A1 | 11/2024 | Farhadi Hassan Kiadeh et al. |
| 2024/0394588 A1 | 11/2024 | Heglan et al. |
| 2024/0403702 A1 | 12/2024 | Deljavan Farshi |
| 2024/0403862 A1 | 12/2024 | Abbas et al. |
| 2024/0412069 A1 | 12/2024 | Volkovs et al. |
| 2024/0412078 A1 | 12/2024 | Ghelichi et al. |
| 2024/0412083 A1 | 12/2024 | Starszyk et al. |
| 2024/0419978 A1 | 12/2024 | Stein et al. |
| 2024/0420010 A1 | 12/2024 | Cirulis et al. |
| 2024/0420011 A1 | 12/2024 | Cirulis et al. |
| 2024/0428283 A1 | 12/2024 | Belbahri et al. |
| 2025/0013363 A1 | 1/2025 | Estoesta et al. |
| 2025/0013697 A1 | 1/2025 | Estoesta et al. |
| 2025/0013927 A1 | 1/2025 | Rho et al. |
| 2025/0014010 A1 | 1/2025 | Jones et al. |
| 2025/0014052 A1 | 1/2025 | Bhattacharjee et al. |
| 2025/0028852 A1 | 1/2025 | Chowanski et al. |
| 2025/0028934 A1 | 1/2025 | Wong et al. |
| 2025/0029012 A1 | 1/2025 | Rho et al. |
| 2025/0045601 A1 | 2/2025 | Zuberi et al. |
| 2025/0053387 A1* | 2/2025 | Wang ....................... G06F 8/34 |
| 2025/0068646 A1 | 2/2025 | Rahman et al. |
| 2025/0068853 A1 | 2/2025 | Lu |
| 2025/0069063 A1 | 2/2025 | Navarro et al. |
| 2025/0077187 A1 | 3/2025 | Guttridge et al. |
| 2025/0077188 A1 | 3/2025 | Guttridge et al. |
| 2025/0077189 A1 | 3/2025 | Guttridge et al. |
| 2025/0077190 A1 | 3/2025 | Guttridge et al. |
| 2025/0077204 A1 | 3/2025 | Guttridge et al. |
| 2025/0077227 A1 | 3/2025 | Guttridge et al. |
| 2025/0077396 A1 | 3/2025 | Sen |
| 2025/0077397 A1 | 3/2025 | Sen |
| 2025/0077399 A1 | 3/2025 | Sen |

(56) References Cited

U.S. PATENT DOCUMENTS

| | | | | |
|---|---|---|---|---|
| 2025/0077400 A1 | 3/2025 | Sen | | |
| 2025/0077556 A1 | 3/2025 | Guttridge et al. | | |
| 2025/0077681 A1 | 3/2025 | Sen | | |
| 2025/0077682 A1 | 3/2025 | Guttridge et al. | | |
| 2025/0077870 A1 | 3/2025 | Mueller et al. | | |
| 2025/0077939 A1 | 3/2025 | Tabatabaei et al. | | |
| 2025/0078324 A1 | 3/2025 | Gormley | | |
| 2025/0078325 A1 | 3/2025 | Gormley | | |
| 2025/0078344 A1 | 3/2025 | Gormley | | |
| 2025/0078345 A1 | 3/2025 | Gormley | | |
| 2025/0078972 A1 | 3/2025 | Gormley | | |
| 2025/0085936 A1 | 3/2025 | Guttridge et al. | | |
| 2025/0086096 A1 | 3/2025 | Guttridge et al. | | |
| 2025/0086440 A1 | 3/2025 | Erb et al. | | |
| 2025/0086441 A1 | 3/2025 | Guttridge et al. | | |
| 2025/0086451 A1 | 3/2025 | Guttridge et al. | | |
| 2025/0086551 A1 | 3/2025 | Zhao | | |
| 2025/0094437 A1 | 3/2025 | Upendran | | |
| 2025/0103609 A1 | 3/2025 | Upendran | | |
| 2025/0103961 A1 | 3/2025 | Cresswell et al. | | |
| 2025/0103980 A1 | 3/2025 | Deljavan Farshi et al. | | |
| 2025/0104024 A1 | 3/2025 | Abbas | | |
| 2025/0104029 A1 | 3/2025 | Deljavan Farshi et al. | | |
| 2025/0104047 A1 | 3/2025 | Mashkevich | | |
| 2025/0104050 A1 | 3/2025 | Mashkevich | | |
| 2025/0104059 A1 | 3/2025 | Mashkevich | | |
| 2025/0104074 A1 | 3/2025 | Tsang et al. | | |
| 2025/0104306 A1 | 3/2025 | Mashkevich | | |
| 2025/0104700 A1 | 3/2025 | Henault-Ethier et al. | | |
| 2025/0106060 A1 | 3/2025 | Gormley et al. | | |
| 2025/0106201 A1 | 3/2025 | Gormley | | |
| 2025/0110805 A1 | 4/2025 | Starszyk et al. | | |
| 2025/0117411 A1 | 4/2025 | Mohammed | | |
| 2025/0117595 A1 | 4/2025 | Taheri | | |
| 2025/0117596 A1 | 4/2025 | Taheri | | |
| 2025/0117623 A1 | 4/2025 | Devarajan et al. | | |
| 2025/0117629 A1 | 4/2025 | Pandey et al. | | |
| 2025/0117630 A1 | 4/2025 | Taheri | | |
| 2025/0117632 A1* | 4/2025 | Kauffmann | | G06F 17/16 |
| 2025/0117769 A1 | 4/2025 | Taheri | | |
| 2025/0117836 A1 | 4/2025 | Taheri et al. | | |
| 2025/0117853 A1 | 4/2025 | Pandey et al. | | |
| 2025/0117854 A1 | 4/2025 | Pandey et al. | | |
| 2025/0117855 A1 | 4/2025 | Pandey et al. | | |
| 2025/0117856 A1 | 4/2025 | Pandey et al. | | |
| 2025/0119396 A1 | 4/2025 | Taheri | | |
| 2025/0119494 A1 | 4/2025 | Pandey et al. | | |
| 2025/0119495 A1 | 4/2025 | Pandey et al. | | |
| 2025/0124039 A1 | 4/2025 | Cashion et al. | | |
| 2025/0124220 A1 | 4/2025 | Yu et al. | | |
| 2025/0124240 A1 | 4/2025 | Luo et al. | | |
| 2025/0131718 A1 | 4/2025 | Ma et al. | | |
| 2025/0138838 A1 | 5/2025 | Ramesh et al. | | |
| 2025/0139267 A1 | 5/2025 | Zykh et al. | | |
| 2025/0139382 A1 | 5/2025 | Mohammed et al. | | |
| 2025/0139708 A1 | 5/2025 | Bouëttéet al. | | |
| 2025/0147733 A1 | 5/2025 | Abbas et al. | | |
| 2025/0148321 A1 | 5/2025 | Stanevich et al. | | |
| 2025/0165375 A1 | 5/2025 | Cresswell et al. | | |
| 2025/0165535 A1* | 5/2025 | Tow | | G06F 16/906 |
| 2025/0165866 A1 | 5/2025 | Cresswell et al. | | |
| 2025/0173170 A1 | 5/2025 | Glynn-Udrow et al. | | |
| 2025/0173568 A1 | 5/2025 | Cresswell et al. | | |
| 2025/0173618 A1 | 5/2025 | Cresswell et al. | | |
| 2025/0173619 A1 | 5/2025 | Cresswell et al. | | |
| 2025/0173725 A1 | 5/2025 | Devarajan et al. | | |
| 2025/0181321 A1 | 6/2025 | Gormley | | |
| 2025/0182028 A1 | 6/2025 | Gormley | | |
| 2025/0182196 A1 | 6/2025 | Gormley | | |
| 2025/0182222 A1 | 6/2025 | Gormley | | |
| 2025/0190459 A1 | 6/2025 | Conway et al. | | |
| 2025/0191062 A1 | 6/2025 | Heglin et al. | | |
| 2025/0217175 A1 | 7/2025 | Karbasi et al. | | |
| 2025/0225314 A1* | 7/2025 | Sharpe | | G06F 40/166 |
| 2025/0225560 A1 | 7/2025 | Bajaj et al. | | |
| 2025/0231668 A1 | 7/2025 | Tao et al. | | |
| 2025/0231750 A1 | 7/2025 | Lim et al. | | |
| 2025/0231774 A1 | 7/2025 | Tao et al. | | |
| 2025/0231775 A1 | 7/2025 | Tao et al. | | |
| 2025/0231793 A1 | 7/2025 | Lim et al. | | |
| 2025/0232130 A1 | 7/2025 | Tao et al. | | |
| 2025/0232351 A1 | 7/2025 | Tao et al. | | |
| 2025/0232375 A1 | 7/2025 | Tao et al. | | |
| 2025/0232376 A1 | 7/2025 | Tao et al. | | |
| 2025/0232377 A1 | 7/2025 | Tao et al. | | |
| 2025/0232503 A1 | 7/2025 | Lim et al. | | |
| 2025/0238536 A1 | 7/2025 | Nikoghossian et al. | | |
| 2025/0245071 A1 | 7/2025 | Ionescu et al. | | |
| 2025/0245511 A1 | 7/2025 | D'Agostino et al. | | |
| 2025/0258814 A1 | 8/2025 | Tiwari et al. | | |
| 2025/0259070 A1* | 8/2025 | Kauffmann | | G06N 3/0475 |
| 2025/0265249 A1 | 8/2025 | Buniatyan | | |
| 2025/0272695 A1* | 8/2025 | Kaddoura | | G06Q 30/018 |
| 2025/0291780 A1 | 9/2025 | Bodenstab et al. | | |
| 2025/0298798 A1 | 9/2025 | Kane | | |
| 2025/0384021 A1* | 12/2025 | Thomas | | G06F 16/2237 |
| 2025/0384053 A1* | 12/2025 | Thomas | | G06F 16/248 |
| 2025/0384246 A1* | 12/2025 | Thomas | | G06N 3/0455 |

OTHER PUBLICATIONS

A Dual Embedding Space Model for Document Ranking (Year: 2016).*

Heglin et al., "Auto-Adjudication Process via Machine Learning," U.S. Appl. No. 19/053,942, filed Feb. 14, 2025.

Thomas et al., "Weighted Retrieval for in-Context Tabular Model," U.S. Appl. No. 18/817,402, filed Aug. 28, 2024.

Chang et al., "Classifier Guided Cluster Density Reduction," U.S. Appl. No. 18/817,329, filed Aug. 28, 2024.

Cresswell et al., "Efficient Scaling of Artificial Intelligence Models," U.S. Appl. No. 18/934,321, filed Nov. 1, 2024.

Cresswell et al., "Scaling Artificial Intelligence Models With Gradient Boosting," U.S. Appl. No. 18/934,282, filed Nov. 1, 2024.

Gofman et al., "Recommendation Process for Retrieval-Augmented Generation (RAG) Models," U.S. Appl. No. 18/817,519, filed Aug. 28, 2024.

Meyer et al., "Automated Data Validation Recommendations to Enhance Reliability of Artificial Intelligence," U.S. Appl. No. 18/813,254, filed Aug. 23, 2024.

Meyer et al., "Enhancing Reliability of Artificial Intelligence Operational Pipelines," U.S. Appl. No. 18/813,238, filed Aug. 23, 2024.

Meyer et al., "Reducing Computation Time in Data Revalidation in Artificial Intelligence Operational Pipelines," U.S. Appl. No. 18/813,270, filed Aug. 23, 2024.

Meyer et al., "Tokenized Data Validation in Artificial Intelligence Operational Pipelines," U.S. Appl. No. 18/813,557, filed Aug. 23, 2024.

Starsyk et al., "Optimization of Processing Core Assignment for Software Using Runtime Attributes," U.S. Appl. No. 18/813,577, filed Aug. 23, 2024.

Starszyk et al., "Automated Component Deployment Recommendations for Artificial Intelligence Production Pipeline Orchestration," U.S. Appl. No. 18/817,285, filed Aug. 28, 2024.

Starszyk et al., "Automated Efficiency Determination of Components Prior to Deployment to Artificial Intelligence Production Pipeline," U.S. Appl. No. 18/817,290, filed Aug. 28, 2024.

Starszyk et al., "Dynamic Determination of Host Location for Logging System of Artificial Intelligence Pipelines," U.S. Appl. No. 18/813,626, filed Aug. 23, 2024.

Starszyk et al., "Fault Tolerant Logging for Artificial Intelligence Applications," U.S. Appl. No. 18/813,641, filed Aug. 23, 2024.

Starszyk et al., "Optimizer for Processing Core Affinity," U.S. Appl. No. 18/813,594, filed Aug. 23, 2024.

Starszyk et al., "Recruitment of Software Program to Optimal Cores," U.S. Appl. No. 18/813,608, filed Aug. 23, 2024.

Thomas et al., "Context Retrieval for in-Context Learning Model," U.S. Appl. No. 18/817,408, filed Aug. 28, 2024.

(56)    References Cited

OTHER PUBLICATIONS

Thomas et al., "Nearest Neighbor Retrieval and Fine-Tuning for in-Context Learning Model," U.S. Appl. No. 18/817,505, filed Aug. 28, 2024.
Thomas et al., "Tabular Selection Based on Dimensionality of Memory of Artificial Intelligence Model," U.S. Appl. No. 18/817,371, filed Aug. 28, 2024.
Zhu et al., "Tabular Few-Shot Generalization Across Heterogeneous Feature Spaces", Nov. 2023 (Year: 2023).

* cited by examiner

Figure 1B:
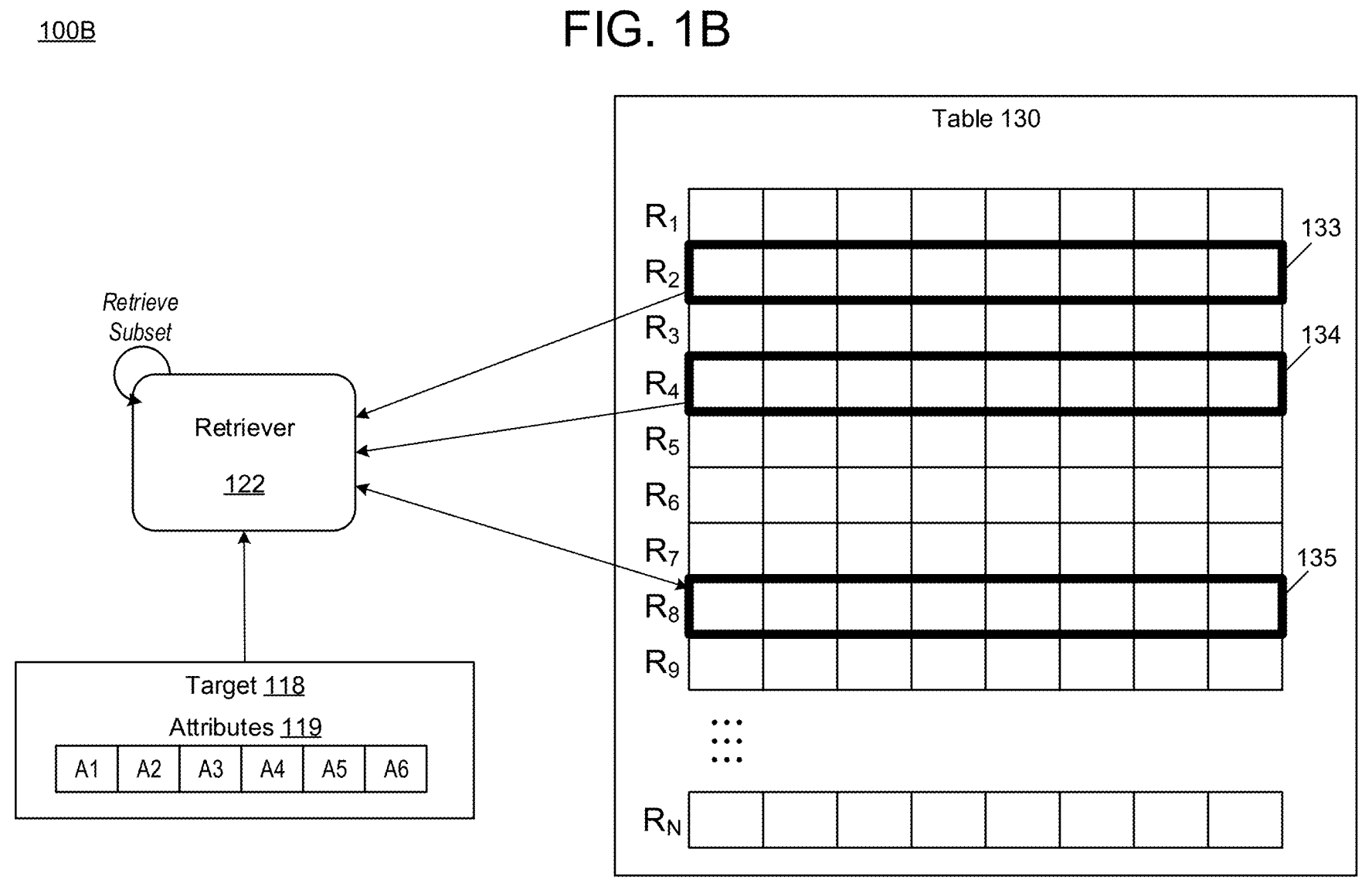

Table 130

| | | | | | | | |
|---|---|---|---|---|---|---|---|
| R₁ | | | | | | | |
| R₂ | | | | | | | | ← 133
| R₃ | | | | | | | |
| R₄ | | | | | | | | ← 134
| R₅ | | | | | | | |
| R₆ | | | | | | | |
| R₇ | | | | | | | |
| R₈ | | | | | | | | ← 135
| R₉ | | | | | | | |
| ⋮ | | | | | | | |
| Rₙ | | | | | | | |

Retriever
122

Retrieve Subset

Target 118
Attributes 119

| A1 | A2 | A3 | A4 | A5 | A6 |
|----|----|----|----|----|----|

Figure 5B:
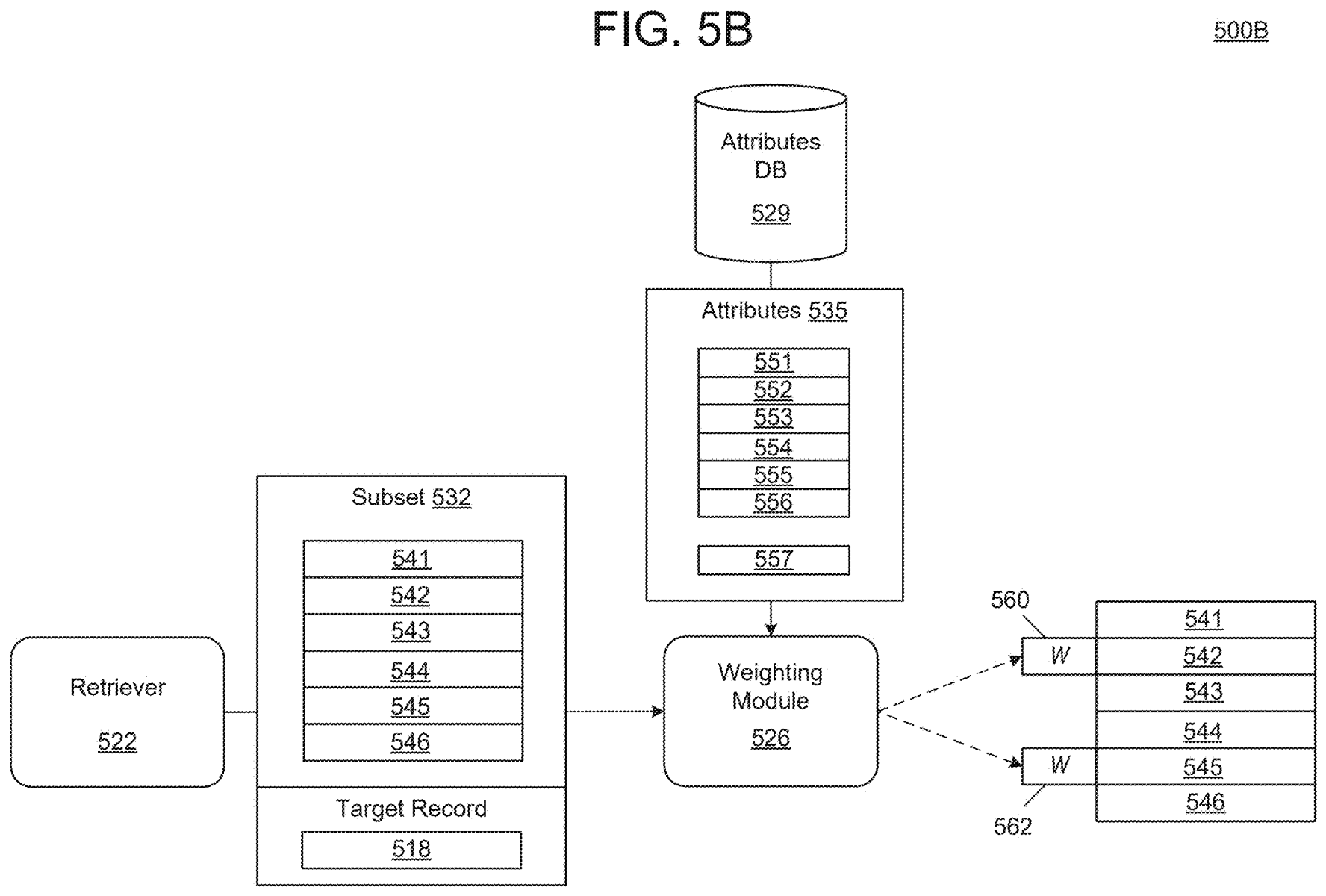

Attributes DB
529

Attributes 535

| | | | | | |
|---|---|---|---|---|---|
| 551 | 552 | 553 | 554 | 555 | 556 |

557

Weighting Module
526

541
542
543
544
545
546

560 — W

562 — W

Subset 532

541
542
543
544
545
546

Target Record
518

Retriever
522

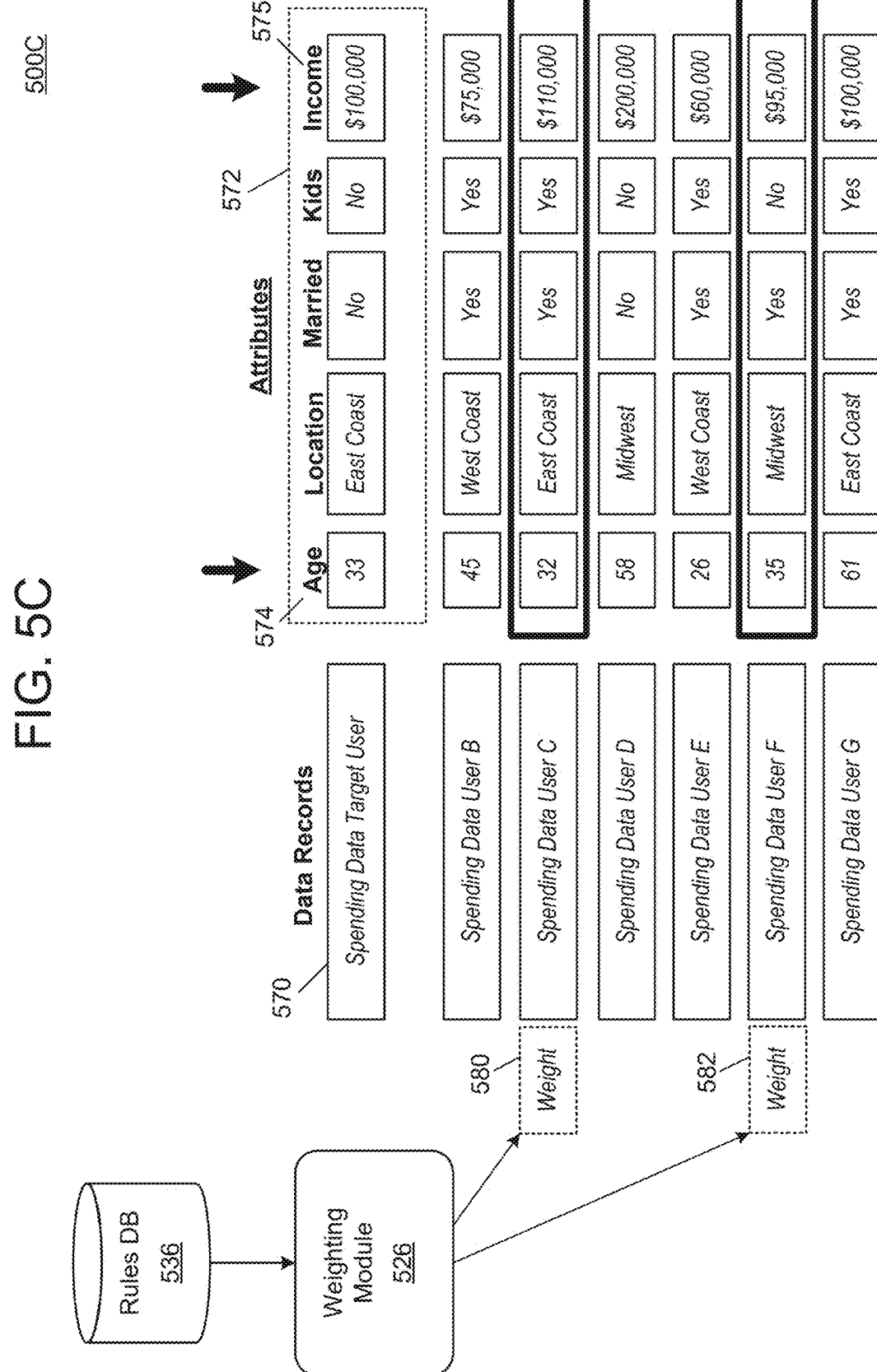

| Data Records | Age | Location | Married | Kids | Income |
|---|---|---|---|---|---|
| Spending Data Target User | 33 | East Coast | No | No | $100,000 |
| Spending Data User B | 45 | West Coast | Yes | Yes | $75,000 |
| Spending Data User C | 32 | East Coast | Yes | Yes | $110,000 |
| Spending Data User D | 58 | Midwest | No | No | $200,000 |
| Spending Data User E | 26 | West Coast | Yes | Yes | $60,000 |
| Spending Data User F | 35 | Midwest | Yes | No | $95,000 |
| Spending Data User G | 61 | East Coast | Yes | Yes | $100,000 |

Attributes 570, 572, 574, 575, 576, 577

Rules DB 536

Weighting Module 526

580 Weight

582 Weight

600C

700                 FIG. 7A
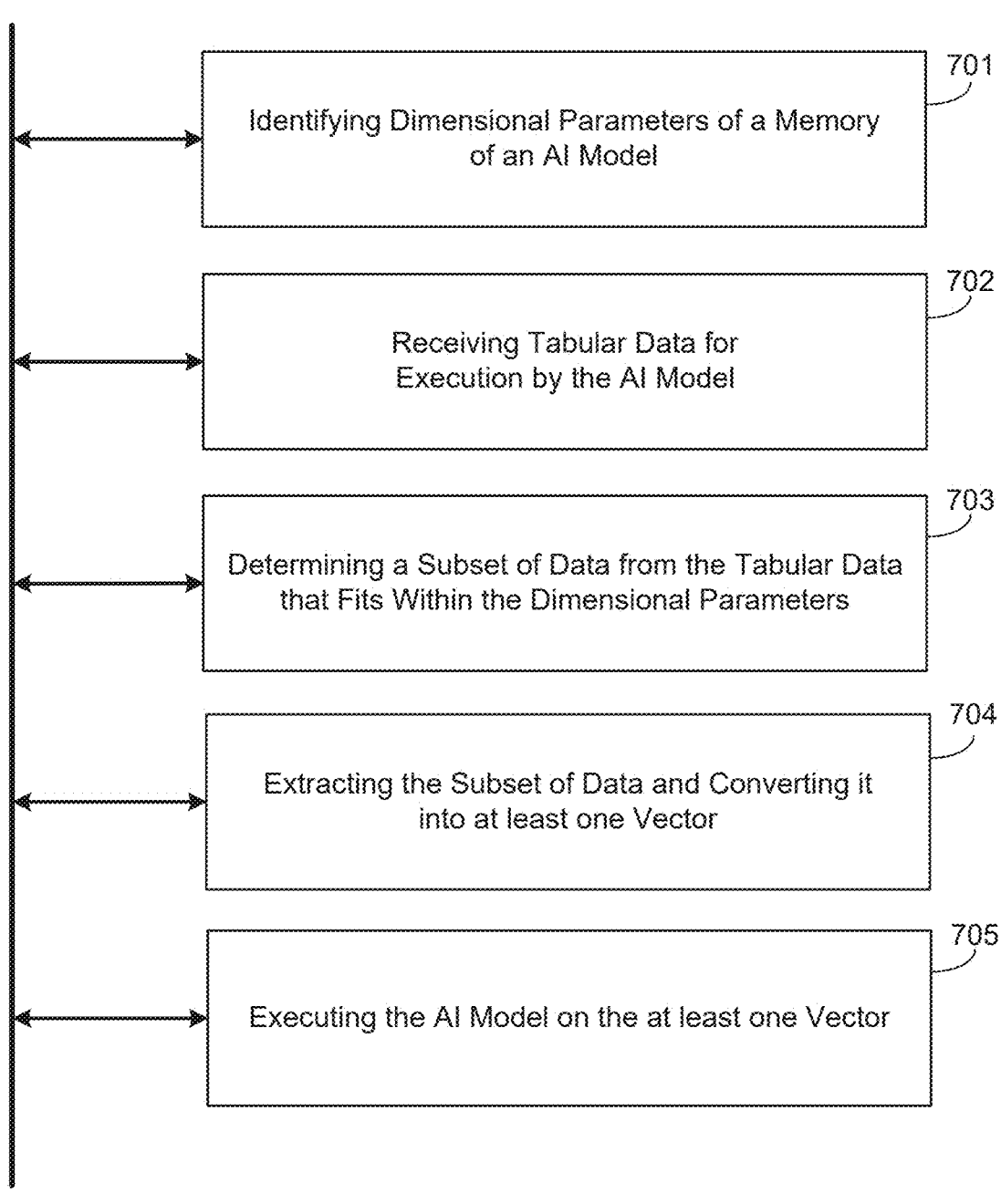
701
Identifying Dimensional Parameters of a Memory
of an AI Model
702
Receiving Tabular Data for
Execution by the AI Model
703
Determining a Subset of Data from the Tabular Data
that Fits Within the Dimensional Parameters
704
Extracting the Subset of Data and Converting it
into at least one Vector
705
Executing the AI Model on the at least one Vector

710    FIG. 7B

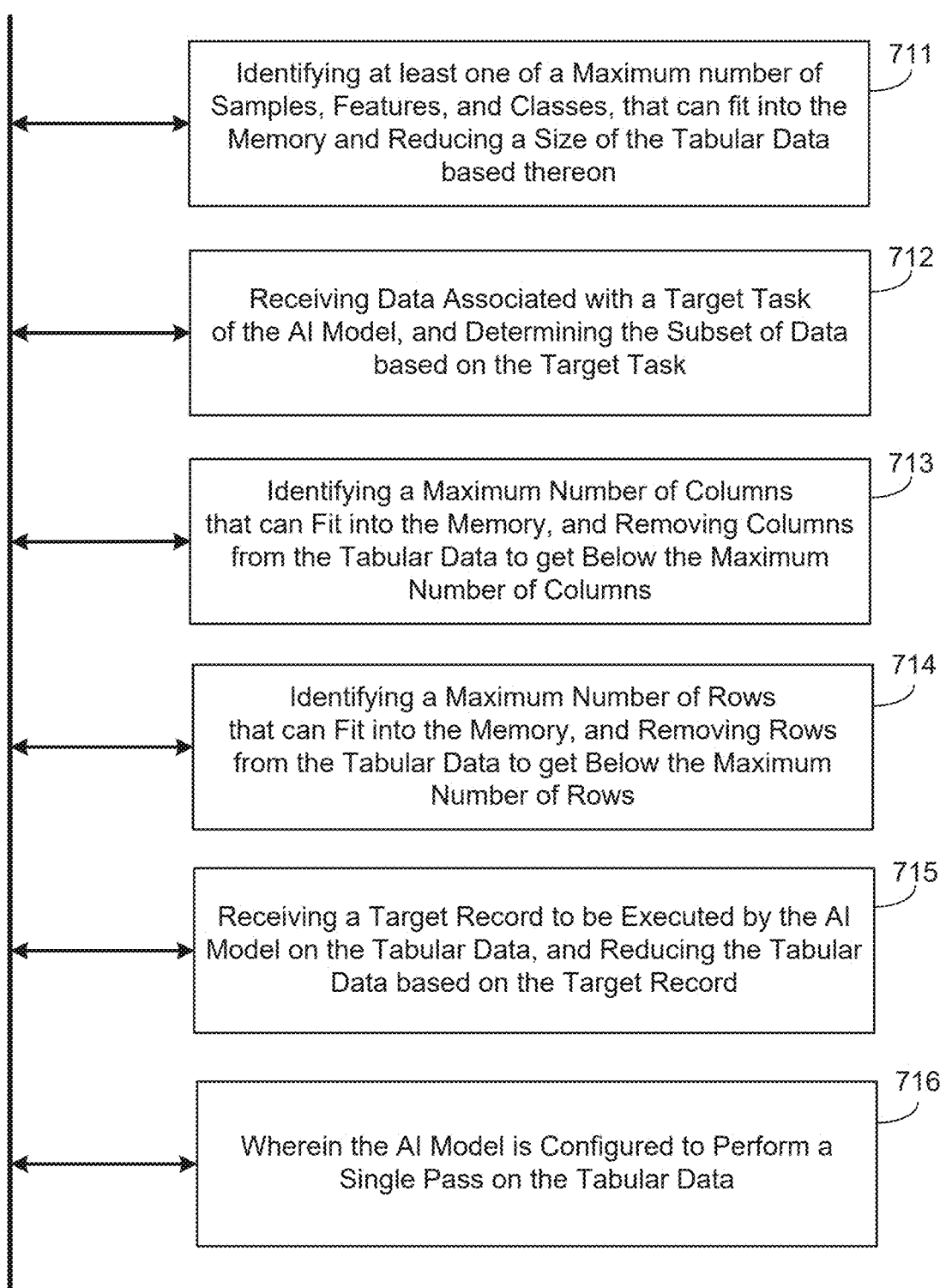

Identifying at least one of a Maximum number of Samples, Features, and Classes, that can fit into the Memory and Reducing a Size of the Tabular Data based thereon    711

Receiving Data Associated with a Target Task of the AI Model, and Determining the Subset of Data based on the Target Task    712

Identifying a Maximum Number of Columns that can Fit into the Memory, and Removing Columns from the Tabular Data to get Below the Maximum Number of Columns    713

Identifying a Maximum Number of Rows that can Fit into the Memory, and Removing Rows from the Tabular Data to get Below the Maximum Number of Rows    714

Receiving a Target Record to be Executed by the AI Model on the Tabular Data, and Reducing the Tabular Data based on the Target Record    715

Wherein the AI Model is Configured to Perform a Single Pass on the Tabular Data    716

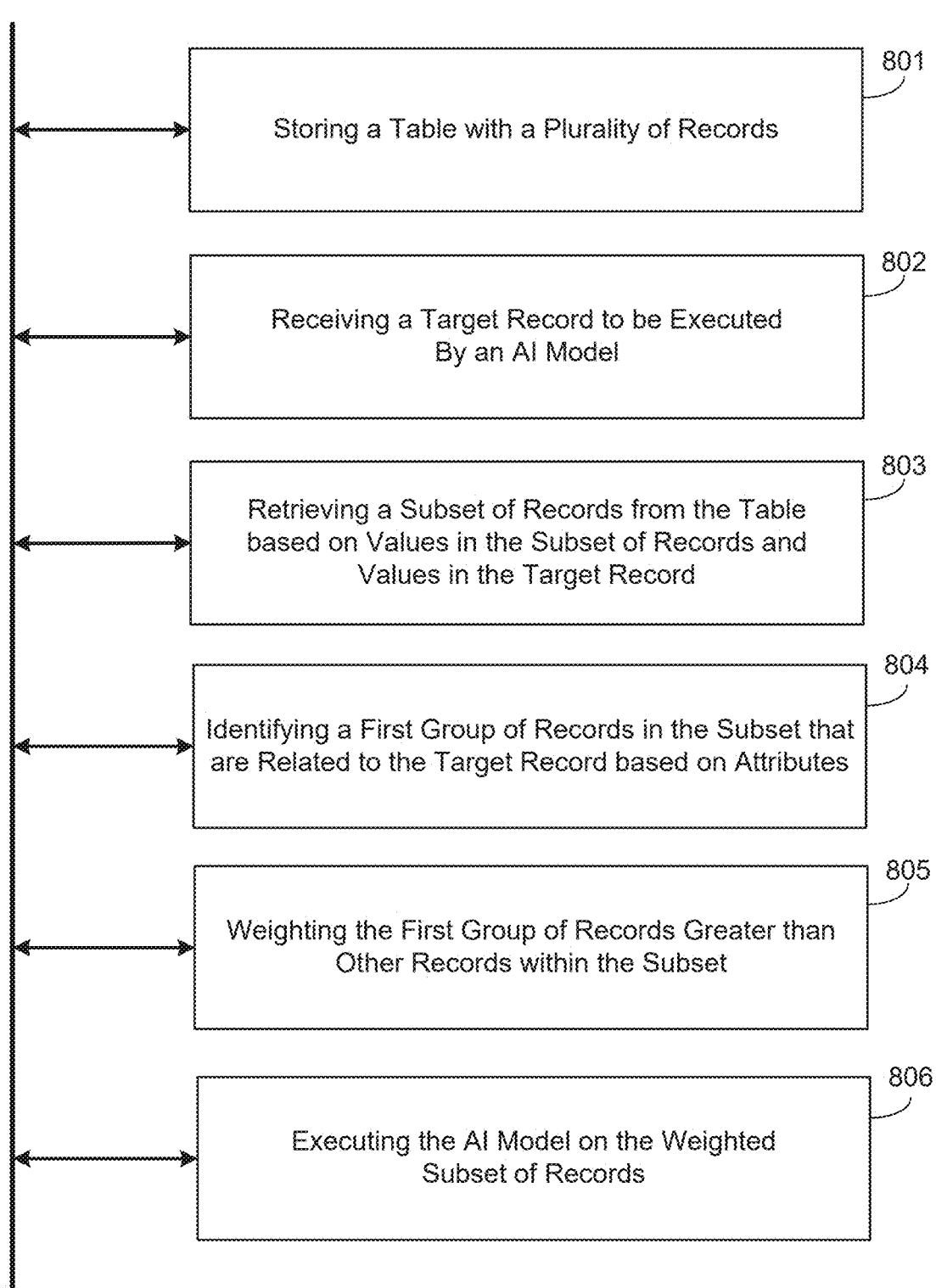

801

Storing a Table with a Plurality of Records

802

Receiving a Target Record to be Executed
By an AI Model

803

Retrieving a Subset of Records from the Table
based on Values in the Subset of Records and
Values in the Target Record

804

Identifying a First Group of Records in the Subset that
are Related to the Target Record based on Attributes

805

Weighting the First Group of Records Greater than
Other Records within the Subset

806

Executing the AI Model on the Weighted
Subset of Records

810                                    FIG. 8B

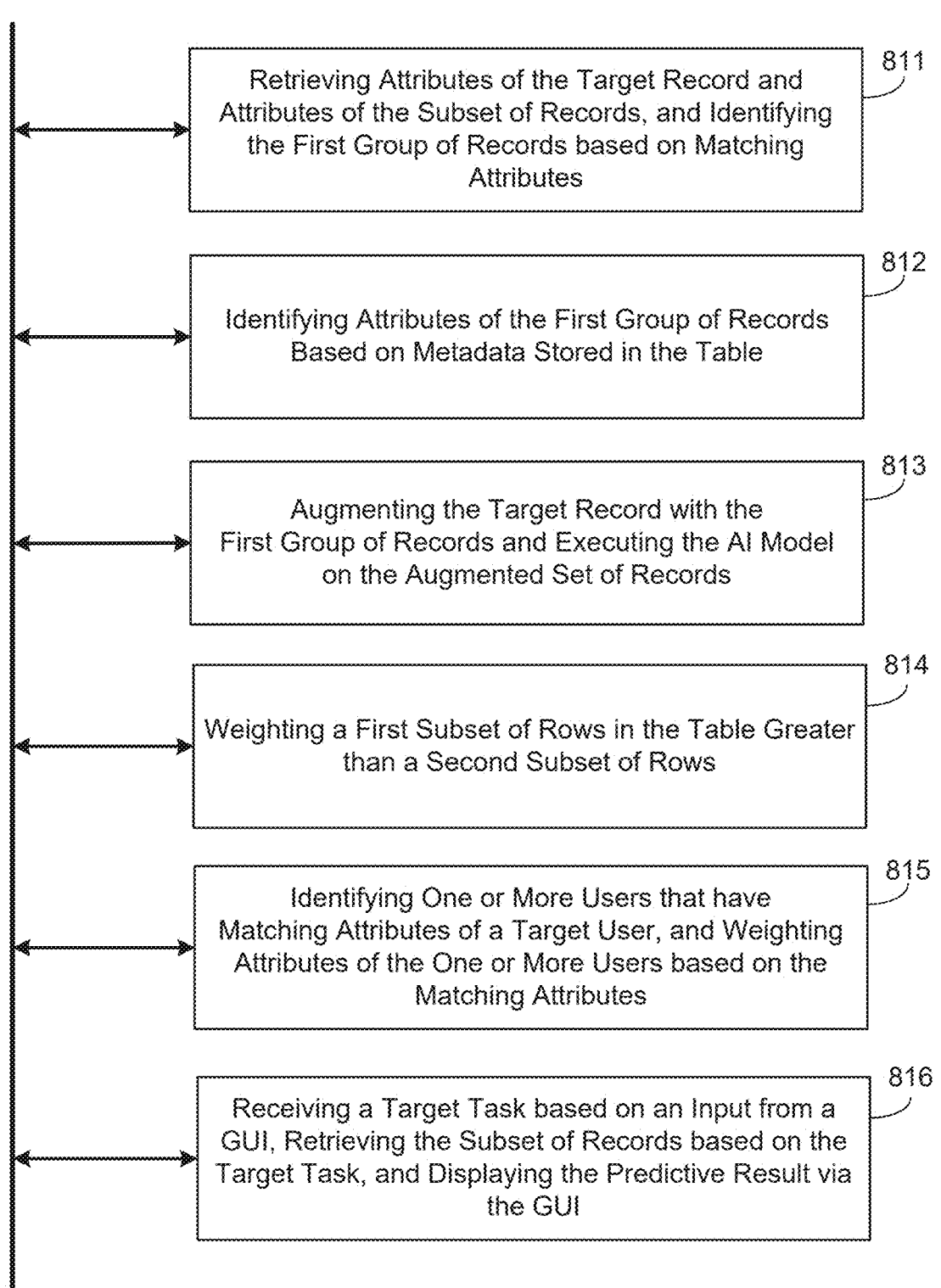

Retrieving Attributes of the Target Record and Attributes of the Subset of Records, and Identifying the First Group of Records based on Matching Attributes — 811

Identifying Attributes of the First Group of Records Based on Metadata Stored in the Table — 812

Augmenting the Target Record with the First Group of Records and Executing the AI Model on the Augmented Set of Records — 813

Weighting a First Subset of Rows in the Table Greater than a Second Subset of Rows — 814

Identifying One or More Users that have Matching Attributes of a Target User, and Weighting Attributes of the One or More Users based on the Matching Attributes — 815

Receiving a Target Task based on an Input from a GUI, Retrieving the Subset of Records based on the Target Task, and Displaying the Predictive Result via the GUI — 816

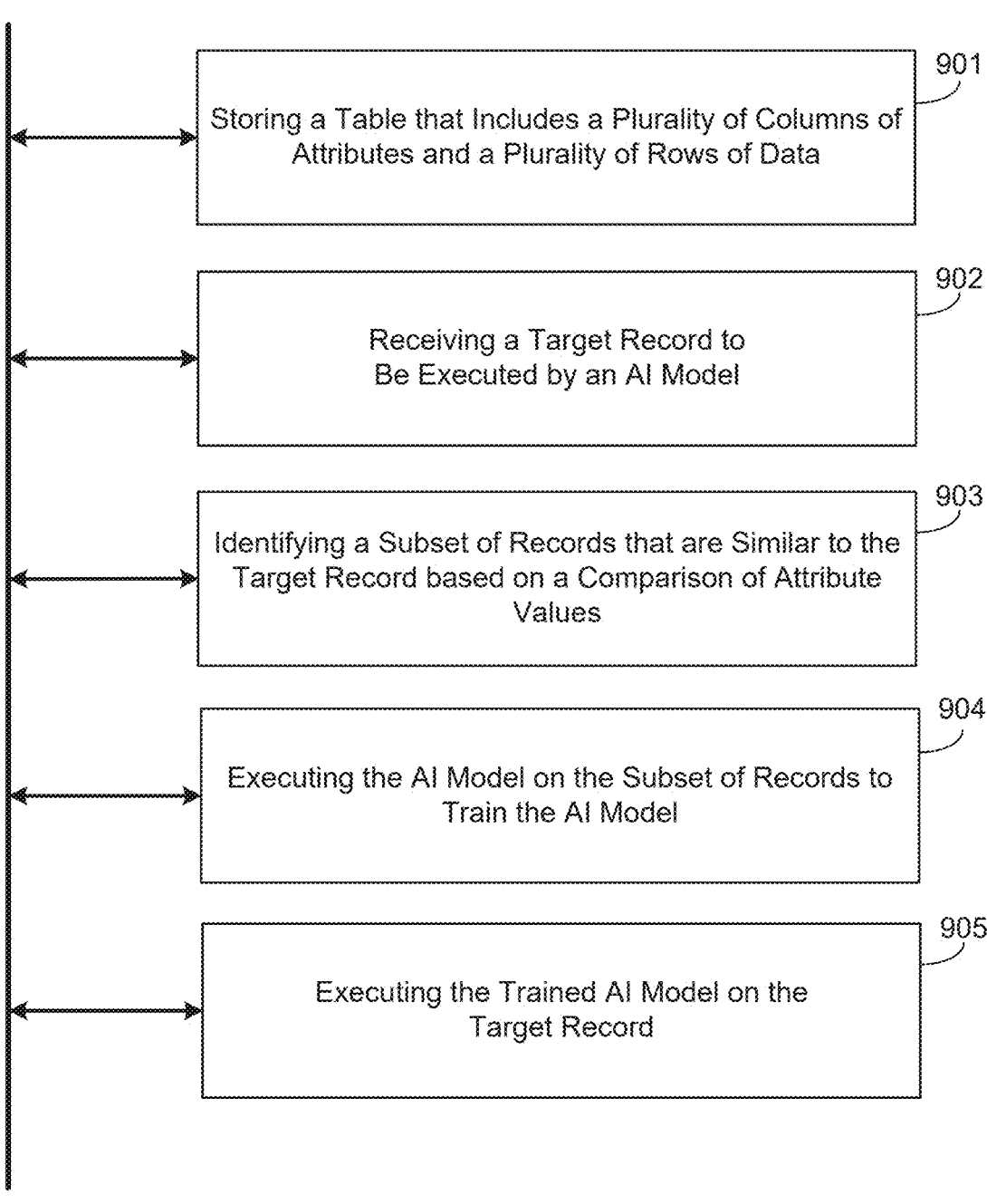

901

Storing a Table that Includes a Plurality of Columns of Attributes and a Plurality of Rows of Data

902

Receiving a Target Record to Be Executed by an AI Model

903

Identifying a Subset of Records that are Similar to the Target Record based on a Comparison of Attribute Values

904

Executing the AI Model on the Subset of Records to Train the AI Model

905

Executing the Trained AI Model on the Target Record

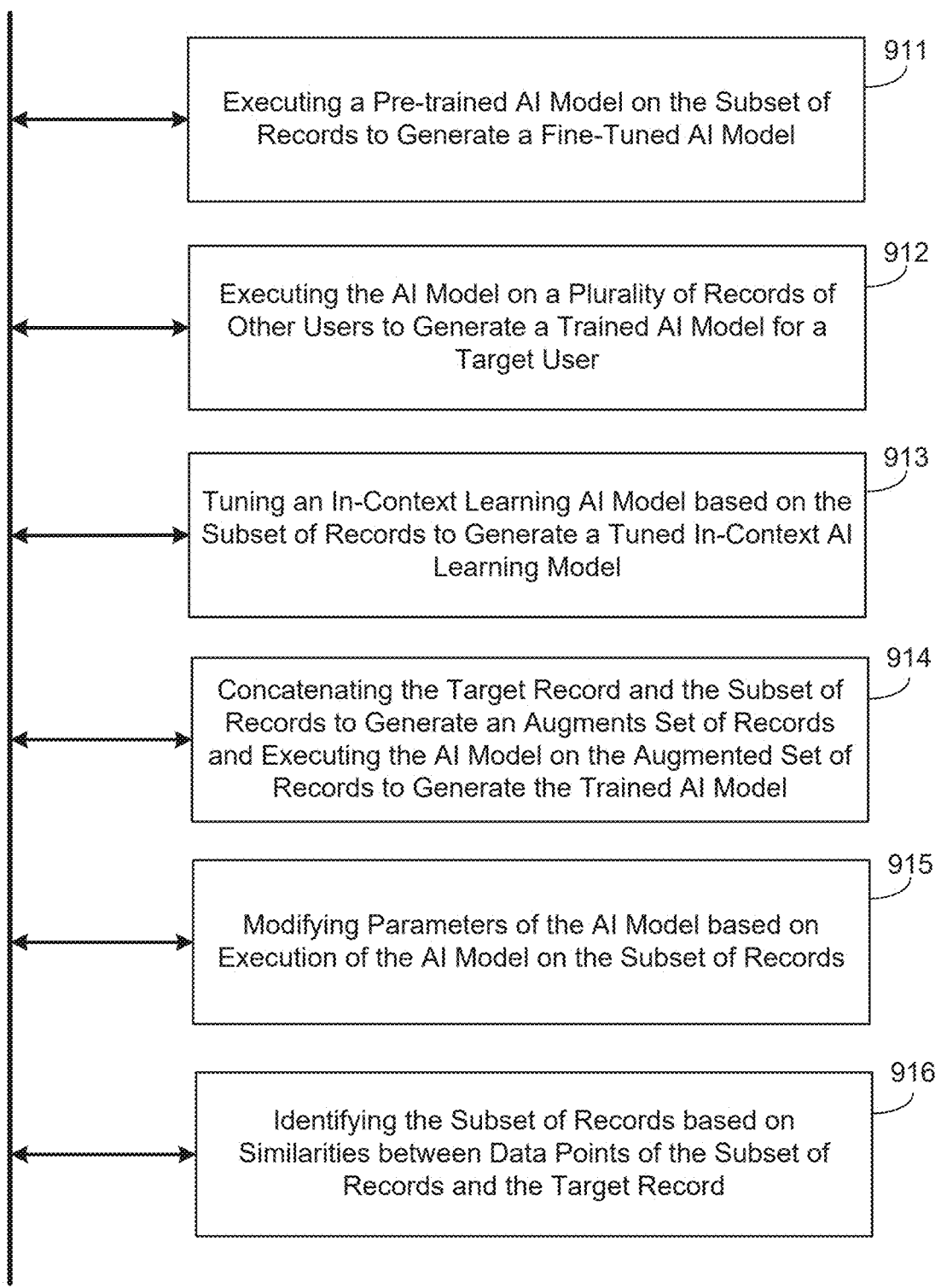

911
Executing a Pre-trained AI Model on the Subset of Records to Generate a Fine-Tuned AI Model 912
Executing the AI Model on a Plurality of Records of Other Users to Generate a Trained AI Model for a Target User 913
Tuning an In-Context Learning AI Model based on the Subset of Records to Generate a Tuned In-Context AI Learning Model 914
Concatenating the Target Record and the Subset of Records to Generate an Augments Set of Records and Executing the AI Model on the Augmented Set of Records to Generate the Trained AI Model 915
Modifying Parameters of the AI Model based on Execution of the AI Model on the Subset of Records 916
Identifying the Subset of Records based on Similarities between Data Points of the Subset of Records and the Target Record

1000                                    FIG. 10A

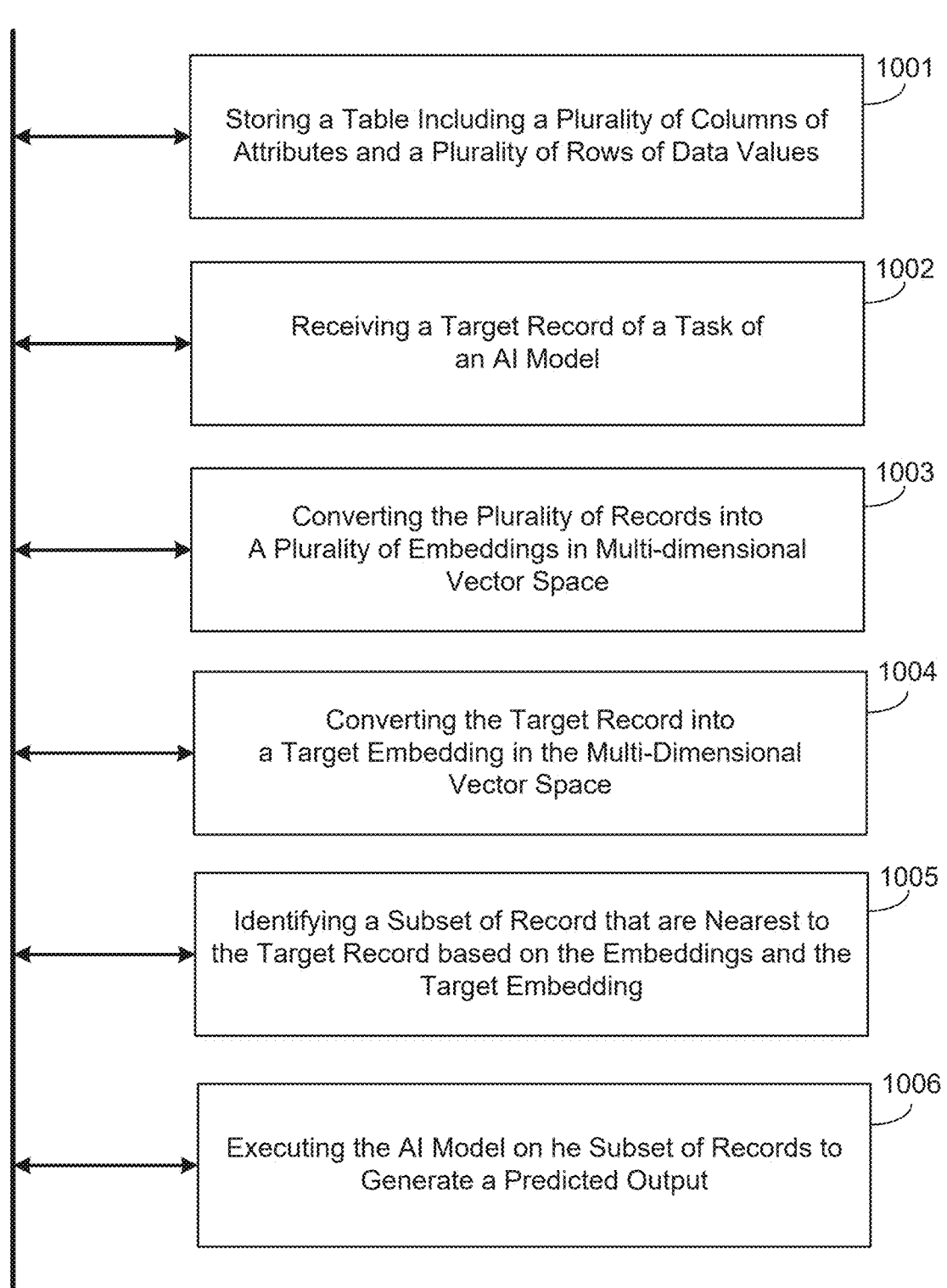

1001
Storing a Table Including a Plurality of Columns of
Attributes and a Plurality of Rows of Data Values 1002
Receiving a Target Record of a Task of
an AI Model 1003
Converting the Plurality of Records into
A Plurality of Embeddings in Multi-dimensional
Vector Space 1004
Converting the Target Record into
a Target Embedding in the Multi-Dimensional
Vector Space 1005
Identifying a Subset of Record that are Nearest to
the Target Record based on the Embeddings and the
Target Embedding 1006
Executing the AI Model on he Subset of Records to
Generate a Predicted Output

1010        FIG. 10B

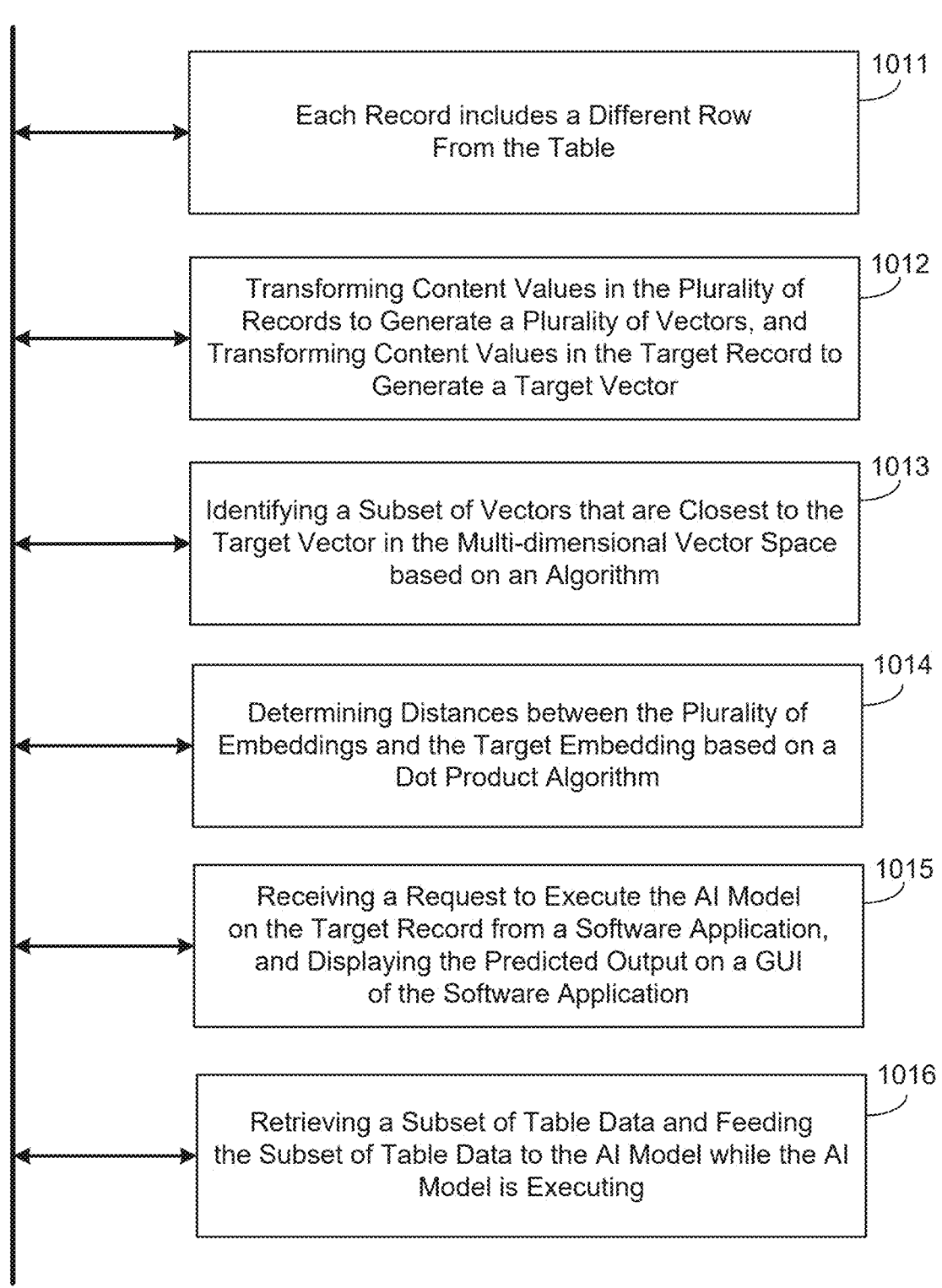

1011

Each Record includes a Different Row
From the Table

1012

Transforming Content Values in the Plurality of
Records to Generate a Plurality of Vectors, and
Transforming Content Values in the Target Record to
Generate a Target Vector

1013

Identifying a Subset of Vectors that are Closest to the
Target Vector in the Multi-dimensional Vector Space
based on an Algorithm

1014

Determining Distances between the Plurality of
Embeddings and the Target Embedding based on a
Dot Product Algorithm

1015

Receiving a Request to Execute the AI Model
on the Target Record from a Software Application,
and Displaying the Predicted Output on a GUI
of the Software Application

1016

Retrieving a Subset of Table Data and Feeding
the Subset of Table Data to the AI Model while the AI
Model is Executing

1100

WEIGHTED RETRIEVAL FOR IN-CONTEXT TABULAR MODEL

BACKGROUND

TabPFN is a type of neural network (transformer) that is trained to generate predictions from tabular data. The term "PFN" stands for prior-data fitted network. The TabPFN mode may be trained offline once, to approximate Bayesian inference on synthetic data sets. That is, TabPFN is an in-context learning (ICL) model that is pre-trained on synthetic data to perform tabular data classification. Some of the benefits of a TabPFN model include eliminating hyperparameter tuning, processing input data efficiently (e.g., generating an output in just a few seconds, etc.), and providing accurate predictions in a single forward pass. However, one of the drawbacks of the TabPFN model is the limited size of its memory which limits how much input data can be used during the single forward pass. In some cases, tabular data is much larger than the memory of the TabPFN model.

SUMMARY

One example embodiment provides an apparatus that includes a memory that stores an artificial intelligence (AI) model and which is communicably coupled to a processor, wherein the processor may perform one or more of identify dimensional parameters of the memory of the AI model, receive tabular data for execution by the AI model, determine a subset of data from within the tabular data that fits within the dimensional parameters of the memory, extract the subset of data from the tabular data and converting the subset of data into at least one vector, and execute the AI model on the subset of data to generate a predictive result.

Another example embodiment provides a method that includes one or more of identifying dimensional parameters of a memory of an artificial intelligence (AI) model, receiving tabular data for execution by the AI model, determining a subset of data from within the tabular data that fits within the dimensional parameters of the memory, extracting the subset of data from the tabular data and converting the subset of data into at least one vector, and executing the AI model on the subset of data to generate a predictive result.

A further example embodiment provides a computer readable storage medium comprising instructions, that when read by a processor, cause the processor to perform one or more of identifying dimensional parameters of a memory of an artificial intelligence (AI) model, receiving tabular data for execution by the AI model, determining a subset of data from within the tabular data that fits within the dimensional parameters of the memory, extracting the subset of data from the tabular data and converting the subset of data into at least one vector, and executing the AI model on the subset of data to generate a predictive result.

One example embodiment provides an apparatus that includes a memory that stores an artificial intelligence (AI) model and which is communicably coupled to a processor, wherein the processor may perform one or more of store a table comprising a plurality of records, receive a target record to be executed by the AI model to perform a task, retrieve a subset of records from the plurality of records within the table based on content values in the target record and corresponding content values in the subset of records, identify a first group of records among the subset of records that are related to the target record based on attributes associated with the target record and attributes associated with the first group of records, weight the first group of records greater than other records within the subset of records to generate a weighted subset of records, and execute the AI model on the weighted subset of records to generate a predictive result.

Another example embodiment provides a method that includes one or more of storing a table comprising a plurality of records, receiving a target record to be executed by an artificial intelligence (AI) model to perform a task, retrieving a subset of records from the plurality of records within the table based on content values in the target record and corresponding content values in the subset of records, identifying a first group of records among the subset of records that are related to the target record based on attributes associated with the target record and attributes associated with the first group of records, weighting the first group of records greater than other records within the subset of records to generate a weighted subset of records, and executing the AI model on the weighted subset of records to generate a predictive result.

A further example embodiment provides a computer readable storage medium comprising instructions, that when read by a processor, cause the processor to perform one or more of storing a table comprising a plurality of records, receiving a target record to be executed by an artificial intelligence (AI) model to perform a task, retrieving a subset of records from the plurality of records within the table based on content values in the target record and corresponding content values in the subset of records, identifying a first group of records among the subset of records that are related to the target record based on attributes associated with the target record and attributes associated with the first group of records, weighting the first group of records greater than other records within the subset of records to generate a weighted subset of records, and executing the AI model on the weighted subset of records to generate a predictive result.

One example embodiment provides an apparatus that includes a memory that stores an artificial intelligence (AI) model and which is communicably coupled to a processor, wherein the processor may perform one or more of store a table comprising a plurality of columns corresponding to a plurality of attributes and a plurality of rows of data corresponding to a plurality of records, receive a target record to be executed by the AI model, identify a subset of records in the table that are similar to the target record based on a comparison of attribute values within the subset of records to corresponding attribute values within the target record, execute the AI model on the subset of records to generate a trained AI model, and execute the trained AI model on the target record to generate a predicted result for the target record.

Another example embodiment provides a method that includes one or more of storing a table comprising a plurality of columns corresponding to a plurality of attributes and a plurality of rows of data corresponding to a plurality of records, receiving a target record to be executed by an artificial intelligence (AI) model, identifying a subset of records in the table that are similar to the target record based on a comparison of attribute values within the subset of records to corresponding attribute values within the target record, executing the AI model on the subset of records to generate a trained AI model, and executing the trained AI model on the target record to generate a predicted result for the target record.

A further example embodiment provides a computer readable storage medium comprising instructions, that when read by a processor, cause the processor to perform one or more of storing a table comprising a plurality of columns corresponding to a plurality of attributes and a plurality of rows of data corresponding to a plurality of records, receiving a target record to be executed by an artificial intelligence (AI) model, identifying a subset of records in the table that are similar to the target record based on a comparison of attribute values within the subset of records to corresponding attribute values within the target record, executing the AI model on the subset of records to generate a trained AI model, and executing the trained AI model on the target record to generate a predicted result for the target record.

One example embodiment provides an apparatus that includes a memory that stores an artificial intelligence (AI) model and which is communicably coupled to a processor, wherein the processor may perform one or more of store a table comprising a plurality of columns corresponding to a plurality of attributes and a plurality of rows corresponding to a plurality of records, receive a target record of a task of the AI model, convert the plurality of records into a plurality of embeddings in multi-dimensional vector space, convert the target record into a target embedding in the multi-dimensional vector space, identify a subset of records from among the plurality of records that are nearest to the target record in content based on distances between embeddings of the subset of records and the target embedding within the multi-dimensional vector space, and execute the AI model on the subset of records to generate a predicted output with respect to the task.

Another example embodiment provides a method that includes one or more of storing a table comprising a plurality of columns corresponding to a plurality of attributes and a plurality of rows corresponding to a plurality of records, receiving a target record of a task of an artificial intelligence (AI) model, converting the plurality of records into a plurality of embeddings in multi-dimensional vector space, converting the target record into a target embedding in the multi-dimensional vector space, identifying a subset of records from among the plurality of records that are nearest to the target record in content based on distances between embeddings of the subset of records and the target embedding within the multi-dimensional vector space, and executing the AI model on the subset of records to generate a predicted output with respect to the task.

A further example embodiment provides a computer readable storage medium comprising instructions, that when read by a processor, cause the processor to perform one or more of storing a table comprising a plurality of columns corresponding to a plurality of attributes and a plurality of rows corresponding to a plurality of records, receiving a target record of a task of an artificial intelligence (AI) model, converting the plurality of records into a plurality of embeddings in multi-dimensional vector space, converting the target record into a target embedding in the multi-dimensional vector space, identifying a subset of records from among the plurality of records that are nearest to the target record in content based on distances between embeddings of the subset of records and the target embedding within the multi-dimensional vector space, and executing the AI model on the subset of records to generate a predicted output with respect to the task.

BRIEF DESCRIPTION OF DRAWINGS

FIGS. 1A-1B are diagrams illustrating a system for retrieving a subset of tabular data for input to an AI model according to examples and features of the instant solution.

FIGS. 5A-5C are diagrams illustrating a process of adding weights to tabular data prior to executing the tabular data with an AI model according to examples and features of the instant solution.

FIGS. 7A-7B are diagrams illustrating a method of selecting table data based on a dimensionality of a memory of an AI model according to examples and features of the instant solution.

FIGS. 8A-8B are diagrams illustrating a method of weighting a subset of table data prior to input to an AI Model according to examples and features of the instant solution.

FIGS. 9A-9B are diagrams illustrating a method of retrieving a subset of table data for input to an AI model based on context according to examples and features of the instant solution.

FIGS. 10A-10B are diagrams illustrating a method of identifying nearest neighbors from table data according to examples and features of the instant solution.

DETAILED DESCRIPTION

The instant solution pertains to in-context learning on computer systems, hosted compute infrastructure, Central Processing Units (CPU), Graphics Processing Units (GPU), Neural Processing Units (NPU), Tensor Processing Units (TPU), other processing units, embedded computer systems, computer networks, wired and wireless compute devices, physical or virtual compute nodes, and more specifically, transformer-based in-context learning on tabular data sets. The instant solution additionally relates to systems and procedures, i.e. programming and configuration, for said in-context learning.

Tabular data is a pervasive modality spanning a wide range of domains, and the inherent diversity poses a considerable challenge for deep learning. Transformer-based in-context learning has shown promise on smaller and less complex datasets but have struggled to scale to larger and more complex ones.

As tabular data is a very common data type for real-world machine learning (ML), there is, therefore, a demand for in-context learning systems that work on large and complex tabular datasets.

The examples and features of the instant solution are directed to a system which can retrieve a subset of data from a table based on context with respect to at least one of a target record and a target task and input the subset of data to an AI model, such as an in-context learning model (e.g., TabPFN) during runtime. Similar to a RAG architecture for document data, the system described herein may use context to identify relevant "rows" or "columns" of data from a table and input those rows or columns to an AI model when performing a predictive task based on a target data record. That is, similarities may be identified between a traditional RAG architecture and the system described herein, however, rather than operate on document data (text), the examples and features of the instant solution use the architecture to retrieve table data (e.g., rows, columns, etc.) which can contain numerical values, text values, etc.

The examples and features of the instant solution overcome the limited-size of the memory for in-context learning models such as TabPFN. In particular, the examples and features of the instant solution can reduce table data to a subset of table data that fits in the memory of the in-context learning model and which is relevant to the task being performed, thereby ensuring model accuracy. In doing so, the examples and features of the instant solution can ensure that the in-context learning model is able to successfully generate an accurate prediction in a single-pass.

Figure 1A:
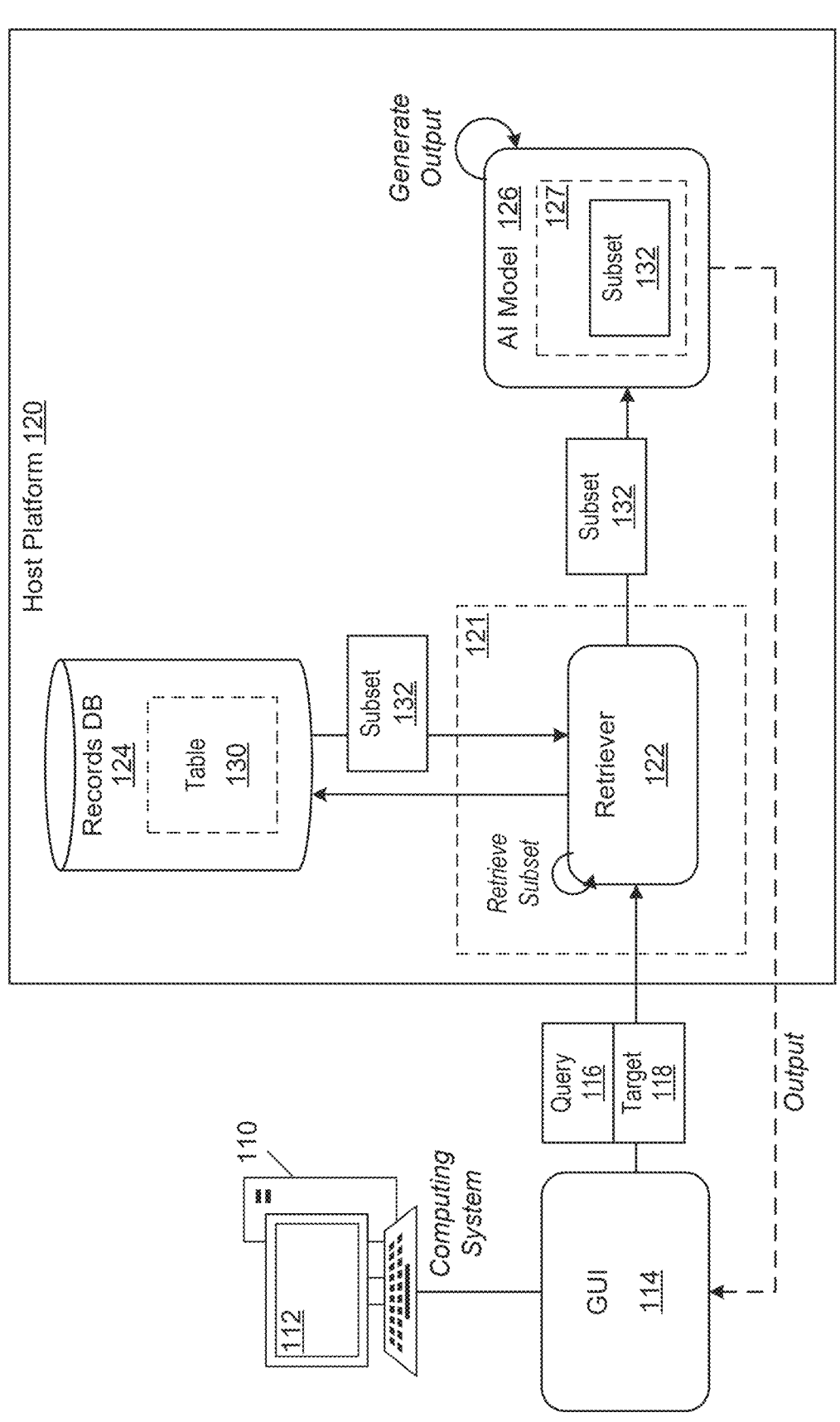

FIGS. 1A-1B illustrate a system for retrieving a subset of tabular data for input to an AI model according to examples and features of the instant solution. For example, FIG. 1A illustrates a process 100A of a host platform 120 that hosts a retriever 122 capable of retrieving a subset of data records 132 from a table 130 that is stored within a records database 124 and inputting the subset of data records 132 to an AI model 126 during at least one of a training process and an inference process according to examples and features of the instant solution.

Referring to FIG. 1A, the host platform 120 hosts the AI model 126, such as an in-context learning model, TabPFN, or the like. For example, the host platform 120 may be a cloud platform, a web server, a combination of systems, and the like. Meanwhile, the AI model 126 may be an in-context learning model, such as TabPFN, which performs a single pass (single execution) on the input data very efficiently (e.g., 1 second or less, etc.) when generating a predicted output. The in-context learning model may learn a new task from a small set of examples presented within the context (prompt) at inference time. To enable the efficiency, the AI model 126 may have a limited-size memory 127 capable of holding a limited amount of input data. When there is too much input data to fit into the limited-size memory 127, the input data may be reduced which, when not done properly, can result in the input data not providing accurate examples for the in-context learning model, thereby decreasing the predictive performance of the in-context learning model.

A user device, such as a computing system 110 may connect to the host platform 120 via a computer network, such as the Internet. Here, the computing system 110 may access a web page, front-end of an application, etc. of a software application 121 which includes the retriever 122 described herein. The computing system 110 may display a graphical user interface (GUI) 114 of the software application 121 on a display screen or other display device 112 of the computing system 110. Here, a user can enter commands and request execution of the AI model 126. For example, the user can use the GUI 114 to submit a query 116 and a target data record 118, such as attributes of a user that is the subject of the request to the AI model 126.

In the examples and features of the instant solution, the retriever 122 can select the subset of data records 132 such that a size of the subset of data records 132 fits into the limited-size memory 127 of the AI model 126. That is, the retriever 122 can ensure that the input data fits into the limited-size memory 127 ensuring successful execution of a single pass. Furthermore, the retriever 122 can also ensure that the subset of data is relevant to the task being performed such that the in-context learning model is able to accurately learn from the examples.

For example, the retriever 122 can use the target data record 118 to identify other data records (i.e., the subset of data records 132) in the table 130 within the records database 124 which are similar in content and use the subset of data records 132 as examples for in-context learning. The subset of data records 132 may include similar attributes as the target data record 118. In addition, the subset of data records 132 may include results that are being asked of the AI model 126 (such as a task to be performed). For example, the task to be performed by the AI model 126 may be to determine whether to offer a user a credit card. In this example, attributes of the user may be included in the target data record 118. The retriever 122 may use the target data record 118 to identify relevant data records in the table 130 of other users with similar attributes as the user. These other records may also include indications of whether a credit card was provided to the users, and if so, whether the decision was successful (e.g., whether the credit card balance is being paid, whether the credit card is in default, etc.).

FIG. 1B illustrates a process 100B of the retriever 122 retrieving a subset of data from the table 130 within the records database 124 according to examples and features of the instant solution. Referring to FIG. 1B, the retriever 122 may use the attributes 119 within the target data record 118 to identify a subset of data records 133, 134, and 135 with similar attributes as the target data record 118. In this example, the data records 133, 134, and 135 may include attribute values similar to the attribute values of the target data record 118. In addition, the data records 133, 134, and 135 may include results or other information that may help the AI model 126 learn from the data records 133, 134, and 135.

Figure 2A:
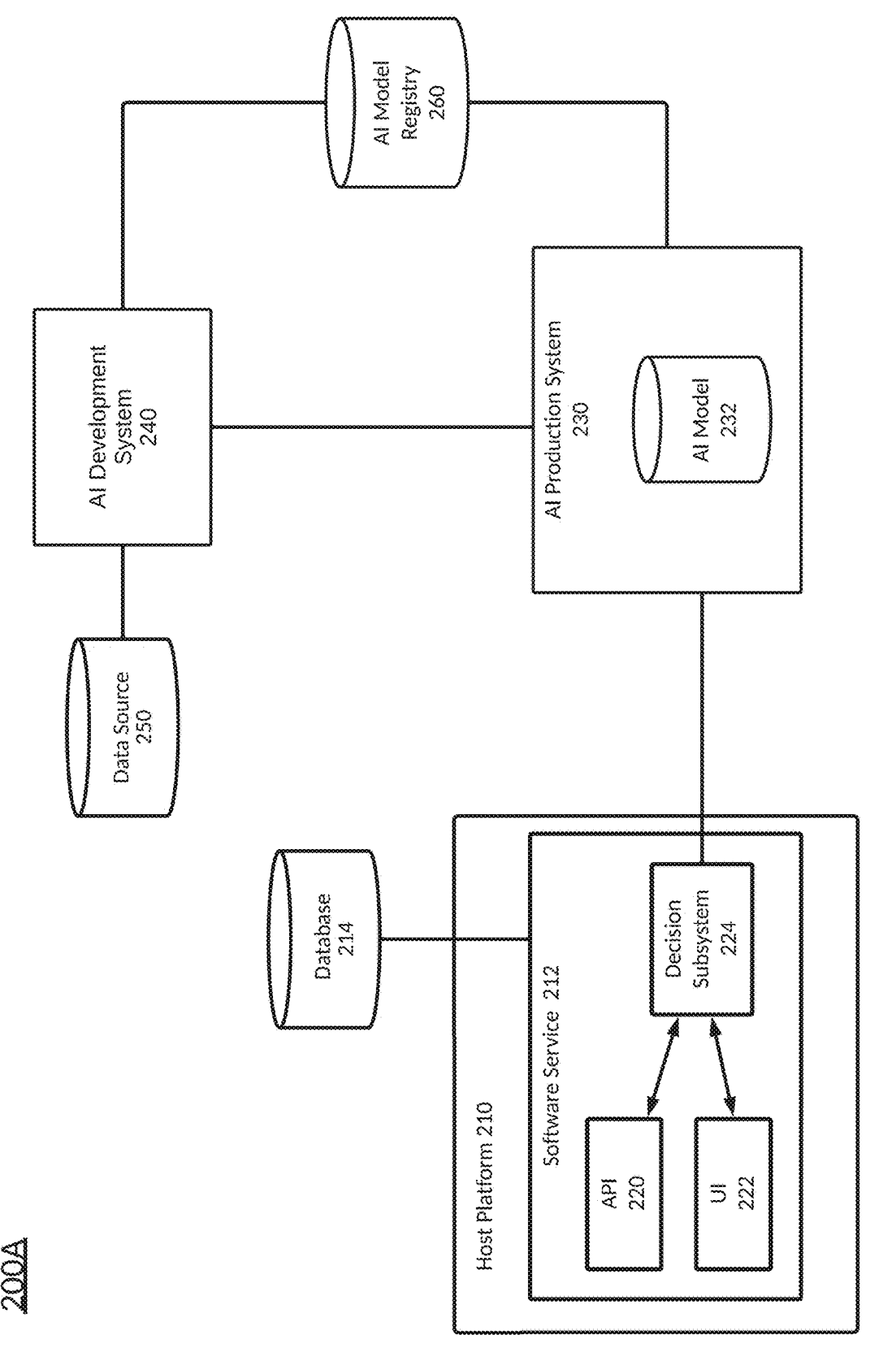
FIG. 2A is a system diagram illustrating integration of an AI model into any decision point according to the examples and features of the instant solution.
Figure 2B:
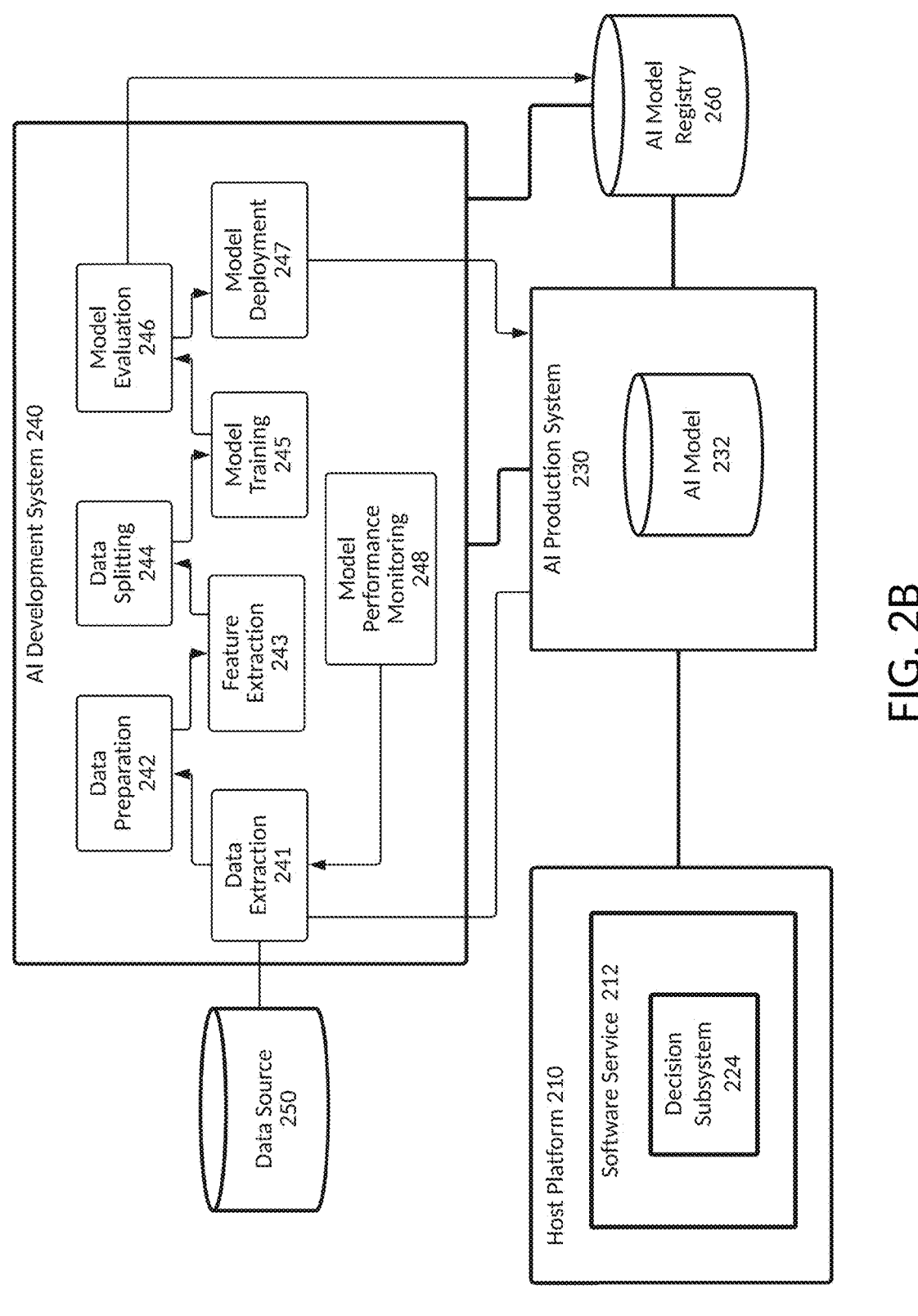
FIG. 2B is a diagram illustrating a process for developing an AI model that supports AI-assisted computer decision points according to the examples and features of the instant solution.
Figure 2C:
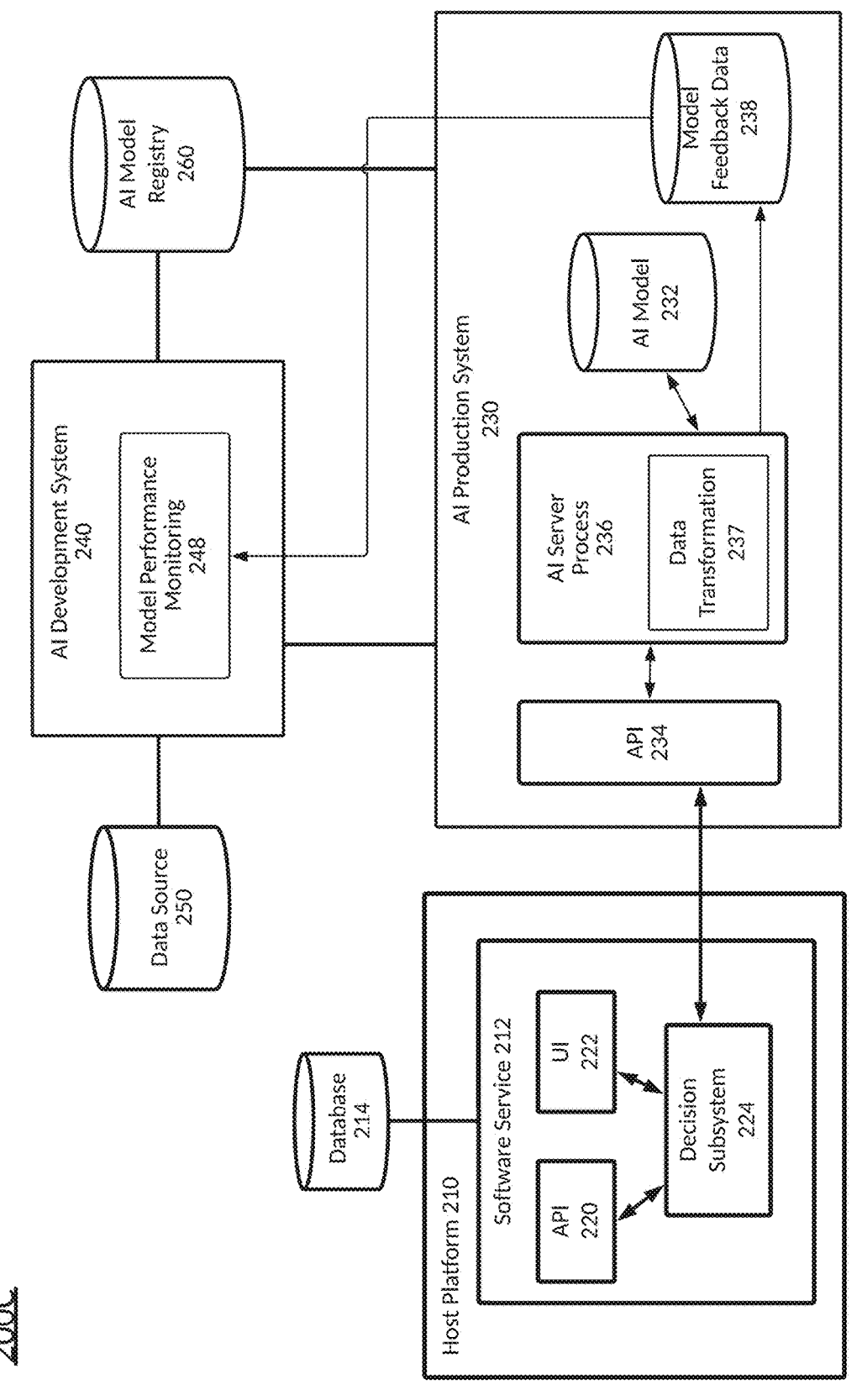
FIG. 2C is a diagram illustrating a process for utilizing an AI model that supports AI-assisted computer decision points according to examples and features of the instant solution.

The AI model(s) described herein may be pre-trained, trained, re-trained, fine-tuned, and the like. FIGS. 2A-2C are diagrams illustrating examples of training and deploying an AI model that apply to the AI models described herein.

Furthermore, in some examples of the instant solution, AI model 126 depicted with respect to FIGS. 1A-1B may reside separately from the software application 121 which uses it, such as in the process described with respect to FIGS. 2A-2C. In some examples of the instant solution, AI model 126 may be an example of AI model 232 described and depicted in FIGS. 2A-2C. In some examples of the instant solution, software application 121 may be an example of software service 212, described and depicted in FIGS. 2A-2C. In some examples of the instant solution, records database 124 may be an example of data source 250, described and depicted in FIGS. 2A-2C. In some examples of the instant solution, the AI model 126 may be deployed to an AI production system where the software application 121 on the host platform may access and execute it. In some examples of the instant solution, the host platform 120 may be an example of host platform 210 described and depicted in FIGS. 2A-2C, or the host platform 120 may be a combination of systems that includes host platform 210, AI development system 240, and AI production system 230 as described and depicted in FIGS. 2A-2C.

FIG. 2A illustrates an artificial intelligence (AI) network diagram 200A that supports AI-assisted decision points in a software service executing on a computer. One or more computing devices and a host platform 210 may communicate via a network. The host platform 210 may host a software service 212. The software service 212 may communicate with one or more databases 214 through a network during the course of service execution. In some examples and features of the instant solution, a computing device may host a service client which communicates with a corresponding software service 212.

A computing device may be a mobile phone, tablet, laptop computer, desktop computer, smartwatch, vehicle infotainment system, or any computing device including a processor and memory. The host platform 210 may include a single physical server, multiple physical servers, a cloud hosting environment, or a hybrid hosting environment in which some components of the host platform 210 are "on-premise" while others are cloud-hosted. The network is a computer network and may include one or more interconnected computer networks. For example, network may be or may include an Ethernet network, an asynchronous transfer mode (ATM) network, a wireless network, a telecommunications network or the like.

The software service 212 provides the service logic. It may provide one or more Application Programming Interfaces (APIs) for communicating with one or more service clients. A "thick" user interface client that runs on a computing device may utilize the APIs to communicate with the software service 212. Further, the software service 212 may provide hosted User Interfaces (UIs) that can be accessed through browser-based software on some computing devices.

The one or more service clients can enable service access for end users and may come in a variety of forms including, but not limited to, a mobile device application ("app") or a web portal accessed via a browser on a computing device such as a laptop or desktop computer.

While the example instant solution shown utilizes an AI model, which is a type of machine learning (ML) model, other branches of AI, such as, but not limited to, computer vision, fuzzy logic, expert systems, deep learning, generative AI, and natural language processing, may be employed in developing the AI model in this instant solution. Further, the AI model included in these examples and features of the instant solution is not limited to particular AI algorithms. Any algorithm or combination of algorithms related to supervised, unsupervised, and reinforcement learning may be employed.

The AI models, ML models, neural networks, and other branches of AI, described and/or depicted herein, build upon the fundamentals of predecessor technologies and form the foundation for all future technological advancements in artificial intelligence. An AI classification system describes the stages of AI progression and advancement. The first classification is known as "reactive machines," followed by present-day AI classification "limited memory machines" (also known as "artificial narrow intelligence"), then progressing to "theory of mind" (also known as "artificial general intelligence") and reaching the AI classification "self-aware" (also known as "artificial superintelligence"). Present-day limited memory machines are a growing group of AI models built upon the foundation of their predecessors, reactive machines. Reactive machines emulate human responses to stimuli; however, they are limited in their capabilities as they cannot typically learn from prior experience. Once the AI model's learning abilities emerged, its classification was promoted to limited memory machines. In this present-day classification, AI models learn from large volumes of data, detect patterns, solve problems, generate, and predict data, and the like, while inheriting all the capabilities of reactive machines.

Examples of AI models classified as limited memory machines include, but are not limited to, chatbots, virtual assistants, machine learning, neural networks, deep learning, natural language processing, generative AI models, and any future AI models that are yet to be developed possessing characteristics of limited memory machines.

For example, a neural network is a type of machine learning model that relies on training data to learn associations and connections, improving its accuracy for performing high speed data classifications, clustering, and other analyses of data. Such neural network capabilities are the foundation of deep learning models today as well as becoming the foundational blocks of those yet to be developed.

For example, generative AI models combine limited memory machine technologies, incorporating machine learning and deep learning, forming the foundational building blocks of future AI models. For example, theory of mind is the next progression of AI that may be able to perceive, connect, and react by generating appropriate reactions in response to an entity with which the AI model is interacting; all these theory of mind capabilities relies on the fundamentals of generative AI. Furthermore, in an evolution into the self-aware classification, AI models will be able to understand and evoke emotions in the entities they interact with, as well as possessing their own emotions, beliefs, and needs, all of which rely on generative AI fundamentals of learning from experiences to generate and draw conclusions about itself and its surroundings.

AI models may include, but are not limited to, at least one machine learning model, neural network model, deep learning model, generative AI model, or any combination of models from the branches of AI. AI models are integral and core to future artificial intelligence models. As described herein, AI model refers to present-day AI models and future AI models.

In the example of FIG. 2A, the software service 212 executing on host platform 210 may provide one or more application programming interfaces (APIs) 220 that enable interaction with other software components via a set of data definitions and protocols. In some examples and features of the instant solution, the APIs provided may employ Simple Object Access Protocol (SOAP), Remote Procedure Calls (RPC), and Representational State Transfer (REST) techniques. In some examples and features of the instant solution, the plurality of APIs 220 send data to one or more decision subsystems 224 of the software service 212 to assist in decision-making. In some examples and features of the instant solution, the software service 212 stores data included in API requests or data generated during processing the API requests into one or more databases 214.

Software service 212 may provide one or more user interfaces (UIs) 222, such as a server-side hosted graphical user interface (GUI). In some examples and features of the instant solution, the UIs 222 provided employ template-based frameworks, component-based frameworks, etc. In some examples and features of the instant solution, these UIs 222 send data to one or more decision subsystems 224 of the software service 212 to assist with decision-making. In some examples and features of the instant solution, the software service 212 stores data included in UI requests or data generated during processing the UI requests into one or more databases 214.

Software service 212 may include one or more decision subsystems 224 that drive a decision-making process of the software service 212. In some examples and features of the instant solution, the decision subsystems 224 receive data from one or more APIs 220 as input into the decision-making process. In some examples and features of the instant solution, a decision subsystem 224 may receive data from one or more UIs 222 as input to the decision-making process. A decision subsystem 224 may gather service configuration or historical execution data from one or more databases 214 to aid in the decision-making process. A decision subsystem 224 may provide feedback to an API 220 or a UI 222.

An AI production system 230 may be used by a decision subsystem 224 in a software service 212 to assist in its decision-making process. The AI production system 230 includes one or more AI models 232 that are executed to generate a response, such as, but not limited to, a prediction, a categorization, a UI prompt, etc. In some examples and features of the instant solution, an AI production system 230 is hosted on a server. In some examples and features of the instant solution, the AI production system 230 is cloud-hosted. In some examples and features of the instant solution, the AI production system 230 is deployed in a distributed multi-node architecture.

An AI development system 240 creates one or more AI models 232. In some examples and features of the instant solution, the AI development system 240 utilizes data from one or more data sources 250 to develop and train one or more AI models 232. The data sources 250 may be local or third-party data sources. Further, the data provided by the data sources may be real-world or synthetic. In some examples and features of the instant solution, the AI development system 240 utilizes feedback data from one or more AI production systems 230 for new model development and/or existing model re-training. In some examples and features of the instant solution, the AI development system 240 resides and executes on a server. In some examples and features of the instant solution, the AI development system 240 is cloud hosted. In some examples and features of the instant solution, the AI development system 240 is deployed in a distributed multi-node architecture. In some examples and features of the instant solution, the AI development system 240 utilizes a distributed data pipeline/analytics engine.

Once an AI model 232 has been trained and validated in the AI development system 240, it may be stored in an AI model registry 260 for retrieval by either the AI development system 240 or by one or more AI production systems 230. The AI model registry 260 resides in a dedicated server in one example of the instant solution. In some examples and features of the instant solution, the AI model registry 260 is cloud-hosted. In some examples and features of the instant solution, the AI model registry 260 resides in the AI production system 230. In some examples and features of the instant solution, the AI model registry 260 is a distributed database.

FIG. 2B illustrates a process 200B for developing one or more AI models that support AI-assisted decision points. An AI development system 240 executes steps to develop an AI model 232 that begins with data extraction 241, in which data is loaded and ingested from one or more data sources

250. In some examples and features of the instant solution, historical model feedback data is extracted from one or more AI production systems 230.

Once the data has been extracted during data extraction 241, it undergoes data preparation 242 for model training. In some examples and features of the instant solution, this step involves statistical testing of the data to see how well it reflects real-world events, its distribution, the variety of data in the dataset, etc., and the results of this statistical testing may lead to one or more data transformations being employed to normalize one or more values in the dataset. In some examples and features of the instant solution, data deemed to be noisy is cleaned. A noisy dataset includes values that do not contribute to the training, such as, but not limited to, null and long string values. Data preparation 242 may be a manual process or an automated process using one or more of the elements and/or functions described and/or depicted herein.

Features of the data are identified and extracted during the feature extraction step 243. In some examples and features of the instant solution, a feature of the data is internal to the prepared data from the data preparation step 242. In some examples and features of the instant solution, a feature of the data requires a piece of prepared data from the data preparation step 242 to be enriched by data from another data source to be useful in developing the AI model 232. In some examples and features of the instant solution, identifying features may be a manual process or an automated process using one or more of the elements and/or functions described and/or depicted herein. Once the features have been identified, the values of the features are collected into a dataset that will be used to develop the AI model 232.

The dataset output from the feature extraction step 243 is split 244 into a training and validation data set. The training data set is used to train the AI model 232, and the validation data set is used to evaluate the performance of the AI model 232 on unseen data.

The AI model 232 is trained and tuned 245 using the training data set from the data splitting step 244. In this step, the training data set is provided to an AI algorithm and an initial set of algorithm parameters. The performance of the AI model 232 is then tested within the AI development system 240 utilizing the validation data set from step 244. These steps may be repeated with adjustments to one or more algorithm parameters until the model's performance is acceptable based on various goals and/or results.

The AI model 232 is evaluated 246 in a staging environment (not shown) that resembles the target AI production system 230. This evaluation uses a validation dataset to ensure the performance in an AI production system 230 matches or exceeds expectations. In some examples and features of the instant solution, the validation dataset from step 244 is used. In some examples and features of the instant solution, one or more unseen validation datasets are used. In some examples and features of the instant solution, the staging environment is part of the AI development system 240, and the staging environment is managed separately from the AI development system 240. Once the AI model 232 has been validated, it is stored in an AI model registry 260, where it can be retrieved for deployment and future updates. In some examples and features of the instant solution, the model evaluation step 246 may be a manual process or an automated process using one or more of the elements and/or functions described and/or depicted herein.

In some examples and features of the instant solution, the AI development system includes a user interface (not shown). The user interface may be used to manage the development system infrastructure, the steps 241-248 within the development system, the interim data transmitted between the various steps 241-248, and the data sources 250.

Once an AI model 232 has been validated and published to an AI model registry 260, it may be deployed during the model deployment step 247 to one or more AI production systems 230. In some examples and features of the instant solution, the performance of deployed AI model 232 is monitored 248 by the AI development system 240. In some examples and features of the instant solution, AI model 232 feedback data is provided by the AI production system 230 to enable model performance monitoring 248, and the AI development system 240 periodically requests feedback data for model performance monitoring 248, which includes one or more triggers that result in the AI model 232 being updated by repeating steps 241-248 with updated data from one or more data sources 250.

FIG. 2C illustrates a process 200C for utilizing an AI model that supports AI-assisted decision points. As stated previously, the AI model utilization process depicted herein reflects ML, which is a particular branch of AI, but this instant solution is not limited to ML and is not limited to any AI algorithm or combination of algorithms.

Referring to FIG. 2C, an AI production system 230 may be used by a decision subsystem 224 in software service 212 to assist in its decision-making process. The AI production system 230 provides an API 234, executed by an AI server process 236 through which requests can be made. In some examples and features of the instant solution, a request may include an AI model 232 identifier to be executed based on the type of request. In some examples and features of the instant solution, a data payload (e.g., to be input to the AI model during execution) is included in the request. The data payload may include API 220 data from software service 212, UI 222 data from software service 212 or data from other software service 212 subsystems (not shown).

Upon receiving the API 234 request, the AI server process 236 may transform 237 the data payload or portions of the data payload to be valid feature values in an AI model 232. Data transformation 237 may include, but is not limited to, combining data values, normalizing data values, and enriching the incoming data with data from other data sources 250. Once the data transformation occurs, the AI server process 236 executes the appropriate AI model 232 using the transformed input data. Upon receiving the execution result, the AI server process 236 responds to the API requester, which is a decision subsystem 224 of software service 212. In some examples and features of the instant solution, the response may result in an update to a UI 222 in software service 212. In some examples and features of the instant solution, the response includes a request identifier that can be used later by the software service 212 to provide feedback on the performance of the AI model 232. In some examples and features of the instant solution, a model feedback record may be added into a model feedback data 238 by the AI server process 236.

In some examples and features of the instant solution, the API 234 includes an interface to provide AI model 232 feedback after an AI model 232 execution response has been processed. This mechanism enables the requester to provide feedback on the accuracy of the AI model 232 results. In some examples and features of the instant solution, the feedback interface includes the identifier of the initial request so that it can be used to associate the feedback with the request. Upon receiving a call into the feedback interface of the API 234, the AI server process 236 creates and adds a model feedback record into the model feedback data 238 which holds historical model feedback records. In some examples and features of the instant solution, the records in this model feedback data 238 are provided to model performance monitoring 248 in the AI development system 240. This model feedback data is streamed to the AI development system 240 or may be provided upon request. In some examples and features of the instant solution, the model feedback records in the model feedback data 238 are used as an input for retraining the AI model 232.

In some examples and features of the instant solution, the AI production system 230 includes a user interface (not shown). The user interface may be used to manage the production system infrastructure, the components of the production system 230-238, and the operation of the AI production system and its components.

According to various examples and features of the instant solution, an artificial intelligence operational pipeline (e.g., an AI pipeline) may be used to train an AI model by executing the AI model on training data. The AI pipeline may include various modules, nodes, etc. which perform various tasks of the AI pipeline. The tasks may be executed in sequence. As another example, the tasks may be executed in parallel. In addition to training an AI model, the AI pipeline may be used to perform an inference (e.g., generate a predictive output) by executing the AI model on input data.

According to various examples and features of the instant solution, the AI pipeline may validate the training data, the input data, the output data, and the like. For example, when the input data is determined to be invalid, the software may pause/stop the AI pipeline and flag a location (e.g., a point in the process, etc.) at which the process is paused/stopped. Furthermore, the software may replace or otherwise fix the invalid data with valid data and resume the AI pipeline from the flagged location in the process.

Figure 3A:
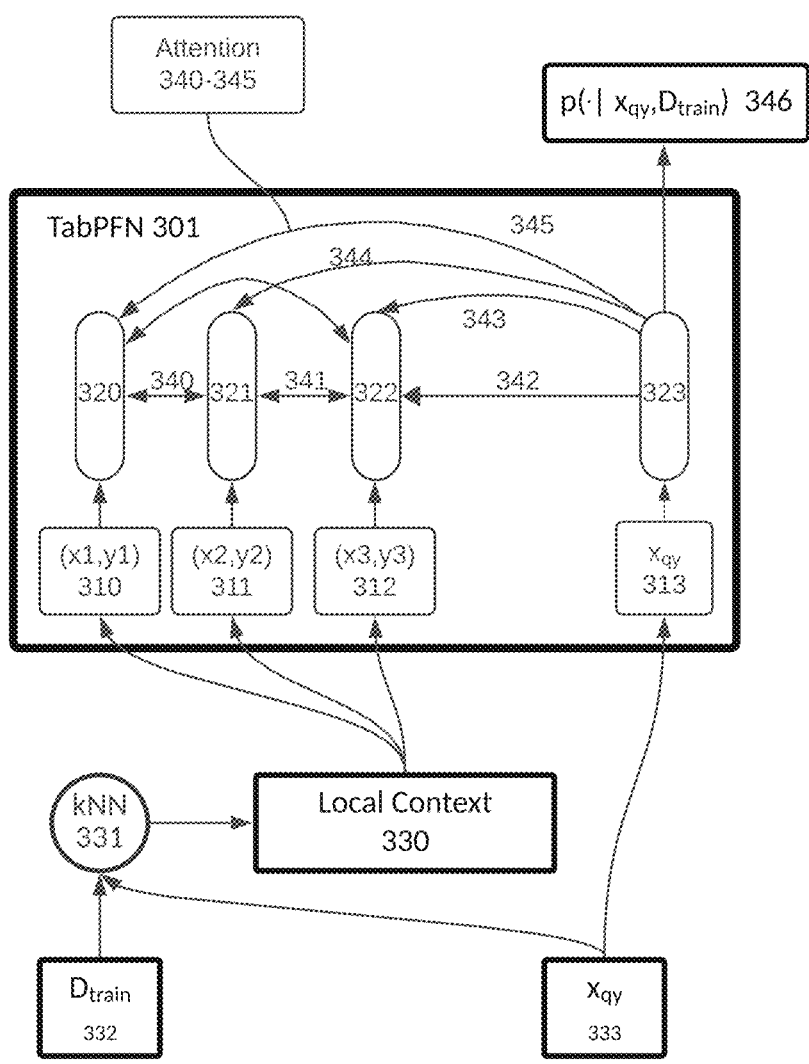
FIG. 3A is a diagram illustrating an operating environment of a system that provides scalable in-context learning and inference on large and complex datasets according to examples and features of the instant solution.

FIG. 3A illustrates an operating environment 300 of a system that provides scalable in-context learning and inference on large and complex datasets according to examples and features of the instant solution. Referring to FIG. 3A, the system may perform fine-tuning using a training dataset $D_{train}$ 332 and a k-Nearest Neighbor (kNN) algorithm 331 to establish a local context 330 for an input query. For example, for a query $X_{qy}$ 333, the associated kNN algorithm 331 may be determined based on the training dataset $D_{train}$ 332 and used as local context 330 for inference. The local context 330 may correspond to a subset of rows from a table (and/or a subset of columns from the table, etc.) and may be passed to an in-context learning model, such as a TabPFN model 301. In this example, the local context 330 is passed to instances 310, 311, 312, and 313 of the TabPFN model 301, and tokens are calculated 320, 321, 322, and 323, respectively. In addition, attention 340, 341, 342, 343, 344, and 345 may be passed between the tokens 320, 321, 322, and 323 associated with the query $X_{qy}$ 333. A response 346 may be generated by the system.

The present solution inputs local context 330 into the TabPFN model 301, as opposed to all tabular data. The introduction of a local context 330 instead of using the global context, i.e. all data, is one of the technical benefits of the instant solution. The instant solution uses k-Nearest Neighbors of a given query point as the context for classification. This modification of the context prior to the TabPFN model 301 in this way empirically allows for both enhanced processing of larger datasets and more complex decision boundaries.

In the context of the instant solution, k-Nearest Neighbor refers to the well-known learning classifier. A kNN classifier expresses that the most contextual information to classify a query point $X_{qy}$ is contained in its vicinity.

Figure 3B:
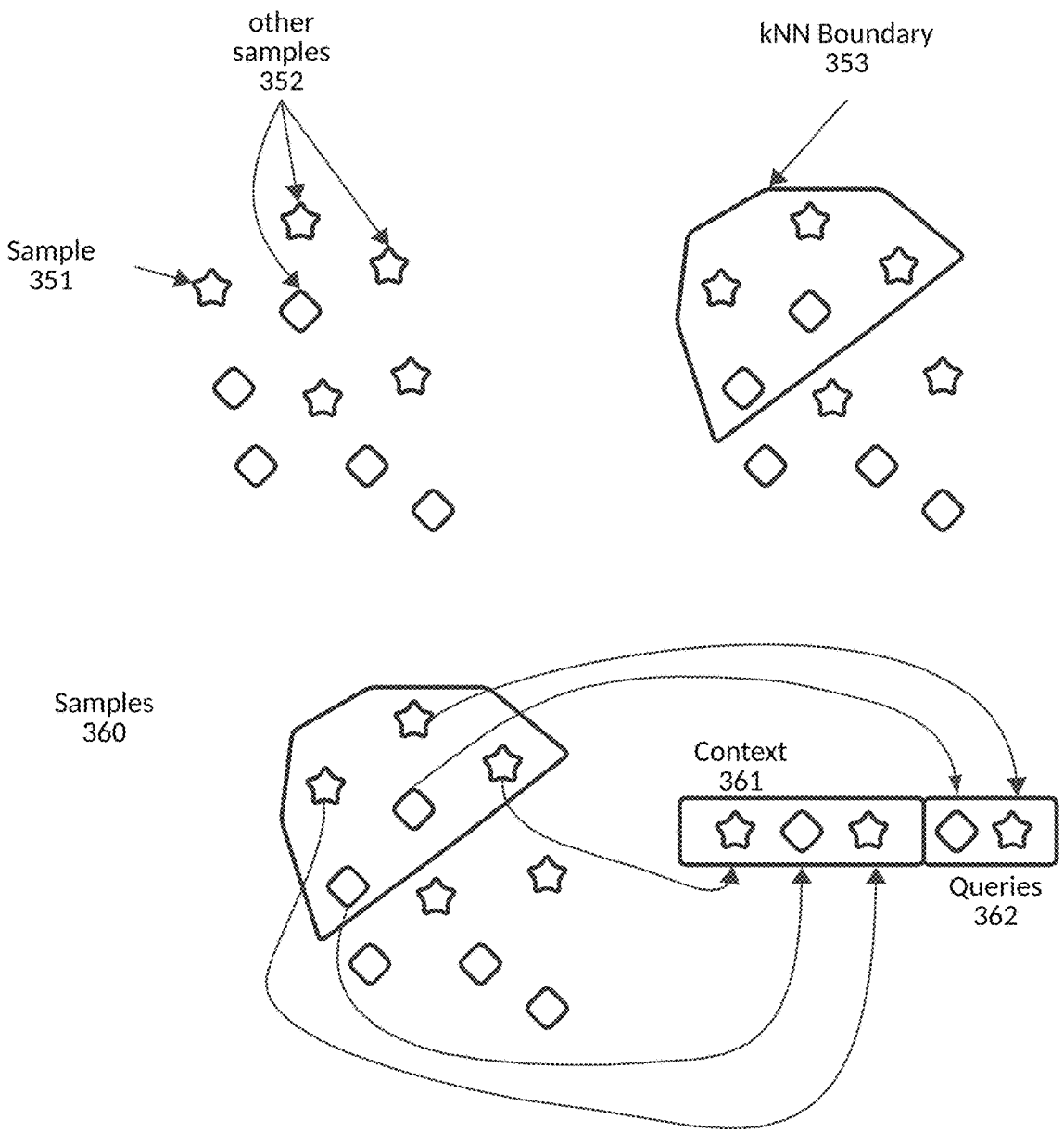
FIG. 3B is a diagram illustrating a process of fine-tuning and sharing of context between queries according to examples and features of the instant solution.

FIG. 3B illustrates a process 350 of fine-tuning and sharing context between queries according to examples and features of the instant solution. In this example, a sample 351 may correspond to an input query that has been transformed into a vector and plotted in vector space, and a group of other samples 352 may correspond to rows of data in a table (not shown) that have been transformed into vectors, respectively, and plotted in vector space. Here, the kNN algorithm may identify a kNN boundary 353 within vector space among the other samples that may be used to differentiate other samples that are considered nearest neighbors of the sample 351 and other samples that are not nearest neighbors.

In this example, the other samples within the kNN boundary 353 may be identified as nearest neighbors of the sample 351, while other samples outside of the kNN boundary 353 may be determined as not being nearest neighbors. The rows of table data corresponding to the other samples within the kNN boundary 353 may be used as the local context 330 shown in the example of FIG. 3A, while the rows of table data corresponding to the other samples outside of the kNN boundary 353 may not be used for prediction.

In this example, item 360 represents the samples that are within the kNN boundary 353, item 361 represents the context and item 362 represents the queries.

In some examples of the instant solution, the operating environment 300 of FIG. 3A may be an example of an AI production system 230, as described and depicted in FIGS. 2A-2C. In some examples of the instant solution, TabPFN model 301 and the well-known kNN learning classifier/kNN algorithm 331 may be examples of AI model 232, as described and depicted in FIGS. 2A-2C.

Figure 4A:
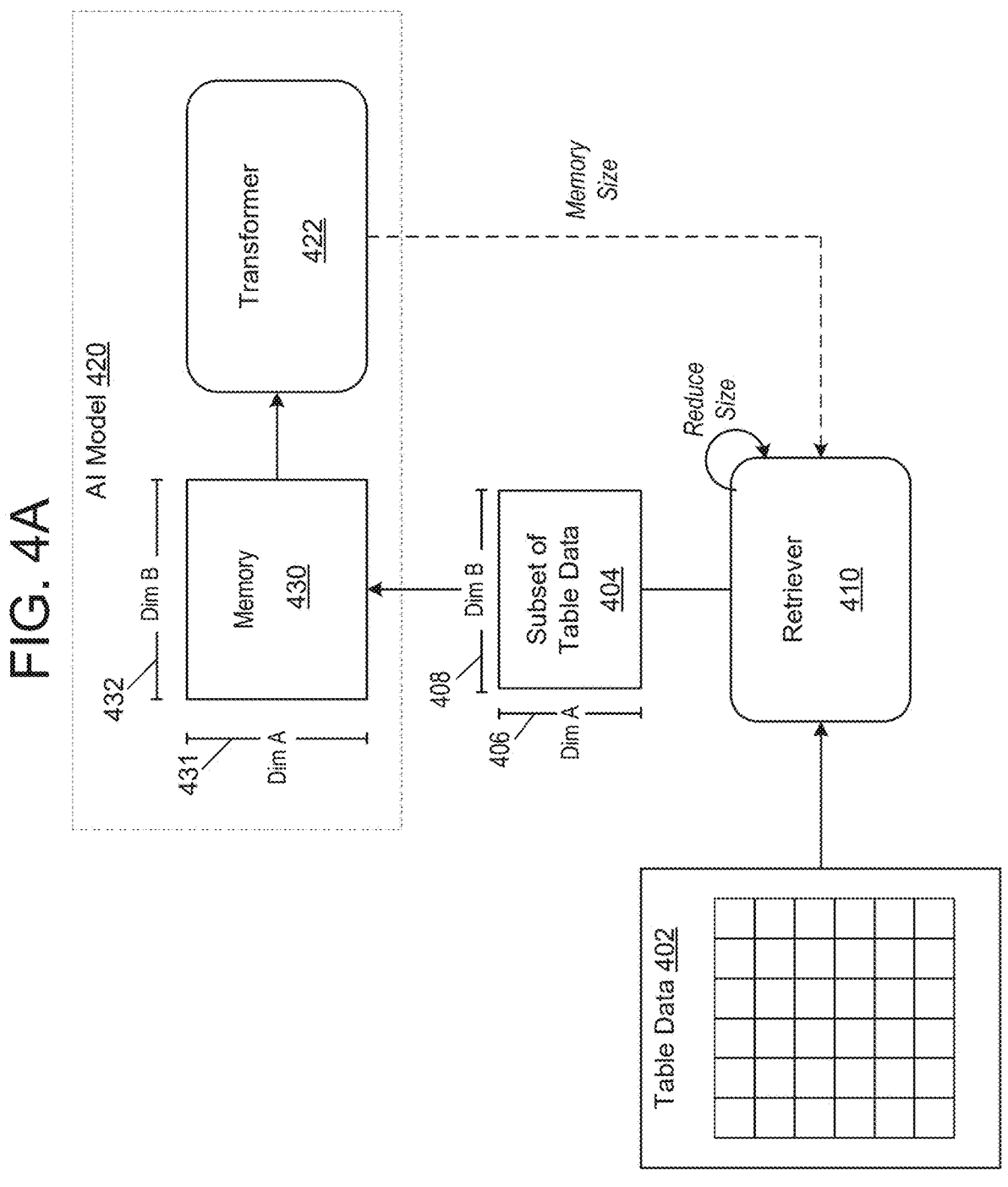
FIGS. 4A-4C are diagrams illustrating a process of extracting table data that fits into a limited-size memory of an AI model according to examples and features of the instant solution.
Figure 4B:
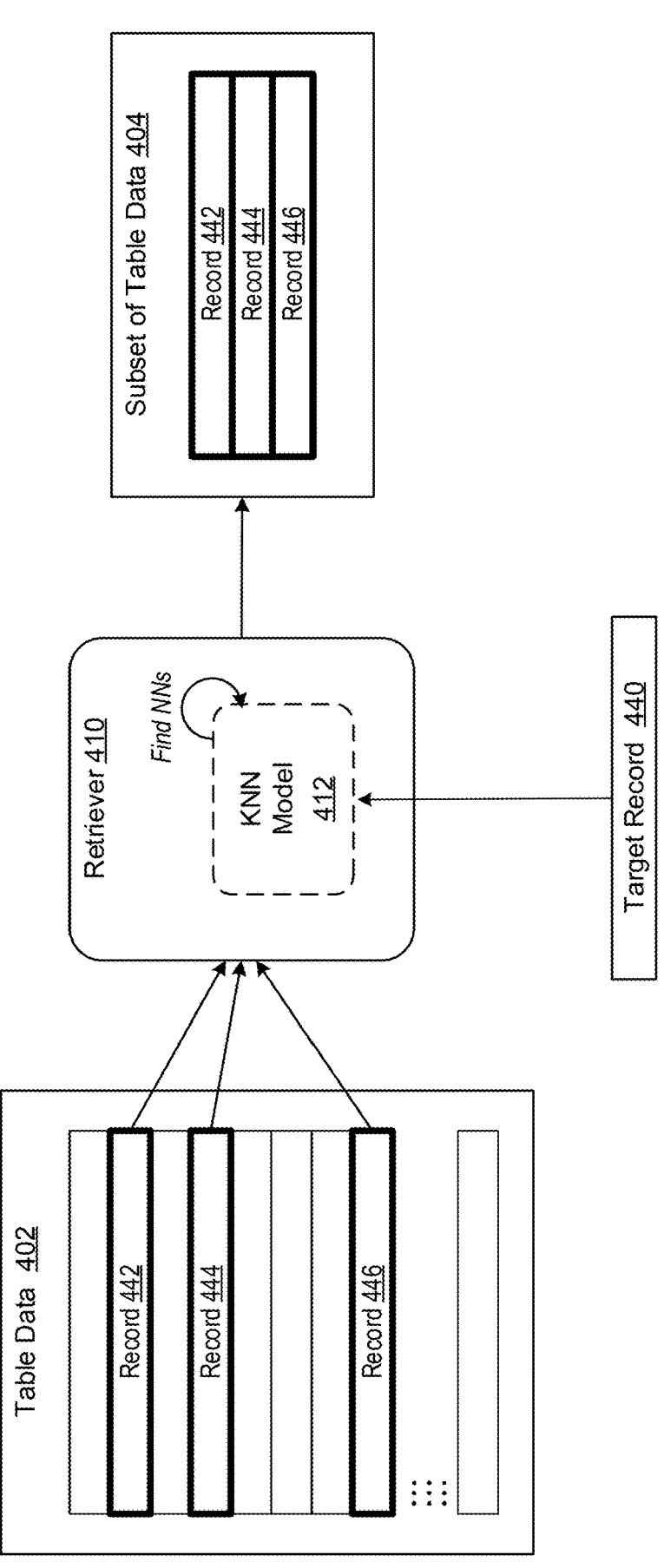
Figure 4C:
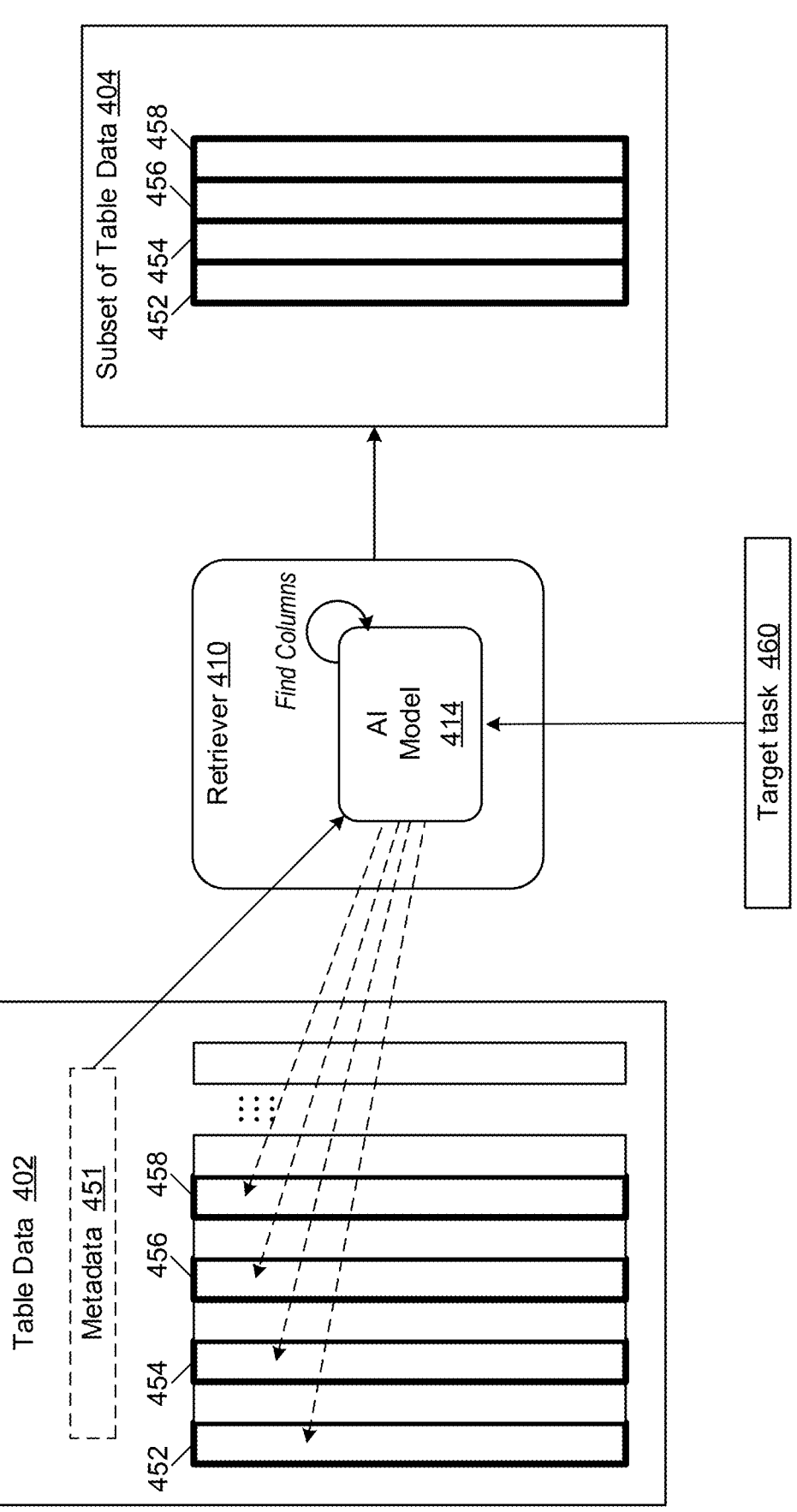

FIGS. 4A-4C illustrate a process of extracting table data that fits into a limited-size memory of an AI model according to examples and features of the instant solution. For example, FIG. 4A illustrates a process 400A of extracting a subset of table data 404 from table data 402 based on a size of a memory 430 of an AI model 420. Referring to FIG. 4A, the AI model 420 may be hosted by a host platform (not shown) and may include a transformer model 422 (such as a large language model, neural network, etc.) which is capable of transforming input data into a predicted output. In addition, the AI model 420 may include a memory 430 capable of holding input data. The transformer model 422 may be configured to generate a predictive output based on a single execution of the transformer model 422 on data stored within the memory 430.

According to various examples and features of the instant solution, the memory 430 may have a limited size. In this example, the memory 430 is shown with dimensions 431 and 432, which are a predefined size. However, it should also be appreciated that the memory may include a third dimension (not shown). In this example, the dimensions (Dim A 431 and Dim B 432) of the memory 430 determine the size of data that can be held in the memory 430, for example, 500 rows of data, 1000 rows of data, 2000 rows of data, or the like. As another example, the two dimensions (Dim A 431 and Dim B 432) may be configured to be low values and may constrain the size of data that can be held in the memory 430, such as 10 columns of data, 15 columns of data, 20 columns of data, and the like.

According to various examples and features of the instant solution, the dimensional parameters of the memory 430 may be transferred to a retriever 410 that is configured to retrieve the subset of table data 404 from table data 402 for input to the transformer model 422. In this example, the retriever 410 may extract the subset of table data 404 such that it has a size (e.g., a dimension 406 and a dimension 408) that fits within the dimension 431 and 432 of the memory 430 of the AI model 420. That is, the retriever 410 may retrieve data from table data 402 (e.g., the subset of table data 404) such that the subset of table data 404 fits within the column requirements, row requirements, and the like, of the memory 430.

FIG. 4B illustrates a process 400B of retrieving a subset of records from table data 402 based on a nearest neighbor (NN) algorithm according to examples and features of the instant solution. Referring to FIG. 4B, the retriever 410 may include a k-nearest neighbor (kNN) model 412 which uses proximity between data points within a space (such as vector space) to make classifications or predictions about the grouping of data points. KNN model 412 is a machine learning model which does not make any underlying assumptions about the data distribution.

In the example of FIG. 4B, the retriever 410 may receive a target record 440 which may be a row of data with contextual values of an entity associated with the target record 440, such as a user, an object, a location, a place, or the like. The retriever 410 may include one or more of a tokenizer, vectorizer, embedder, etc. which can convert the row of data into a vector and plot the vector in multi-dimensional vector space (not shown). In addition, the retriever 410 may convert the records in table data 402 into vectors and plot the vectors in the multi-dimensional vector space.

The KNN model 412 may identify vectors in the multi-dimensional vector space that are closest to the vector corresponding to the target record 440. In some examples and features of the instant solution, the KNN model 412 may identify vectors that are within a predetermined distance from the target vector in the vector space and determine that these vectors within the predetermined distance from the target vector correspond to the nearest neighbors. In this case, the corresponding data records of the vectors within the predetermined distance from the target vector may be chosen/included in the subset of table data 404. In the example of FIG. 4B, the KNN model 412 identifies record 442, record 444, and record 446, as the subset of vectors that are most relevant to the target record 440.

FIG. 4C illustrates a process 400C of retrieving a subset of records from table data 402 based on an AI model 414 according to examples and features of the instant solution. Referring to FIG. 4C, the retriever 410 may include an AI model 414 configured to identify the most relevant features/attributes within table data 402 and select columns of data corresponding to the most relevant features/attributes within table data 402.

Referring to FIG. 4C, the retriever 410 may receive a target task 460 to be executed by a downstream AI model, such as an in-context learning model. The retriever 410 may also retrieve metadata 451 from the table which identifies which features are stored in which columns of the table data 402. For example, the metadata 451 may include identifiers of the data attributes (types of data values) that are stored within each column. For example, when the records correspond to users, the data attributes may include attributes of the users, such as age, geographic location, income, credit score, marital status, and the like.

In this example, the retriever 410 may input the metadata 451 and/or the target task 460 into the AI model 414, and in response, the AI model 414 may determine a subset of attributes that are most relevant for the target task 460. In response, the AI model 414 may select a subset of columns including column 452, column 454, column 456, and column 458 and include them in the subset of table data 404.

In some examples and features of the instant solution, the process 400C may be used in combination with the process 400B shown and described in the example of FIG. 4B. Thus, the retriever 410 may reduce the table data in size down to the subset of table data 404 by removing both rows and columns of data from the table data 402. As another example, the retriever 410 may remove one of the rows or the columns to generate the subset of table data 404.

In some examples of the instant solution, AI model 420, transformer model 422, KNN model 412, and AI model 414 may be examples of AI model 232, as described and depicted in FIGS. 2A-2C. In some examples of the instant solution, table data 402 may reside in a data source 250, as described and depicted in FIGS. 2A-2C.

Figure 5A:
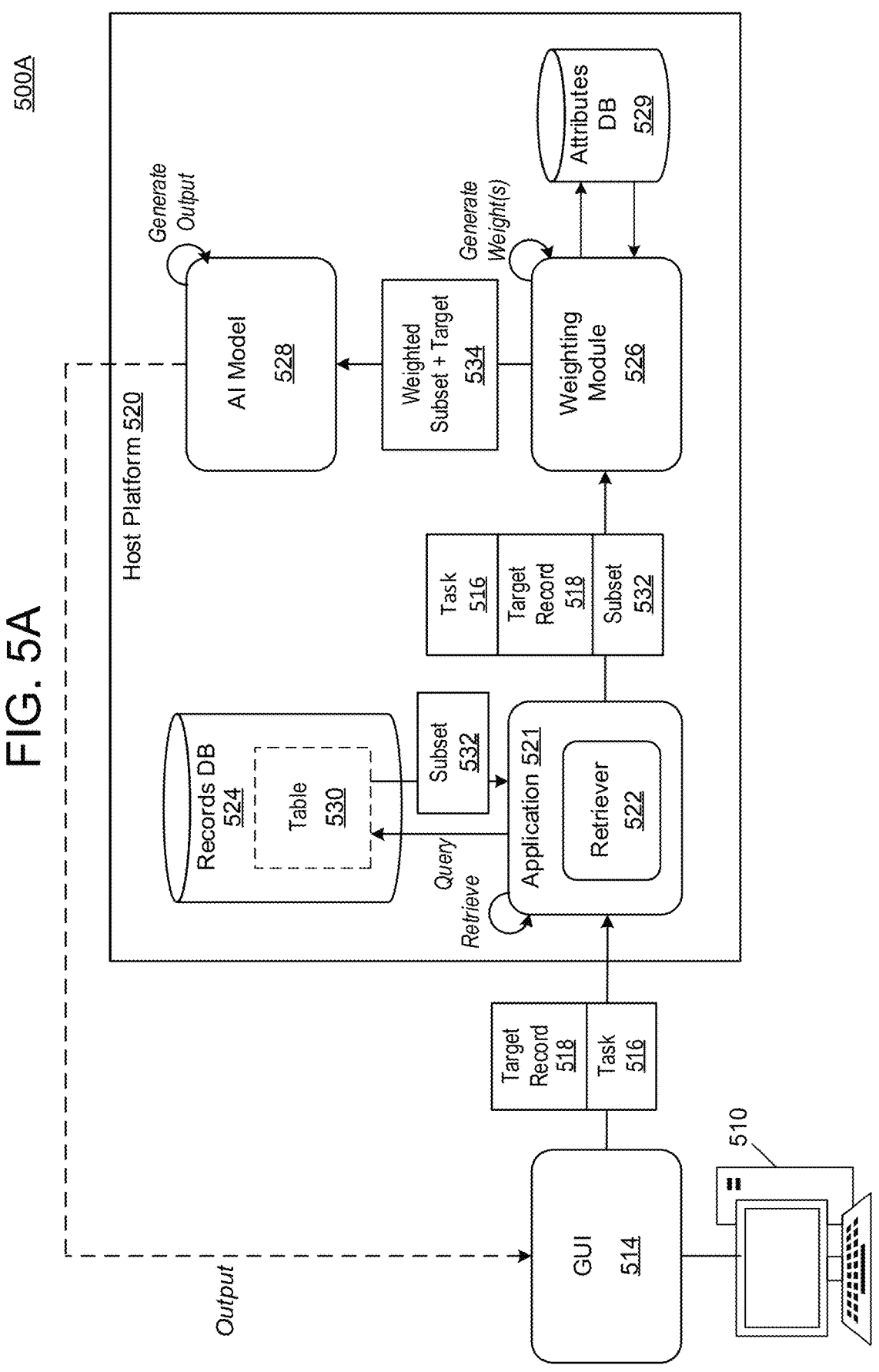

FIGS. 5A-5C illustrate a process of adding weights to tabular data prior to executing the tabular data with an AI model according to examples and features of the instant solution. For example, FIG. 5A illustrates a process 500A of extracting a subset of records from a table 530, weighting the subset of records, and inputting the subset of records to a downstream AI model 528 according to examples and features of the instant solution. Referring to FIG. 5A, a host platform 520 may host a retriever 522 configured to retrieve a subset of records from the table 530 stored within a records database 524. In this example, the retriever 522 may receive at least one of a task 516 and a target record 518 which are input via a GUI 514 of a software application 521 which includes the retriever 522.

In this example, the retriever 522 may identify a subset of data records 532 from the table 530 based on the target record 518, for example, using a KNN model, an AI model, or the like. In response to retrieving the subset of data records 532, the retriever 522 may provide the subset of data records 532, the task 516, and the target record 518 to a weighting module 526. The task 516 may identify a task to be performed by the AI model 528 that is downstream from the weighting module 526. In this example, the weighting module 526 may assign weights to one or more of the data records in the subset of data records 532, for example, based on a type of task to be performed, etc. As another example, the weighting module 526 may use attribute data from an attributes database 529 associated with the target record 518 and attribute data associated with the data records in the subset of data records 532 to identify weights to be applied to the subset of data records 532. Here, the external data may be used to identify data records that have similar attributes/context as the target record 518.

The weighting module 526 may generate a weighted subset +target 534 by adding weights to one or more of the data records in the subset of data records 532. The weighting module 526 may transfer the weighted subset+target 534 to the AI model 528 for execution to generate a predictive result.

In some examples of the instant solution, AI model 528 depicted with respect to FIG. 5A may reside separately from the software application 521 which uses it, such as in the process described with respect to FIGS. 2A-2C. In some examples of the instant solution, AI model 528 may be an example of AI model 232, described and depicted in FIGS. 2A-2C. In some examples of the instant solution, software application 521 may be an example of software service 212, described and depicted in FIGS. 2A-2C. In some examples of the instant solution, records database 524 and attributes database 529 may be examples of data source 250, described and depicted in FIGS. 2A-2C. In some examples of the instant solution, AI model 528 may be deployed to an AI production system where the software application 521 on the host platform may access and execute it. In some examples of the instant solution, the host platform 520 may be an example of host platform 210 described and depicted in FIGS. 2A-2C, or the host platform 520 may be a combination of systems that includes host platform 210, AI development system 240, and AI production system 230, as described and depicted in FIGS. 2A-2C.

FIG. 5B illustrates a process 500B of retrieving a set of attributes 535 from the attribute database 529 according to examples and features of the instant solution. Referring to FIG. 5B, the weighting module 526 may retrieve attributes for each data record 541, 542, 543, 544, 545, and 546 included in the subset of data records 532, and attributes for the target record 518. For example, the weighting module 526 may retrieve attributes 551 associated with the data record 541, attributes 552 associated with the data record 542, attributes 553 associated with the data record 543, attributes 554 associated with the data record 544, attributes 555 associated with the data record 545, and attributes 556 associated with the data record 546. In addition, the weighting module 526 may retrieve attributes 557 associated with the target record 518.

As an example, the attributes may refer to contextual data associated with the data records. As an example, when the data records include a certain type of data about different users, the attributes may include identifying information about the users such as age, income, location, gender, nationality, race, marital status, income, and the like. The attributes may be used to identify users who have similar attributes as a user of the target record 518 and weight the data records of the users who have similar attributes as the user of the target record 518 with a greater weight than the records of other users that do not have the same similarity. For example, users that live in the same location, etc. may be weighted heavier than users that do not. Many other scenarios are also possible.

In this example, the weighting module 526 applies a weight 560 to the data record 542 based on similarities/matching attributes between the attributes 552 of the data record 542 and the attributes 557 of the target record 518 and applies a weight 562 to the data record 545 based on similarities/matching attributes between the attributes 555 of the data record 545 and the attributes 557 of the target record 518. The weights 560 and 562 may cause the AI model that is downstream from the weighting module 526 to give more weight to the data records 542 and 545 with respect to the other data records (e.g., data records 541, 543, 544, and 546, etc.).

FIG. 5C illustrates a process 500C of identifying data records that are similar enough to the target record 518 of a target user to add weights according to examples and features of the instant solution. Referring to FIG. 5C, the target data record 570 includes spending data of a target user, and attributes 572 include attributes of the target user associated with the target data record 570. In this example, the weighting module 526 identifies target attributes 574 and 575 as the attributes to use for identifying data records to be weighted. In this example, the target attributes 574 and 575 may be identified from a rules database 536.

In this example, the weighting module 526 may identify that a data record of user C that includes attribute values 576 for the target attributes 574 and 575 that are within a predefined range of the corresponding attribute values of the target attributes 574 and 575 of the target data record 570.

Here, the predefined range of values may be identified from the rules database 536. In response, the weighting module 526 may apply a weight 580 to the data record of user C. The weight 580 may be predefined or it may be dynamically determined based on the attribute values 576. In addition, the weighting module 526 may identify that a data record of user F that includes attribute values 577 for the target attributes 574 and 575 that are within a predefined range of the corresponding attribute values of the target attributes 574 and 575 of the target data record 570. In response, the weighting module 526 may apply a weight 582 to the data record of user F.

Figure 6A:
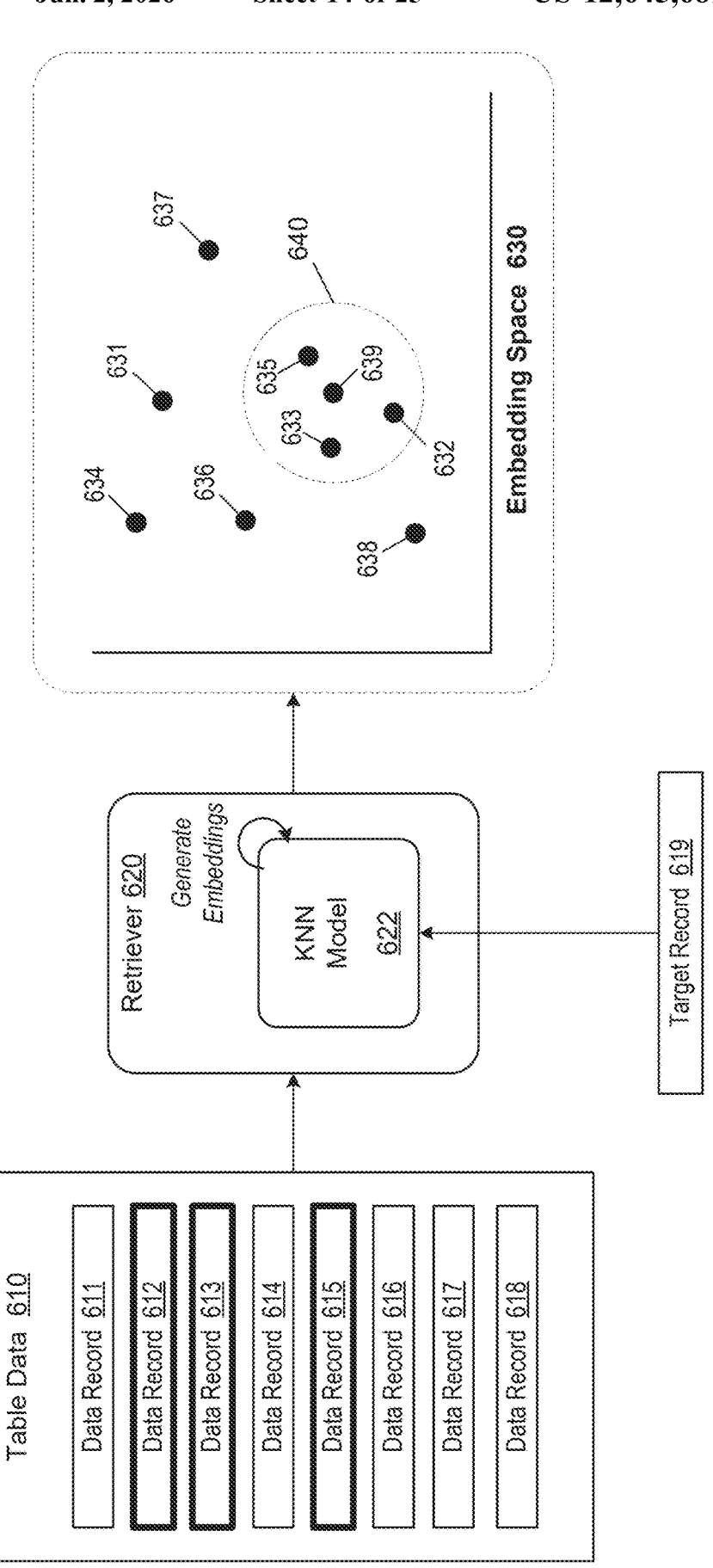
FIGS. 6A-6C are diagrams illustrating a process of identifying nearest neighbors from table data according to examples and features of the instant solution.
Figure 6B:
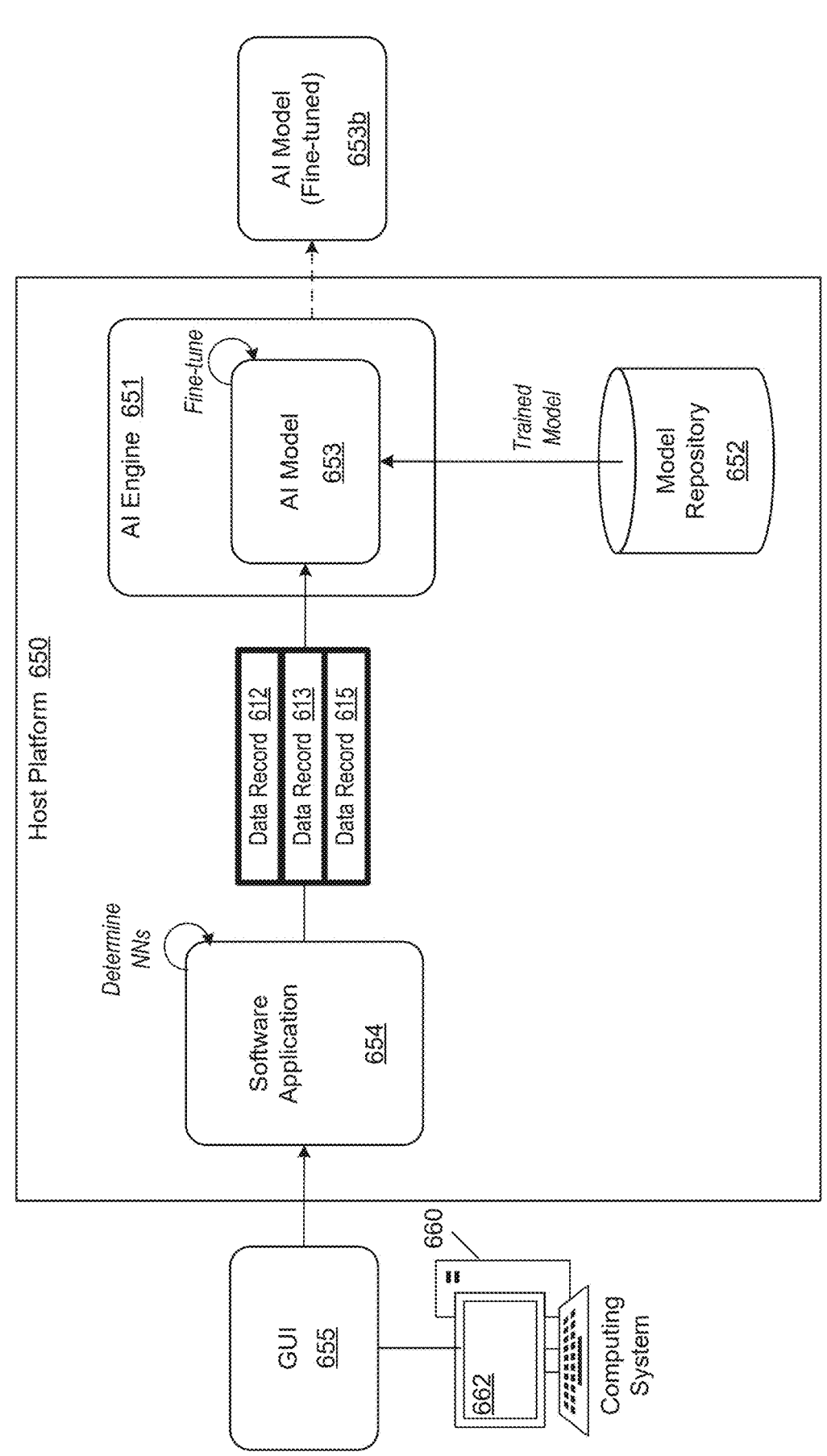
Figure 6C:
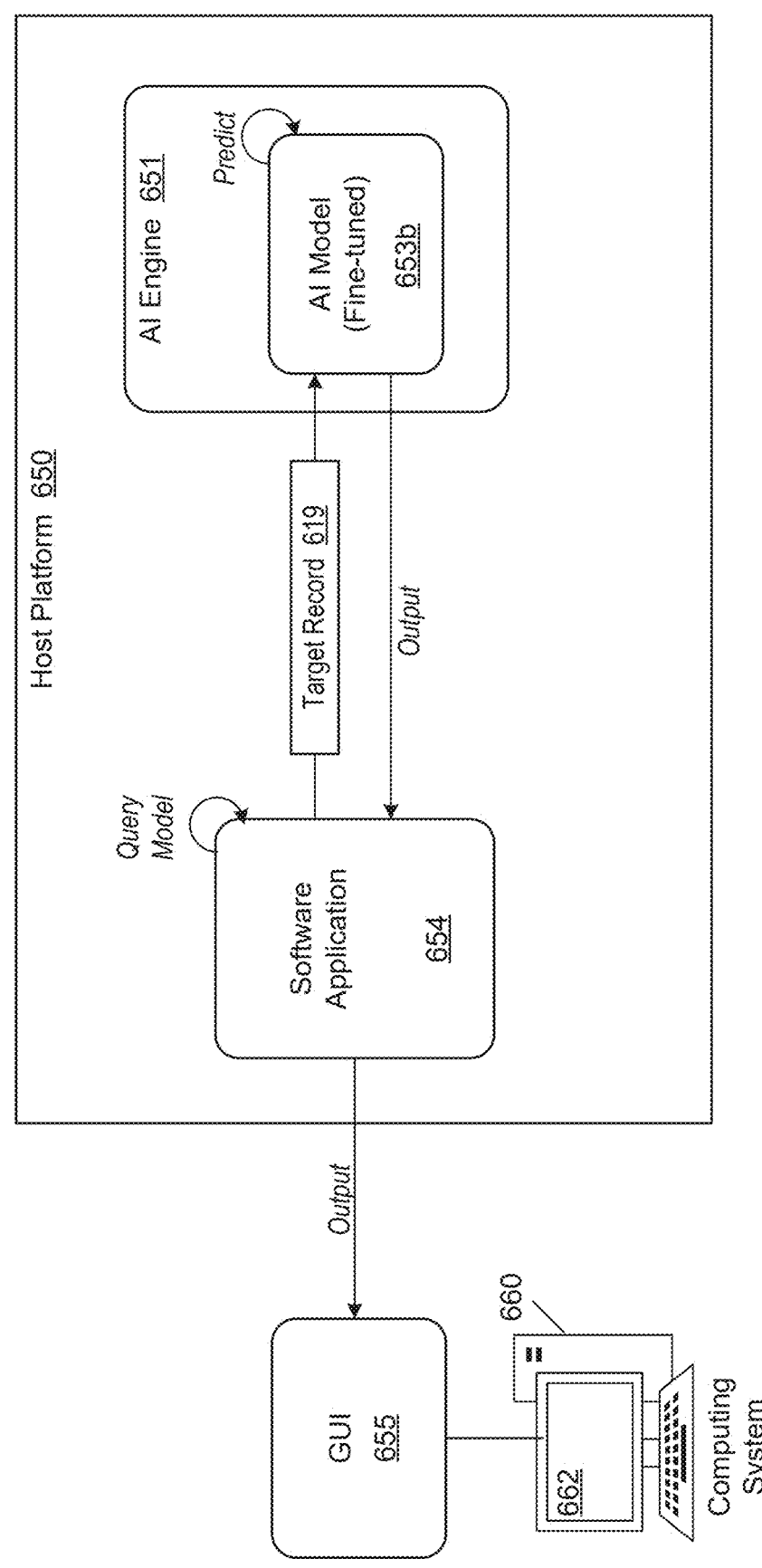

FIGS. 6A-6C illustrate a process of identifying nearest neighbors from table data according to examples and features of the instant solution. For example, FIG. 6A illustrates a process 600A of transforming data records into data points within a multi-dimensional embedding space 630, such as a vector space. Referring to FIG. 6A, a retriever 620 receives a target record 619 and executes a transformation on the target record 619 to convert the target record 619 into a data point in the multi-dimensional embedding space 630. In this example, the retriever 620 may tokenize values within the target record 619, vectorize the tokens, and embed the tokens within the multi-dimensional embedding space 630 using predefined algorithms.

In addition, the retriever 620 may convert a plurality of data records 611, 612, 613, 614, 615, 616, 617, and 618, of table data 610 into a plurality of data points 631, 632, 633, 634, 635, 636, 637, and 638 within the multi-dimensional embedding space 630. The retriever 620 may execute a KNN model 622 to identify the nearest neighbors of the target record 619 based on the points within the multi-dimensional embedding space 630. Here, the KNN model 622 may implement a predetermined distance 640 (e.g., a radius, etc.) from the data point 639 corresponding to the target record 619 within the multi-dimensional embedding space 630 and identify any data points that are within predetermined distance 640.

In this example, the KNN model 622 identifies data points 632, 633, and 635 that are within the predetermined distance 640 of the data point 639. Here, the retriever 620 extracts the corresponding data records from table data 610 including the data record 612 corresponding to the data point 632, the data record 613 corresponding to the data point 633, and the data record 615 corresponding to the data point 635.

In some examples of the instant solution, the KNN model 622 may be an example of AI model 232, described and depicted in FIGS. 2A-2C.

In some examples and features of the instant solution, the subset of data records including the data record 612, the data record 613, and the data record 615 may be used to train or re-train an AI model rather than to generate an inference. For example, FIG. 6B illustrates a process 600B of fine-tuning a pre-trained AI model 653 based on the subset of data records 612, 613, and 615 according to examples and features of the instant solution. Referring to FIG. 6B, a user may enter a task, target record, etc. into a GUI 655 of a software application 654 hosted by a host platform 650. In this example, the software application 654 may perform the process 600A shown in FIG. 6A to generate the subset of data records 612, 613, and 615.

In this example, the software application 654 may transfer the subset of data records 612, 613, and 615 to an AI engine 651 which retrieves the AI model 653 from a model repository 652 and executes the AI model 653 on the subset of data records 612, 613, and 615. For example, the AI engine 651 may cause the AI model 653 to execute on the subset of data records 612, 613, and 615 which causes the variables of the AI model 653 to change (fine-tuning) to generate a fine-tuned AI model 653b.

The fine-tuned AI model 653b may be stored back in the model repository 652. As another example, the fine-tuned AI model 653b may be used to perform an inference on the target record 619. For example, FIG. 6C illustrates a process 600C of executing the fine-tuned AI model 653b on the target record 619 to generate a predicted result (inference) according to examples and features of the instant solution. For example, the fine-tuned AI model 653b may ingest the target record and generate a predicted output. The predicted output may be transferred to the software application 654 which outputs/displays the predicted output on the GUI 655 enabling a computing system 660 accessing the GUI 655, to view the predicted results on the GUI 655 via a display device 662 of the computing system 660.

In some examples of the instant solution, AI model 653 and fine-tuned AI model 653b depicted with respect to FIGS. 6B-6C may reside separately from the software application 654 which uses them, such as in the process described with respect to FIGS. 2A-2C. In some examples of the instant solution, AI model 653 and fine-tuned AI model 653b may be examples of AI model 232, described and depicted in FIGS. 2A-2C. In some examples of the instant solution, model repository 652 may be an example of model repository 260, described and depicted in FIGS. 2A-2C. In some examples of the instant solution, software application 654 may be an example of the software service 212 described and depicted in FIGS. 2A-2C. In some examples of the instant solution, AI model 653 and fine-tuned AI model 653b may be deployed to an AI production system where the software application 654 on the host platform may access and execute it. In some examples of the instant solution, the host platform 650 may be an example of host platform 210 described and depicted in FIGS. 2A-2C, or the host platform 650 may be a combination of systems that includes host platform 210, AI development system 240, and AI production system 230, as described and depicted in FIGS. 2A-2C.

In one example of the instant solution, tabular data is retrieved, which the AI model uses as a global context, meaning that the AI model initially has access to the entire dataset. In another example, the tabular data may be received. A distance metric is defined to quantify the distance or similarity between any two data points within the dataset. This distance metric is the basis for determining how closely related data points are. Once the distance metric is established, the solution identifies a threshold that sets a maximum allowable distance between data points. This threshold helps filter the data to focus on points sufficiently close to each other, as defined by the distance metric. The solution creates a local context specifically for a given query data point by identifying neighboring points in the global dataset. These neighboring points fall within the predefined distance threshold, ensuring that the most relevant and closely related data points are considered.

The AI model is executed on this local context, either to generate a predictive result based on the query data point or to train the model using the selected subset of data. Concentrating on a smaller, more relevant subset of data allows the AI model to work more efficiently and accurately rather than processing the entire dataset, which can be large and contain many irrelevant data points.

In another example of the instant solution, after the tabular data is retrieved, a nearest neighbor metric (NNM) is defined to measure the distance or similarity between any two data points within this dataset. A threshold is identified that sets a maximum allowable distance between data points, ensuring that those data points that are sufficiently close to each other are considered neighbors. When this threshold is established, a local context is created for a specific query data point by identifying neighboring points within the global context with an NNM below the defined threshold. These neighboring points, most relevant to the query data point, form the local context. The global context is replaced with this more focused local context for the specific query data point, allowing the AI model to concentrate on a smaller, more relevant subset of data. The AI model, which may be transformer-based, is executed in this local context either to generate a predictive result based on the query data point or to train the model further.

In another example of the instant solution, after the tabular data is retrieved, a local context is created for a specific query point by selecting data points from the tabular data within a certain distance from the query point, where a predefined threshold determines the distance. The concept of a shared local context is introduced, created by combining the local contexts of multiple query data points. This combination is based on a metric, which likely considers the proximity or similarity of data points across different local contexts. By merging these local contexts, a more comprehensive and relevant subset of data is created that reflects the collective characteristics of the query points. The shared local context is fine-tuned by using it instead of the individual local contexts for the query points. This fine-tuning process ensures the AI model is trained or executed on a more refined and representative dataset. The transformer-based AI model is executed on this shared local context to either generate a predictive result or to undergo further training, ensuring that it processes the most relevant and contextually rich data, tailored specifically to the multiple query points.

In another example of the instant solution, after the tabular data is retrieved, a specific query point is created by including those data points from the tabular data that are within a certain distance from the query point, as determined by a predefined threshold. The solution identifies a set of nearest neighbors for each sampled data point based on a neighborhood metric. The shared local context for a query point is then determined by the set of nearest neighbors to which the query point belongs. Shared local contexts are created by sampling several data points from the tabular data. This approach ensures that the query point's local context is enriched by incorporating data points most relevant according to their proximity, which may be transformer-based and/or similar, as determined by the neighborhood metric. The transformer-based AI model is executed on the shared local context to either generate a predictive result or to train the model further.

In another example of the instant solution, the system increases data processing efficiency by creating a local context, significantly reducing the volume of data the transformer-based AI model processes. This approach is aligned with the reduction of the dataset size before processing to lower computational load and memory usage, resulting in faster inference times and fewer processing cycles. By focusing on the most relevant data points through the nearest neighbor metric and a predefined threshold, the system ensures that the AI model processes a much smaller yet highly relevant subset of data, enhancing overall efficiency.

In terms of accuracy, the system refines the local context using a shared neighborhood metric, increasing the data input's relevance to the AI model. This process highlights the benefits of context-aware data selection in boosting predictive accuracy. By eliminating noise and focusing on the most contextually pertinent data, the system ensures that the AI model's predictions are based on highly relevant information, thereby increasing the accuracy of the results.

The system's NNM is defined as a measure of similarity or proximity between data points within the tabular dataset. Depending on the nature of the data, the metric can be based on various distance measures, such as Euclidean distance, Manhattan distance, or cosine similarity. The Euclidean distance is preferably used for numerical data, which calculates the straight-line distance between two points in multi-dimensional space. The system might use a different approach for categorical data, such as Hamming distance or a specialized similarity measure.

In calculating the NNM, each data point in the dataset is represented as a vector in a multi-dimensional space, where each dimension corresponds to an attribute of the data. The distance between any two data points (vectors) is then calculated using the chosen distance measure.

The system sets the threshold for the NNM by analyzing the distribution of distances across the entire dataset. This analysis may involve statistical methods such as determining the mean and standard deviation of the distances and setting the threshold at a value that captures a significant portion of the nearest neighbors without including outliers or irrelevant points. For example, the threshold might be set at one or two standard deviations from the mean distance, ensuring that data points within this range are considered neighbors. The system optimizes the balance between including relevant data points and excluding noise by fine-tuning this threshold based on the dataset's characteristics. This approach enhances the model's accuracy and increases the computational efficiency by reducing the number of data points considered in the local context. Therefore, the instant solution demonstrates a clear and technically sound inventive advance for defining, calculating, and setting the threshold for the nearest neighbor metric, ensuring that the system effectively filters and processes data points to enhance the AI model's performance.

Tabular data can represent real-world datasets, such as financial transaction records, patient medical histories, or customer purchase logs. For example, the tabular data can represent a financial dataset comprising several columns such as "Transaction ID," "Customer ID," "Transaction Amount," "Transaction Date," "Merchant Category," and "Payment Method." Each row in this table corresponds to an individual transaction, forming a comprehensive record of customer activity. A query point in this context might be a specific transaction identified by its "Transaction ID." When the query point is a transaction where the "Transaction Amount" is unusually high compared to typical transactions for the same "Customer ID" and "Merchant Category," the system aims to determine whether this transaction is potentially fraudulent. In processing this query point, the system identifies relevant attributes in the table, such as "Transaction Amount," "Transaction Date," and "Merchant Category," which are most likely to influence the outcome. The nearest neighbor metric is then used to identify similar transactions, focusing on those with similar amounts and merchant categories within a certain time frame. For example, the system might identify other transactions with the same "Merchant Category" and "Customer ID" where the "Transaction Amount" fell within a specific range (e.g., within 10% of the query point's amount) and occurred within several days (e.g., the last 30 days). These neighboring transactions form the local context for the query point.

The AI model then analyzes this local context to generate a predictive result, such as the likelihood of fraud.

The instant solution uses a structured approach to creating local and shared contexts for query points, enhancing the efficiency and accuracy of the AI model. The system receives a query point, a specific data record from the tabular dataset. The dataset is loaded into memory, and each record is transformed via at least one processor, node, or system described or depicted herein into a multi-dimensional vector, where each dimension represents an attribute such as transaction amount, date, or category. The system calculates the distance between the query point and each other data point using a predefined distance metric, such as Euclidean distance or cosine similarity. A threshold is then set, either dynamically or based on the statistical properties of the dataset, to determine the maximum allowable distance for a data point to be considered a "neighbor" of the query point. Data points within this threshold form the local context, which the AI model then uses to generate predictions or perform further training.

In creating shared contexts, the system first samples a subset of data points from the tabular dataset, which serve as reference points. The system calculates its nearest neighbors using the distance metric for each sampled point, forming preliminary local contexts. Query points are then assigned to these preliminary contexts based on their proximity to the sampled points, ensuring that query points with similar characteristics are grouped together. The system subsequently merges these local contexts to create a shared context, including data points relevant to multiple query points. This shared context is then utilized by the AI model, which may be transformer-based, allowing it to operate on a broader and more contextually relevant data set, thereby increasing the accuracy and relevance of the model's output.

The instant solution may be applied to various actions and systems, such as fraud detection and recommendation systems, by tailoring the neighborhood metric to the specific characteristics of the data and the nature of the query points in each scenario. In fraud detection, the neighborhood metric is designed to evaluate the similarity between transaction records based on attributes like transaction amount, location, time, and merchant category. For example, the metric might prioritize recent transactions with similar amounts at the same merchant to identify potentially fraudulent patterns. By setting the threshold based on historical data of known fraudulent activities, the system can efficiently isolate suspicious transactions, allowing the AI model to focus on these high-risk records, thus increasing fraud detection accuracy.

The neighborhood metric is adjusted to consider user preferences and behavior in a recommendation system. The metric evaluates the proximity between users based on shared interests, past interactions, or similar purchase histories. For example, in an e-commerce platform, the neighborhood metric might give more weight to product categories that users frequently purchase or to items highly rated by users with similar browsing patterns. By setting a dynamic threshold that adapts to the diversity of user preferences, the system can create highly personalized recommendations, ensuring that the AI model presents options most relevant to the user's current context.

Implementing the weighting module within the AI system is designed to optimize the relevance of the data records retrieved for processing, thereby enhancing the performance of the AI model. The weighting module assigns weights to various attributes of the tabular data based on their significance to the query point or the task. For example, in a financial fraud detection scenario, attributes such as transaction amount, frequency of transactions, and geographic location might be assigned higher weights due to their role in identifying fraudulent behavior. The weighting module employs algorithms like gradient boosting or logistic regression to dynamically adjust these weights, reflecting the evolving importance of attributes as more data is processed. The system calculates these weights by analyzing historical data and determining which attributes influence the outcome, such as fraud detection accuracy or recommendation relevance. The weighting module then applies these calculated weights during the data retrieval process, prioritizing records that exhibit high-weighted attributes. This process is iterative, with the module continuously refining the weights based on feedback from the AI model's performance. The retrieval of data records is heavily influenced by these weights, ensuring that the most pertinent data is selected for model input, reducing computational overhead, and increasing the precision of the AI model's predictions.

FIG. 7A illustrates a method 700 of selecting table data based on a dimensionality of a memory of an AI model according to examples and features of the instant solution. For example, the method 700 may be performed by a host platform such as a cloud platform, a web server, a software application, a combination of systems, and the like. Referring to FIG. 7A, in 701, the method may include identifying dimensional parameters of a memory of an artificial intelligence (AI) model. In 702, the method may include receiving tabular data for execution by the AI model. In 703, the method may include determining a subset of data from within the tabular data that fits within the dimensional parameters of the memory. In 704, the method may include extracting the subset of data from the tabular data and converting the subset of data into at least one vector. In 705, the method may include executing the AI model on the subset of data to generate a predictive result.

FIG. 7B illustrates a method 710 of selecting table data based on a dimensionality of a memory of an AI model according to other examples and features of the instant solution. For example, the method 710 may be performed by a host platform such as a cloud platform, a web server, a software application, a combination of systems, and the like. Referring to FIG. 7B, in 711, the method may include identifying at least one of a maximum number of samples, a maximum number of features, and a maximum number of classes that can fit into the memory of the AI model, and reducing a size of the tabular data to be within the at least one of the maximum number of samples, the maximum number of features, and the maximum number of classes.

In 712, the method may further include receiving data associated with a target task of the AI model, wherein the determining comprises determining the subset of data from within a data model that is needed for the target task based on metadata of the tabular data. In 713, the method may include identifying a maximum number of columns that can fit into the memory based on the dimensional parameters of the memory and removing columns from the tabular data to generate a remaining set of columns that is at or below the maximum number of columns, and extracting the remaining set of columns from the tabular data.

In 714, the method may include identifying a maximum number of rows that can fit into the memory based on the dimensional parameters of the memory and removing rows from the tabular data to generate a remaining set of rows that is at or below the maximum number of rows, and extracting the remaining set of rows from the tabular data. In 715, the method may include receiving a target record to be executed by the AI model on the tabular data and reducing the tabular data down to the subset of data based on the target record. In 716, the AI model the method may include an in-context learning model configured to perform a single pass on the tabular data to generate the predictive result.

FIG. 8A illustrates a method 800 of weighting a subset of table data prior to input to an AI Model according to examples and features of the instant solution. For example, the method 800 may be performed by a host platform such as a cloud platform, a web server, a software application, a combination of systems, and the like. Referring to FIG. 8A, in 801, the method may include storing a table comprising a plurality of records. In 802, the method may include receiving a target record to be executed by an artificial intelligence (AI) model to perform a task. In 803, the method may include retrieving a subset of records from the plurality of records within the table based on content values in the target record and corresponding content values in the subset of records.

In 804, the method may include identifying a first group of records among the subset of records that are related to the target record based on attributes associated with the target record and attributes associated with the first group of records. In 805, the method may include weighting the first group of records greater than other records within the subset of records to generate a weighted subset of records. In 806 the method may include executing the AI model on the weighted subset of records to generate a predictive result.

FIG. 8B illustrates a method 810 of weighting a subset of table data prior to input to an AI Model according to other examples and features of the instant solution. For example, the method 810 may be performed by a host platform such as a cloud platform, a web server, a software application, a combination of systems, and the like. Referring to FIG. 8B, in 811, the method may include retrieving the attributes associated with the target record and attributes associated with the subset of records from a database, and identifying the first group of records based on matching attributes included in the attributes associated with the target record and the attributes of associated with the first group of records. In 812, the method may include identifying the attributes associated with the first group of records based on metadata that is stored within the table.

In 813, the method may include augmenting the target record with the weighted subset of records to generate a retrieval-augmented set of records, and inputting the retrieval-augmented set of records into the AI model during execution of the AI model to generate the predictive result. In 814, the subset of records may include a plurality of rows of data, and the method may include weighting a first subset of rows greater than a second subset of rows, among the plurality of rows of data.

In 815, the target record may be associated with a user, the subset of records to other users, respectively, and the method may include identifying one or more users among the other users that have matching attributes as the user and weighting records of the one or more users based on the matching attributes. In 816, the method may include receiving a target task based on an input received via a graphical user interface (GUI) of a software application, retrieving the subset of records based on the target task, and displaying the predictive result via the GUI of the software application.

FIG. 9A illustrates a method 900 of retrieving a subset of table data for input to an AI model based on context according to examples and features of the instant solution. For example, the method 900 may be performed by a host platform such as a cloud platform, a web server, a software application, a combination of systems, and the like. Referring to FIG. 9A, in 901, the method may include storing a table comprising a plurality of columns corresponding to a plurality of attributes and a plurality of rows of data corresponding to a plurality of records. In 902, the method may include receiving a target record to be executed by an artificial intelligence (AI) model.

In 903, the method may include identifying a subset of records in the table that are similar to the target record based on a comparison of attribute values within the subset of records to corresponding attribute values within the target record. In 904, the method may include executing the AI model on the subset of records to generate a trained AI model. In 905, the method may include executing the trained AI model on the target record to generate a predicted result for the target record.

FIG. 9B illustrates a method 910 of retrieving a subset of table data for input to an AI model based on context according to other examples and features of the instant solution. For example, the method 910 may be performed by a host platform such as a cloud platform, a web server, a software application, a combination of systems, and the like. Referring to FIG. 9B, in 911, the AI model may include a pre-trained AI model, and the method may include executing the pre-trained AI model based on the subset of records to generate a fine-tuned AI model. In 912, the plurality of records correspond to a plurality of users, the target record corresponds to a target user, and the method may include executing the AI model on a subset of records of other users with respect to the target user to generate the trained AI model.

In 913, the AI model may include an in-context learning AI model, and the method may include tuning the in-context learning AI model based on the subset of records to generate a tuned in-context AI learning model. In 914 the method may include concatenating the subset of records and the target record to generate an augmented set of records and executing the AI model on the augmented set of records to generate the trained AI model. In 915, the method may include executing the AI model on the subset of records comprises modifying parameters of the AI model prior to executing the AI model on the target record. In 916, the target record may include a plurality of data points, and identifying the subset of records in the table that are similar to the target record based on a comparison of a corresponding plurality of data points within the plurality of records to the plurality of data points within the target record.

FIG. 10A illustrates a method 1000 of identifying nearest neighbors from table data according to examples and features of the instant solution. For example, the method 1000 may be performed by a host platform such as a cloud platform, a web server, a software application, a combination of systems, and the like. Referring to FIG. 10A, in 1001, the method may include storing a table comprising a plurality of columns corresponding to a plurality of attributes and a plurality of rows corresponding to a plurality of records. In 1002, the method may include receiving a target record of a task of an artificial intelligence (AI) model.

In 1003, the method may include converting the plurality of records into a plurality of embeddings in multi-dimensional vector space. In 1004, the method may include converting the target record into a target embedding in the multi-dimensional vector space. In 1005, the method may include identifying a subset of records from among the plurality of records that are nearest to the target record in content based on distances between embeddings of the subset of records and the target embedding within the multi-dimensional vector space. In 1006, the method may include executing the AI model on the subset of records to generate a predicted output with respect to the task.

FIG. 10B illustrates a method 1010 of identifying nearest neighbors from table data according to other examples and features of the instant solution. For example, the method 1010 may be performed by a host platform such as a cloud platform, a web server, a software application, a combination of systems, and the like. Referring to FIG. 10B, in 1011, each record from among the plurality of records may include a different row of data from the table. In 1012, the method may include transforming content values in the plurality of records to generate a plurality of vectors of the plurality of records, respectively, and transforming a corresponding set of content values of the target record to generate a target vector of the target record.

In 1013, the method may include identifying a subset of vectors among the plurality of vectors that are closest to the target vector within the multi-dimensional vector space based on execution of an algorithm on the plurality of vectors and the target vector. In 1014, the method may include determining the distances between the plurality of embeddings and the target embedding based on execution of a dot product algorithm on the plurality of embeddings and the target embedding. In 1015, the method may further include receiving a request to execute the AI model on the target record via a software application, and displaying the predicted output via a graphical user interface (GUI) of the software application. In 1016, the method may include retrieving a subset of table data from the table, and feeding the subset of table data to the AI model while the AI model is executing.

Figure 11:
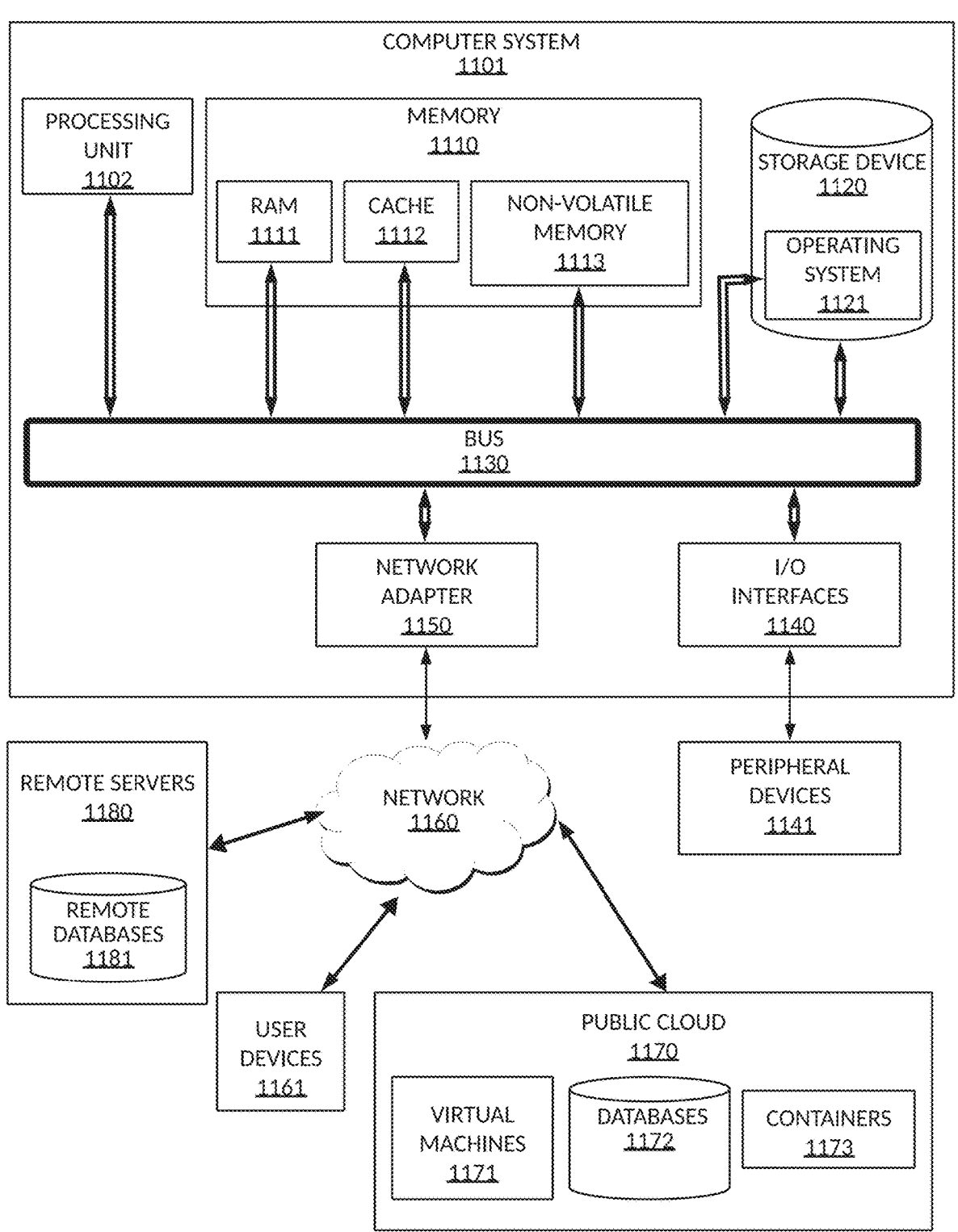
FIG. 11 is a system diagram illustrating a computing environment according to the instant solution's example features, structures, or characteristics.

The examples and features of the instant solution may be implemented in one or more of the elements described or depicted herein, including for example, the elements described or depicted in FIG. 11. These examples and features may further be implemented in hardware, in a computer program executed by a processor, in firmware, or in a combination of the above. A computer program may be embodied on a computer readable medium, such as a storage medium. For example, a computer program may reside in random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art.

An exemplary storage medium may be communicatively coupled to the processor such that the processor may read information from, and write information to, the storage medium. In the alternative, the storage medium may be integral to the processor. The processor and the storage medium may reside in an application specific integrated circuit (ASIC). In the alternative, the processor and the storage medium may reside as discrete components. For example, FIG. 11 illustrates an example computer system architecture, which may represent or be integrated in any of the above-described components, etc.

FIG. 11 illustrates a computing environment according to the instant solution's example features, structures, or characteristics. FIG. 11 is not intended to suggest any limitation as to the scope of use or functionality of features, structures, or characteristics of the instant solution of the application described herein. Regardless, the computing environment 1100 can be implemented to perform any of the functionalities described herein. In computing environment 1100, there is a computer system 1101, operational within numerous other general-purpose or special-purpose computing system environments or configurations.

Computer system 1101 may take the form of a desktop computer, laptop computer, tablet computer, smartphone, smartwatch or other wearable computer, server computer system, thin client, thick client, network computer system, minicomputer system, mainframe computer, quantum computer, and distributed cloud computing environment that include any of the described systems or devices, and the like or any other form of computer or mobile device now known or to be developed in the future that is capable of running a program, accessing a network 1160 or querying a database. Depending upon the technology, the performance of a computer-implemented method may be distributed among multiple computers and among multiple locations. However, in this presentation of the computing environment 1100, a detailed discussion is focused on a single computer, specifically computer system 1101, to keep the presentation as simple as possible.

Computer system 1101 may be located in a cloud, even though it is not shown in a cloud in FIG. 11. On the other hand, computer system 1101 may not be in a cloud except to any extent as may be affirmatively indicated. Computer system 1101 may be described in the general context of computer system-executable instructions, such as program modules, executed by a computer system 1101. Generally, program modules may include routines, programs, objects, components, logic, data structures, and so on that perform tasks or implement certain abstract data types. As shown in FIG. 11, computer system 1101 in computing environment 1100 is shown in the form of a general-purpose computing device. The components of computer system 1101 may include but are not limited to, at least one processor or processing unit 1102, a system memory 1110, and a bus 1130 that couples various system components, including system memory 1110 to processing unit 1102.

Processing unit 1102 includes at least one computer processor of any type now known or to be developed. The processing unit 1102 may contain circuitry distributed over multiple integrated circuit chips. The processing unit 1102 may also implement multiple processor threads and multiple processor cores. Cache 1112 is a memory that may be in the processor chip package(s) or located "off-chip," as depicted in FIG. 11. Cache 1112 is typically used for data or code accessed by the threads or cores running on the processing unit 1102. In some computing environments, processing unit 1102 may be designed to work with qubits and perform quantum computing.

Memory 1110 is any volatile memory now known or to be developed in the future. Examples include dynamic random-access memory (RAM) 1111 or static type RAM 1111. Typically, the volatile memory is characterized by random access, but this may not be the characterization unless affirmatively indicated. In computer system 1101, memory 1110 is in a single package. It is internal to computer system 1101, but alternatively or additionally, the volatile memory may be distributed over multiple packages and/or located externally with respect to computer system 1101. By way of example, memory 1110 can be provided for reading from and writing to a non-removable, non-volatile magnetic media (shown as storage device 1120, and typically called a "hard drive"). Memory 1110 may include at least one program product having a set (e.g., at least one) of program modules configured to carry out the functions of various features, structures, or characteristics of the instant solution of the application. A typical computer system 1101 may include cache 1112, a specialized volatile memory generally faster than RAM 1111 and generally located closer to the processing unit 1102. Cache 1112 stores frequently accessed data and instructions accessed by the processing unit 1102 to speed up processing time. The computer system 1101 may also include non-volatile memory 1113 in the form of ROM, PROM, EEPROM, and flash memory. Non-volatile memory 1113 often contains programming instructions for starting the computer, including the basic input/output system (BIOS) and information to start the operating system 1121.

Computer system 1101 may include a removable/non-removable, volatile/non-volatile computer storage device 1120. For example, storage device 1120 can be a non-removable, non-volatile magnetic media (not shown and typically called a "hard drive"). At least one data interface can connect it to the bus 1130. In features, structures, or characteristics of the instant solution where computer system 1101 has a large amount of storage (for example, where computer system 1101 locally stores and manages a large database), then this storage may be provided by peripheral storage devices 1120 designed for storing very large amounts of data, such as a storage area network (SAN) that is shared by multiple, geographically distributed computers.

The operating system 1121 is software that manages computer system 1101 hardware resources and provides common services for computer programs. Operating system 1121 may take several forms, such as various known proprietary operating systems or open-source Portable Operating System Interface type operating systems that employ a kernel.

The bus 1130 represents at least one of several types of bus structures, including a memory bus or memory controller, a peripheral bus, an accelerated graphics port, and a processor or local bus using various bus architectures. By way of example, and not limitation, such architectures include Industry Standard Architecture (ISA) buses, Micro Channel Architecture (MCA) buses, Enhanced ISA (EISA) buses, Video Electronics Standards Association (VESA) local buses, and Peripheral Component Interconnect (PCI) bus. The bus 1130 is the signal conduction path that allows the various components of computer system 1101 to communicate.

Computer system 1101 may communicate with at least one peripheral device, 1141, via an input/output (I/O) interface, 1140. Such devices may include a keyboard, a pointing device, a display, etc.; at least one device that enables a user to interact with computer system 1101; and/or any devices (e.g., network card, modem, etc.) that enable computer system 1101 to communicate with at least one other computing devices. Such communication can occur via I/O interface 1140. As depicted, I/O interface 1140 communicates with the other components of computer system 1101 via bus 1130.

Network adapter 1150 enables the computer system 1101 to connect and communicate with at least one network 1160, such as a local area network (LAN), a wide area network (WAN), and/or a public network (e.g., the Internet). It bridges the computer's internal bus 1130 and the external network, exchanging data efficiently and reliably. The network adapter 1150 may include hardware, such as modems or Wi-Fi signal transceivers, and software for packetizing and/or de-packetizing data for communication network transmission. Network adapter 1150 supports various communication protocols to ensure compatibility with network standards. Ethernet connections adhere to protocols such as IEEE 802.3, while wireless communications might support IEEE 802.11 standards, Bluetooth, near-field communication (NFC), or other network wireless radio standards.

Network 1160 is any computer network that can receive and/or transmit data. Network 1160 can include a WAN, LAN, private cloud, or public Internet, capable of communicating computer data over non-local distances by any technology that is now known or to be developed in the future. Any connection depicted can be wired and/or wireless and may traverse other components that are not shown. In some features, structures, or characteristics of the instant solution, a network 1160 may be replaced and/or supplemented by LANs designed to communicate data between devices in a local area, such as a Wi-Fi network. The network 1160 typically includes computer hardware such as copper transmission cables, optical transmission fibers, wireless transmission, routers, firewalls, switches, gateway computers, edge servers, and network infrastructure known now or to be developed in the future. Computer system 1101 connects to network 1160 via network adapter 1150 and bus 1130.

User devices 1161 are any computer systems used and controlled by an end user in connection with computer system 1101. For example, in a hypothetical case where computer system 1101 is designed to provide a recommendation to an end user, this recommendation may typically be communicated from network adapter 1150 of computer system 1101 through network 1160 to a user device 1161, allowing user device 1161 to display, or otherwise present, the recommendation to an end user. User devices can be a wide array, including personal computers, laptops, tablets, hand-held, mobile phones, etc.

A public cloud 1170 is an on-demand availability of computer system resources, including data storage and computing power, without direct active management by the user. Public clouds 1170 are often distributed, with data centers in multiple locations for availability and performance. Computing resources on public clouds 1170 are shared across multiple tenants through virtual computing environments comprising virtual machines 1171, databases 1172, containers 1173, and other resources. A container 1173 is an isolated, lightweight software for running a software application on the host operating system 1121. Containers 1173 are built on top of the host operating system's kernel and contain software applications and some lightweight operating system APIs and services. In contrast, virtual machine 1171 is a software layer with an operating system 1121 and kernel. Virtual machines 1171 are built on top of a hypervisor emulation layer designed to abstract a host computer's hardware from the operating software environment. Public clouds 1170 generally offers databases 1172, abstracting high-level database management activities. At least one element described or depicted in FIG. 11 can perform at least one of the actions, functionalities, or features described or depicted herein.

Remote servers 1180 are any computers that serve at least some data and/or functionality over a network 1160, for example, WAN, a virtual private network (VPN), a private cloud, or via the Internet to computer system 1101. These networks 1160 may communicate with a LAN to reach users. The user interface may include a web browser or a software application that facilitates communication between the user and remote data. Such software applications have been referred to as "thin" desktop software applications or "thin clients." Thin clients typically incorporate software programs to emulate desktop sessions. Mobile device software applications can also be used. Remote servers 1180 can also host remote databases 1181, with the database located on one remote server 1180 or distributed across multiple remote servers 1180. Remote databases 1181 are accessible from database client applications installed locally on the remote server 1180, other remote servers 1180, user devices 1161, or computer system 1101 across a network 1160. An AI/ML model described or depicted here may reside fully or partially on any of the elements described or depicted in FIG. 11.

Although an exemplary example of the instant solution of at least one of an apparatus, method, and computer readable medium has been illustrated in the accompanying drawings and described in the foregoing detailed description, it will be understood that the instant solution is not limited to the examples of the instant solution disclosed but is capable of numerous rearrangements, modifications, and substitutions as set forth and defined by the following claims. For example, the instant solution's capabilities of the various figures can be performed by one or more of the modules or components described herein or in a distributed architecture and may include a transmitter, receiver, or pair of both. For example, all or part of the functionality performed by the individual modules may be performed by one or more of these modules. Further, the functionality described herein may be performed at various times and in relation to various events, internal or external to the modules or components. Also, the information sent between various modules can be sent between the modules via at least one of a data network, the Internet, a voice network, an Internet Protocol network, a wireless device, a wired device and/or via a plurality of protocols. Also, the messages sent or received by any of the modules may be sent or received directly and/or via one or more of the other modules.

One skilled in the art will appreciate that the instant solution may be embodied as a personal computer, a server, a console, a personal digital assistant (PDA), a cell phone, a tablet computing device, a smartphone, or any other suitable computing device, or combination of devices. Presenting the above-described functions as being performed by the instant solution is not intended to limit the scope of the present instant solution in any way but is intended to provide one example of the many examples of the instant solution. Indeed, methods, systems, and apparatuses disclosed herein may be implemented in localized and distributed forms consistent with computing technology.

It should be noted that some of the instant solution features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module may not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory, tape, or any other such medium used to store data.

Indeed, a module of executable code may be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the instant solution, as generally described and illustrated in the figures herein, may be arranged and designed in a wide variety of different configurations. Thus, the detailed descriptions of the instant solution and the examples and features of the instant solution are not intended to limit the scope of the instant solution as claimed but are merely representative examples of the instant solution.

One having ordinary skill in the art will readily understand that the above may be practiced with steps in a different order and/or with hardware elements in configurations that are different from those which are disclosed. Therefore, although the instant solution has been described based upon these preferred examples and features of the instant solution, it would be apparent to those of skill in the art that certain modifications, variations, and alternative constructions would be apparent.

While preferred examples of the present instant solution have been described, it is to be understood that the examples described are illustrative only, and the scope of the instant solution is to be defined solely by the appended claims when considered with a full range of equivalents and modifications (e.g., protocols, hardware devices, software platforms, etc.) thereto.

What is claimed is:

1. An apparatus, comprising:
a memory configured to store an in-context learning model that comprises a limited-size memory; and
a processor coupled to the memory, the processor configured to:
store, in the memory, a table comprising a plurality of records in a plurality of rows, respectively,
receive a target record associated with a predictive task,
convert the target record into a target embedding and the plurality of rows into a plurality of embeddings in an embedding space;
identify a subset of records that will fit into the limited-size memory and are most closely related to the target record based on distances between a subset of embeddings corresponding to the subset of records and the target embedding within the embedding space,
update the in-context learning model by storing the subset of records within the limited-size memory,
execute the updated in-context learning model a plurality of times on the target record to generate a plurality of tokens, respectively, and
output the plurality of tokens as a predictive result.

2. The apparatus of claim 1, wherein the processor is further configured to retrieve attributes associated with the target record and attributes of the plurality of records from a database, and identify the subset of records based on matching attributes included in the attributes associated with the target record and the attributes of the plurality of records.

3. The apparatus of claim 1, wherein the processor is configured to identify attributes associated with the subset of records based on metadata that is stored within the table.

4. The apparatus of claim 1, wherein the processor is configured to augment the target record with the subset of records to generate a retrieval-augmented set of records, and input the retrieval-augmented set of records into the in-context learning mode prior to the predictive result that is output.

5. The apparatus of claim 1, wherein the processor is configured to remove columns of data from the subset of records to ensure that the subset of records will fit into the limited-size memory of the in-context learning model.

6. The apparatus of claim 1, wherein the processor is configured to remove columns of data from the subset of records to ensure that the subset of records will fit into the limited-size memory of the in-context learning model.

7. The apparatus of claim 1, wherein the processor is configured to receive the predictive task based on an input received via a graphical user interface (GUI) of a software application, and display the predictive result via the GUI of the software application.

8. The apparatus of claim 1, wherein the processor is configured to execute a nearest neighbor algorithm on the target embedding and the plurality of embeddings to identify the subset of embeddings based on positions of the subset of embeddings being within a predetermined distance of the target embedding within the embedding space.

9. A method comprising:
   storing a table comprising a plurality of records in a plurality of rows, respectively;
   receiving a target record associated with a predictive task;
   converting the target record into a target embedding and the plurality of rows into a plurality of embeddings in an embedding space;
   identifying a subset of records that will fit into a limited-size memory of an in-context learning model and are most closely related to the target record based on distances between a subset of embeddings corresponding to the subset of records and the target embedding within the embedding space;
   updating the in-context learning model by storing the subset of records within the limited-size memory;
   executing the updated in-context learning model a plurality of times on the target record to generate a plurality of tokens, respectively; and
   outputting the plurality of tokens as a predictive result.

10. The method of claim 9, comprising retrieving attributes associated with the target record and attributes of the plurality of records from a database, wherein the identifying comprises identifying the subset of records based on matching attributes included in the attributes associated with the target record and the attributes of the plurality of records.

11. The method of claim 9, comprising identifying attributes associated with the subset of records based on metadata that is stored within the table.

12. The method of claim 9, comprising augmenting the target record with the subset of records to generate a retrieval-augmented set of records, and inputting the retrieval-augmented set of records into the in-context learning model prior to outputting the predictive result.

13. The method of claim 9, wherein the method further comprises weighting the subset of records and updating the in-context learning model based on the weighted subset of records.

14. The method of claim 9, wherein the method further comprises removing columns of data from the subset of records to ensure that the subset of records will fit into the limited-size memory of the in-context learning model.

15. The method of claim 9, comprising receiving the predictive task based on an input received via a graphical user interface (GUI) of a software application, and displaying the predictive result via the GUI of the software application.

16. A computer-readable storage medium comprising instructions which when executed by a computer cause a processor to perform:
   storing a table comprising a plurality of records in a plurality of rows, respectively;
   receiving a target record associated with a predictive task;
   converting the target record into a target embedding and the plurality of rows into a plurality of embeddings in an embedding space;
   identifying a subset of records that will fit into a limited-size memory of an in-context learning model and are most closely related to the target record based on distances between a subset of embeddings corresponding to the subset of records and the target embedding within the embedding space;
   updating the in-context learning model by storing the subset of records within the limited-size memory;
   executing the updated in-context learning model a plurality of times on the target record to generate a plurality of tokens, respectively; and
   outputting the plurality of tokens as a predictive result.

17. The computer-readable storage medium of claim 16, wherein the processor is further configured to perform identifying attributes associated with the subset of records based on metadata that is stored within the table.

18. The computer-readable storage medium of claim 16, wherein the processor is further configured to perform augmenting the target record with the subset of records to generate a retrieval-augmented set of records, and inputting the retrieval-augmented set of records into the in-context learning model prior to outputting the predictive result.

19. The computer-readable storage medium of claim 16, wherein the processor is further configured to perform weighting the subset of records and updating the in-context learning model based on the weighted subset of records.

20. The computer-readable storage medium of claim 16, wherein the processor is further configured to perform removing columns of data from the subset of records to ensure that the subset of records will fit into the limited-size memory of the in-context learning model.

* * * * *